United States Patent [19]
Pinkus et al.

[11] Patent Number: 6,011,133
[45] Date of Patent: Jan. 4, 2000

[54] LAMINATES OF GLASS OR METAL AND POLY(ALKYLENE DICARBOXYLATES) AND SYNTHESES THEREOF

[75] Inventors: A. G. Pinkus, Robinson; Rajan Hariharan, Waco, both of Tex.

[73] Assignee: Baylor University, Waco, Tex.

[21] Appl. No.: 09/192,825

[22] Filed: Nov. 16, 1998

Related U.S. Application Data

[62] Division of application No. 08/929,969, Sep. 15, 1997, Pat. No. 5,837,381, which is a division of application No. 08/123,368, Sep. 17, 1993, Pat. No. 5,451,643, which is a division of application No. 08/027,134, Mar. 5, 1993, Pat. No. 5,371,171.

[51] Int. Cl.$^7$ .................................................... C08G 63/44
[52] U.S. Cl. ........................... 528/288; 528/272; 528/299; 528/308; 528/308.6
[58] Field of Search ...................................... 528/272, 288, 528/299, 308, 308.6

[56] References Cited

U.S. PATENT DOCUMENTS

| | | |
|---|---|---|
| 2,071,250 | 2/1937 | Carothers . |
| 2,071,251 | 2/1937 | Carothers . |
| 2,111,762 | 3/1938 | Ellis . |
| 4,130,639 | 12/1978 | Shalaby et al. ............................ 424/78 |
| 4,140,087 | 2/1979 | Shalaby et al. .................................. 3/1 |
| 4,141,087 | 2/1979 | Shalaby et al. . |
| 4,208,511 | 6/1980 | Shalaby et al. .......................... 528/272 |
| 5,008,137 | 4/1991 | Nugent, Jr. et al. ..................... 428/35.4 |
| 5,371,171 | 12/1994 | Pinkus et al. ............................ 528/271 |
| 5,451,643 | 9/1995 | Pinkus et al. . |
| 5,668,224 | 9/1997 | Pinkus et al. ............................ 525/444 |
| 5,837,381 | 11/1998 | Pinkus et al. ............................ 428/480 |

FOREIGN PATENT DOCUMENTS

3306089 A1  2/1983  Germany .

OTHER PUBLICATIONS

Carothers et al., "Studies on Polymerization and Ring Formation. V. Glucol Esters of Oxalic Acid," *J. Am. Chem. Soc.*, 52:3292–3300, 1930.

Carothers, Wallace H., "Linear Condenstion 'Superpolymers' Suitable for Production of Pliable, Strong, Elastic Fibers," *Chem. Abstr.*, 1937–1938.

Cimecioglu and East, "Poly(methylene Sebacate)*: Synthesis and Characterization," *J. Polym Sci. Polym. Chem. Ed.*, 30:313–321, 1992.

Cimecioglu et al., "The Synthesis and Characterization of Poly(methylene Terephthalate)," *J. Polym. Sci. Polym Chem. Ed.*, 26:2129–2139, 1988.

Coquard et al., "Bioresorbable Surgical Product," *Chem. Abstr.*, vol. 84, Abstract No. 84:111702j, 1976.

East and Morshed, "The Preparation of Poly(methylene esters)," *Polymer*, 23:1555–1557, 1982.

East and Morshed, "High Molecular Weight Polyesters from Alkali Metal Dicarboxylates and $\alpha$, $\omega$–Dibromo Compounds," *Polymer*, 23:168–170, 1982.

Shelley, Suzanne, "Wanted: The Perfect Asbestos Substitute," *Chem. Eng.*, pp. 59 & 61, 1993.

Kvick and Liminga, "Structure of Methylene Oxalate," *Acta Cryst.*, B36:734–736, 1980.

Dialog Search Report, 1992.

Cimecioglu and East, "Synthesis and Characterization of Linear Aliphatic Poly(methylene dicarboxylate)s from Caesium Dicarboxylates and Bromochloromethane," *Makromol. Chem., Rapid Commun.*, 10:319–324, 1989.

(List continued on next page.)

*Primary Examiner*—Samuel A. Acquah
*Attorney, Agent, or Firm*—Crowe & Dunlevy

[57] ABSTRACT

Poly(alkylene dicarboxylate) polymers and copolymers having tetraalkyl- or trialkylammonium ion end groups and methods of synthesis, thereof. The methylene-containing copolymers, in general, adhere to glass and metals, including aluminum, iron, and copper. Poly(methylene-co-ethylene terephthalate) is a clear film useful in the protection of metals or glass from corrosion or scratching. Glass may be bound to glass or to metal using the polymers of the present invention or metal to metal seals may be made.

3 Claims, 49 Drawing Sheets

OTHER PUBLICATIONS

Fariss, "Fifty Years of Safer Windshields," *Chemtech.*, 32–43, 1993.

Hariharan and Pinkus, "Useful NMR Solvent Mixture for Polyesters: Trifluoroacetic Acid–d/chloroform–d," *Polym. Bulletin.*, 30:91–95, 1993.

Hariharan and Pinkus, "$^1$H and $^{13}$C NMR Solution Spectra and Molecular Weights by End Group Analysis of Relatively Insoluble Polyesters: Polyglycolide, Poly(ethylene terephthalate), Polyhydroxymethylbenzoate and Poly (p–xylene terephthalate), Using a Trifluoroacetic Acid–d/Chloroform–d Mixture," *Polym. Preprints*, 34(1):861–862, 1993.

Markarevich and Sushko, "Spectroscopic manifestation of properties of some ammonium salts," Search regarding: IR and Raman Spectra, 1993.

Nishikubo and Ozaki, "Synthesis of Polyesters by the Reaction of Dicarboxylic Acids with Alkyl Dihalides Using the DBU Methods," *Polym. J.*, 22(12):1043–1050, 1990.

"Crosslinked Vinyl Chloride Resin Foam Compositions," Search regarding: Title components of highly resilient foams, 1993.

Economy and Cottis, "Hydroxybenzoic Acid Polymers," *In: Encyclopedia of Polymer Science and Technology*, vol. 15, pp. 292–306, 1971.

Mathias et al., "A Simple One–Step Synthesis of Unsaturated Copolyesters," *J. Appl. Polym. Sci.*, 38:1037–1051, 1989.

Pétiaud et al., "A $^1$H and $^{13}$C n.m.r. study of the products from direct polyesterification of ethylene glycol and terephthalic acid," *Poly.*, 33(15):3155–3161, 1992.

Pinkus et al., "Polyesters with Aromatic Groups in the Backbone from Reactions of 3– and 4–Bromomethylbenzoic Acids with Triethylamine," *J.M.S—Pure Appl. Chem.*, A29(11), 1031–1047, 1992.

Pinkus and Subramanyam, "New High–Yield, One–Step Synthesis of Polyglycolide from Haloacetic Acids," *J. Polym. Sci.: Polym. Chem. Ed.*, 22:1131–1140, 1984.

Pham et al., *In: Proton & Carbon NMR Spectra of Polymers*, CRC Press, Boca Raton, FL, p. 197, 1991.

International Search Report, mailed Aug. 16, 1994. (BAYU:077P—PCT/US 94/02386).

Gordon et al., *Polym. Prepr. Am. Chem. Soc., Div. Polym. Chem.*, 31, 507, 1990.

Pinkus et al., *J. Polym. Sci. Part A, Polym. Chem.*, 27, 4291, 1989.

Piraner et al., *Makromol. Chem.*, 193, 681, 1992.

Thibeault et al., *J. Polym. Sci., Part A: Polym. Chem.*, 28, 1361, 1990.

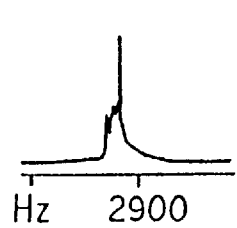
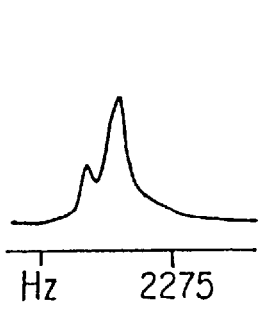
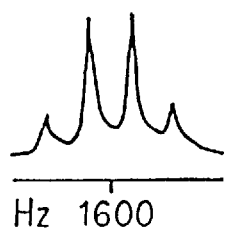
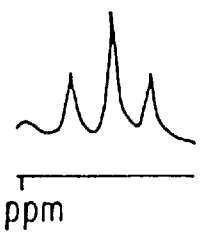
FIG. 6A   FIG. 6B   FIG. 6C   FIG. 6D
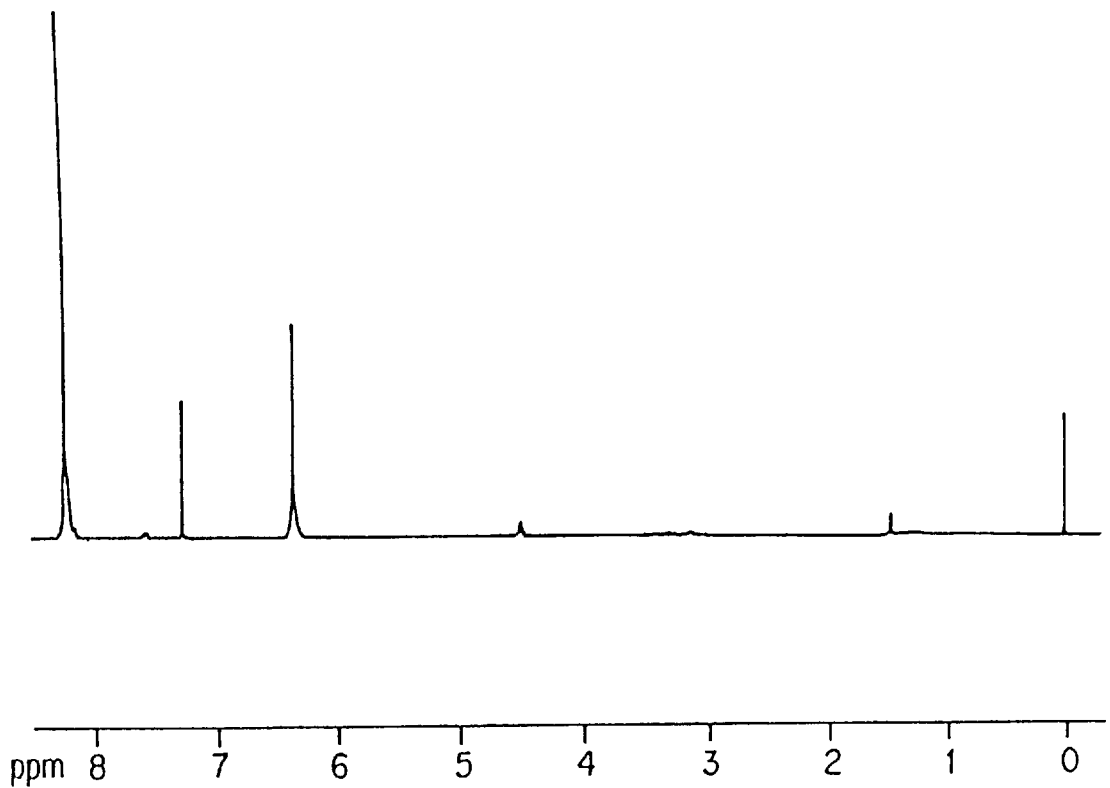
FIG. 6

LAMINATES OF GLASS OR METAL AND POLY(ALKYLENE DICARBOXYLATES) AND SYNTHESES THEREOF

This application is a divisional of U.S. Ser. No. 08/929,969 filed Sep. 15, 1997 now U.S. Pat. No. 5,837,381 which is a divisional application of U.S. Ser. No. 08/123,368 filed Sep. 17, 1993 now U.S. Pat. No. 5,451,643 which is a divisional application of Ser. No. 08/027,134 filed Mar. 5, 1993 now U.S. Pat. No. 5,371,171.

BACKGROUND OF THE INVENTION

Polyoxalates have been previously prepared by ester interchange with diols such as ethylene glycol, 1,3-propanediol, or 1,4-butanediol with diethyloxalate [Carothers et al., *J. Am. Chem. Soc.*, 52, 3292 (1930); Gordon et al., *Polym. Prepr. (Am. Chem. Soc., Div. Polym. Chem.)* 31, 507 (1990); Thibeault et al., *J. Polym. Sci., Pt. A: Polym. Chem.*, 28, 1361 (1990); Shalaby et al., U.S. Pat. No. 4,141,087 (1979)], by reactions of oxalic acid with alkylene glycols [Ellis, U.S. Pat. No. 2,111,762 (1938)], and by condensations of diols with oxaloyl chloride [Piraner et al., *Makromol. Chem.*, 193, 681 (1992)]. Linear polyesters have also been prepared by reactions of dicarboxylic acids and diols [Carothers, U.S. Pat. Nos. 2,071,250 and 2,071,251].

Poly(methylene sebacate) was synthesized via a reaction of cesium sebacate with bromochloromethane (Cimecioglu et al., *Journal of Polymer Science: Part A: Polymer Chemistry*, 30:313–321 (1992); Cimecioglu, A. L. and G. C. East, *Makromol. Chem. Rapid Commun.*, 1989, 10:319), similarly, poly(methylene terephthalate) was synthesized via a reaction of cesium or potassium terephthalate with dibromomethane or bromochloromethane (Cimecioglu et al., *Journal of Polymer Science: Part A: Polymer Chemistry* 26:2129–2139 (1988)). The highest $M_n$ reported by A. L. Cicecioglu and G. C. East, (*J. Polym. Sci., Pt. A: Polym Chem.*, 1992, 30:313) was 42,300; their polymers were prepared by reaction of cesium terephthalate with bromochloromethane in N-methylpyrrolidone. East and Morshed (*Polymer*, (1982) vol. 23:168–170 and 1555–1557) have accomplished the synthesis of poly(methylene esters). Poly (methylene terephthalate) is listed as one of the base layers of a film for cassette-type magnetic tape, however, no reference to a preparation was made. (Shiba, H., DE 3,306,089, Sep. 1, 1983; JP Appl. 82/ut24503, Feb. 23, 1982; *Chem. Abst.*, 1983, 99, 213807).

Poly(ethylene terephthalate) (PET) is a commercially important polyester having many applications. PET is known under trade names Dacron® (DuPont), Mylar® film, Kodel® (Eastman Kodak) and Terylene® (Terene). Of several methods of preparation, the most common is the catalyzed ester interchange between dimethyl terephthalate and ethylene glycol involving removal of methanol to drive the reaction to completion. Poly(ethylene terephthalate) was reportedly prepared by reaction with cesium terephthalate; however, no details are given and the other reactant was not mentioned (G. C. East and M. Morshed, *Polymer*, 1982, 23:168). A commercial sample of poly(ethylene terephthalate) had $M_n$=3,600. Poly(ethylene isophthalate) has been previously synthesized by Nishikubo, T. and K. Ozaki (*Polym. J.* 1990, 22:1043).

Poly(p-xylene terephthalate) was previously prepared by the following method: Reaction of sodium or potassium terephthalates with p-xylylene dichloride or dibromide in the presence of crown ethers (15-crown-S or 18-crown-6). Low yields and low molecular weights were reported. [G. Rokicki, J. Kielkiewicz, and B. Marciniak, *Polimery* (Warsaw), 1982, 27:374; *Chem. Abst.*, 1982, 99:38837].

Poly(m-xylene terephthalate) was reportedly synthesized by reaction of isophthalic acid, 1,8-diazabicyclo-[5.4.0]-7-undecene, and m-xylylene dibromide in dimethylformamide or dimethylsulfoxide. (T. Nishikubo and K. Ozaki, *Polym. J.*, 1990, 22:1043). The polymer was reported to have moderate viscosity (0.19 dlg$^{-1}$).

Bis (tetrabutylammonium) terephthalate was reported as a component in crosslinked vinyl chloride resin foam compositions (Otsuka Chemical Co., Ltd., Jpn. Pat. 582154430, December 1983; *Chem. Abst.*, 1984, 100:175926). IR and Raman spectra have been reported for bis (tetraethylammonium) terephthalate (Makarevich, N. I., and Sushko, N. I., *Zh. Prikl. Specktrosk.*, 1989, 50:65; *Chem. Abst.*, 1989, 110:201792).

Ever since health concerns about asbestos began to surface, producers have been driven to develop suitable alternatives. Traditionally, asbestos has been woven into cloths and garments, compressed into boards, gaskets, and pipe coverings, and used as a filler and reinforcement in paint, asphalt, cement and plastic. To date, no single product has emerged that is as inexpensive, inert, strong or incombustible as asbestos.

The poly(methylene oxalate) (PMO) {systematic name: poly[oxy(1,2-dioxo-1,2-ethanediyl) oxymethylene]}, of the present invention cannot be prepared by any of the methods described above because the glycol that would be needed (HOCH$_2$OH) is not stable under normal conditions but decomposes into formaldehyde and water. Poly(methylene oxalate) has unusual properties useful, for example, in the formulation of objects which are non-flammable and resistant to high temperatures and action of organic solvents.

Based on the synthesis of poly(methylene oxalate), a new synthesis of poly(alkylene dicarboxylates) and copolymers of poly(alkylene dicarboxylates) is provided by the present invention. New copolymers are provided, in particular, methylene copolymers, as well as polymers with new end groups. The methods of the present invention allow the synthesis of polymers and copolymers having molecular weights higher than previously described.

ABBREVIATIONS

DP=Degree of polymerization

M=Number average molecular weight

DSC=Differential scanning calorimetry

SUMMARY OF THE INVENTION

The present invention provides a polymer having the structure

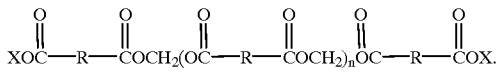

X is a tetraalkyl- or a trialkylammonium ion, R is aliphatic or aromatic and n is a number of repeating units. The present invention also provides a polymer having the structure

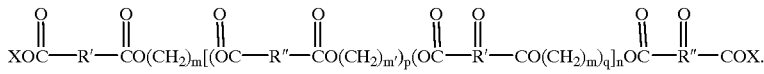

X is a tetraalkyl- or trialkylammonium ion, R' and R" are independently aryl, alkyl or arylalkyl, m and m' are independently 1 or 2, p, q and n are a number of repeating units. The values of p and q will depend upon the ratio of starting materials. In the above polymers, the tetraalkylammonium ion may be $Bu_4N^+$, $Et_4N^+$ or $R'Me_3N^+$, where R' is benzyl or an alkyl larger than butyl. A preferred alkyl is hexadecyl. A preferred trialkylammonium ion is $Et_3HN^+$.

The polymer structures of the present invention include a poly (alkylene) dicarboxylate having a tetraalkyl- or trialkylammonium end group. The alkylene may be methylene, ethylene, p-xylene, m-xylene or 2-E-butene. The dicarboxylate may be terephthalate, sebacate, isophthalate, succinate, or adipate. The tetraalkylammonium end group may be $Bu_4N^+$, $Et_4N^+$ or $R'Me_3N^+$, where R' is benzyl or an alkyl larger than butyl. The trialkylammonium end group may be $Et_3HN^+$.

A further embodiment of the present invention is a poly (alkylenel dicarboxylate1-co-alkylene2 dicarboxylate2) having a tetraalkyl- or trialkylammonium end group. The alkylenel may be methylene, and the alkylene2 may be ethylene, 2-E-butene or p-xylene. The dicarboxylate1 may be terephthalate or oxalate, and the dicarboxylate2 may be terephthalate or oxalate, the tetraalkylammonium end group may be $Bu_4N^+$, $Et4N^+$ or $R'Me_3N^+$, where R' is benzyl or an alkyl larger than butyl, and the trialkylammonium end group may be $Et_3HN^+$.

Further compositions of the present invention include poly(methylene terephthalate-co-ethylene terephthalate), poly(methylene oxalate-co-ethylene oxalate), poly(m-xylene terephthalate) having end groups X, where X is a tetraalkyl- or a trialkylammonium ion, poly(methylene terephthalate-co-2-butenyl terephthalate), poly(methylene terephthalate-co-p-xylene terephthalate), bis (benzyltrimethylammonium) terephthalate, and bis (tetrabutylammonium) sebacate. These polymers may have end groups X, where X is a tetraalkyl- or a trialkylammonium ion. The tetraalkylammonium ion may be $Bu_4N^+$, $Et_4N^+$ or $R'Me_3N^+$, where R' is benzyl or an alkyl larger than butyl, and the trialkylammonium ion may be $Et_3HN^+$.

The present invention provides a first method for preparing a poly(alkylene dicarboxylate) using a tetraalkyl salt. The method comprises the step of reacting a bis($R^1R^2R^3R^4$ ammonium) dicarboxylate with alkylene chloride, alkylene bromide, alkylene iodide or bromochloroalkane in a mutual solvent. $R^1$, $R^2$, $R^3$ and $R^4$ are alkyl or arylalkyl and $R^1$, $R^2$, $R^3$ and $R^4$ are not all methyl. The method is defined further as including the steps of collecting the poly(alkylene dicarboxylate); and removing unreacted reagents. The bromochloroalkane may be bromochloromethane or bromochloroethane. The dicarboxylate may be terephthalate or sebacate.

The present invention provides a second method for preparing a poly(alkylene dicarboxylate) using a trialkyl salt. The method comprises the steps of forming a bis (trialkylammonium) dicarboxylate salt, and reacting the bis(trialkylammonium) dicarboxylate salt with alkylene chloride, alkylene bromide or alkylene iodide. The dicarboxylate may be terephthalate or isophthalate.

A further embodiment of the present invention is a method for preparing a poly(alkylenel-co-alkylene2 dicarboxylate) copolymer. The method includes the step of reacting bis($R^1R^2R^3R^4$ ammonium) dicarboxylate with a mixture of alkylenel bromide and alkylene2 bromide in a mutual solvent. $R^1$, $R^2$, $R^3$ and $R^4$ may be alkyl or arylalkyl and $R^1$, $R^2$, $R^3$ and $R^4$ may not be all methyl. The method is defined further as including the steps of collecting the copolymer, and removing unreacted reagents. The ratio of alkylenel bromide to alkylene2 bromide may be other than one to one. The alkylene2 may be ethylene, p-xylene or 2-butene and the alkylene2 bromide may be ethylene bromide, 1,2 dibromoethane, 1,4 dibromo-2-butene or α,α'-bromo-p-xylene. The dicarboxylate may have the structure $R(CO_2^-)_2$ where R is aryl or vinyl or the dicarboxylate may be terephthalate or oxalate.

A second method for preparing a poly(alkylenel-co-alkylene2 dicarboxylate) includes the use of a trialkyl salt. The method comprises the steps of forming a bis (trialkylammonium) dicarboxylate salt, and reacting the bis(trialkylammonium) dicarboxylate salt with a mixture of alkylenel halide and alkylene2 halide. The alkylenel halide and the alkylene2 halide may be present in a ratio other than one to one. The alkylene2 may be ethylene and the halide may be bromide, chloride or iodide.

The present invention also provides a method for preparing a poly(R' dicarboxylate). The method comprises the step of reacting a bis($R^1R^2R^3R^4$ ammonium) dicarboxylate with a dihalide, X—R'—X in a mutual solvent. $R^1$, $R^2$, $R^3$ and $R^4$ may be alkyl or arylalkyl and $R^1$, $R^2$, $R^3$ and $R^4$ may not be all methyl, X may be bromide, chloride or iodide, and R' may be —$CH_2$—Ar—$CH_2$— or —$CH_2CH=CHCH_2$— where Ar is aromatic, such as 1,4- or 1,3-$C_6H_4$, for example. R' may be 2-E-butene and X—R'—X may be 1,4 dibromo-2-E-butene.

A second method for preparing a poly(R' dicarboxylate) comprises the use of a trialkyl salt. The method includes the steps of forming a bis(trialkylammonium) dicarboxylate salt; and reacting the bis(trialkylammonium) dicarboxylate salt with α,α'-dibromo-R' or α,α'-dichloro-R'. R' may be p-xylene, m-xylene or 2-E-butene.

The present invention also provides a method for preparing a bis(tetraalkylammonium) dicarboxylate salt. The method includes the step of reacting a dicarboxylic acid with tetraalkyl ammonium hydroxide. The dicarboxylic acid may be terephthalic acid or sebacic acid. The tetraalkyl ammonium hydroxide may be tetrabutyl-, tetraethyl- or benzyltrimethylammonium hydroxide. In each of the above methods, $R^1$, $R^2$, $R^3$ and $R^4$ may be ethyl or butyl or $R^1$, $R^2$, and $R^3$ may be methyl and $R^4$ may be benzyl or an alkyl larger than butyl. A preferred alkyl is hexadecyl. The alkylene may be methylene or ethylene, the alkylenel may be methylene, and the bis(trialkylammonium) may be bis (triethylammonium). The dicarboxylate may be terephthalate.

The present invention further provides for multilayered structures comprising a poly(methylene dicarboxylate1-coalkylene dicarboxylate2) copolymer layer with a first and second side and a metal or glass layer adherent to one or both sides. The particular copolymers employed are those which exhibit adhesive interactions with at least one of metal and glass. Such adhesive interactions are readily identified by simply applying a subject copolymer in a liquid form to a metal or glass surface and observing it, upon conversion to a solid state, if there is noticeable significant adhesion between the polymer and the surface.

In a preferred embodiment a metal layer or structure may be protected by formation of a copolymer layer thereupon. This copolymer layer, in addition to potentially being a protective layer for the metal surface, may also form the basis for the addition of a second layer of metal or glass, the adherence being mediated by the adherent copolymer of the present invention when the second layer is contacted with the still liquid copolymer.

The adherency of the dicarboxylate1-co-alkylene dicarboxylate2 copolymer to metal or glass may be modified by the particular dicarboxylates utilized and the proportion of the particular alkylene substituents. In one preferred embodiment, the alkylene substituent must be greater than 12% methylene. Again, the adherency of the subject copolymers may be simply tested and determined by only reasonable experimentation.

In certain cases, the particular copolymer utilized may be one which retains maleability at ambient temperatures. This maleability will serve, for example, to prepare glass-copolymer-glass multilayered structures akin to safety glass commonly utilized.

Preferred dicarboxylate functions are terephthalates although others may perform likewise and are readily tested. The alkylenes utilized in copolymer formation are preferably ethylene, p-xylene or but-2-ene, in addition of course to methylene.

The present invention includes a method of preparing multilayered structures with a poly(methylene dicarboxylate1-co-alkylene dicarboxylate2) copolymer layer having adhesion for glass or metal surfaces and having a glass or metal layer adherent to both sides. The method comprises first providing at least two metal or glass layers, each layer having at least one surface. Next, a poly (methylene dicarboxylate1-co-alkylene dicarboxylate2) copolymer having adhesive character for metal or glass is converted to a liquid state, preferably by melting. At least one of the metal or glass surfaces is then coated with the molten copolymer. Then a coated surface is contacted with another coated surface or an uncoated surface of metal or glass to form a multilayered structure. Various metals may be utilized in the formation of such multilayered structures, including aluminum, iron and copper. For the particular copolymers, dicarboxylate1 may be the same or different from dicarboxylate2.

Another aspect of the present invention is a method of using a poly(alkylene1 dicarboxylate1-co-alkylene2 dicarboxylate2) copolymer as an agent for protecting a surface from corrosion or scratching. The method comprises the steps of melting the poly(alkylene1 dicarboxylate1-co-alkylene2 dicarboxylate2) copolymer to form a molten copolymer and coating the surface with the molten copolymer to form a copolymer-coated surface.

The methods of the present invention allow the synthesis and use of polymers and copolymers having molecular weights higher than those previously described. The synthesis does not use cesium, instead, the synthesis uses a tetraalkyl salt as an intermediate in the synthesis of the polymers and copolymers.

BRIEF DESCRIPTION OF THE DRAWINGS

FIG. 5A shows:

a is Poly(methylene oxalate), b is Poly(methylene oxalate-co-ethylene oxalate), c is Poly(ethylene terephthalate), d is Poly(methylene terephthalate), e is Poly(methylene isophthalate), and f is Poly(ethylene isophthalate).

FIG. 5B shows:

g is Poly(methylene terephthalate-co-ethylene terephthalate), h is Poly(p-xylene terephthalate), i is Poly(m-xylene terephthalate), and j is Poly(methylene terephthalate-co-p-xylene terephthalate).

FIG. 5C shows:

k is Poly(2-E-butenyl terephthalate), l is Poly(methylene terephthalate-co-2-E-butenyl terephthalate), m is Poly(methylene sebacate), and n is Poly (methylene sebacate-co-ethylene sebacate).

FIG. 6 show a $^1$H NMR spectrum in CDCl$_3$/TFAD mixture of poly(methylene terephthalate) obtained by the reaction of methylene bromide with terephthalic acid and triethylamine in DMF.

Figure 7A:
Figure 7B:
Figures 7C, 7D:
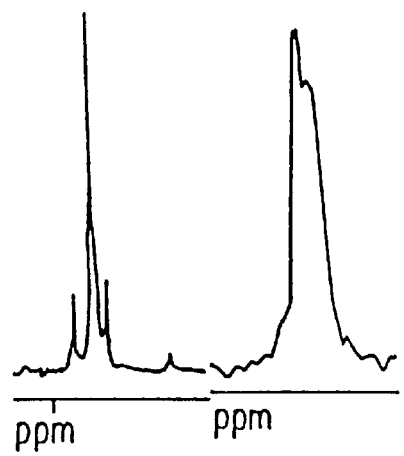
Figure 7:
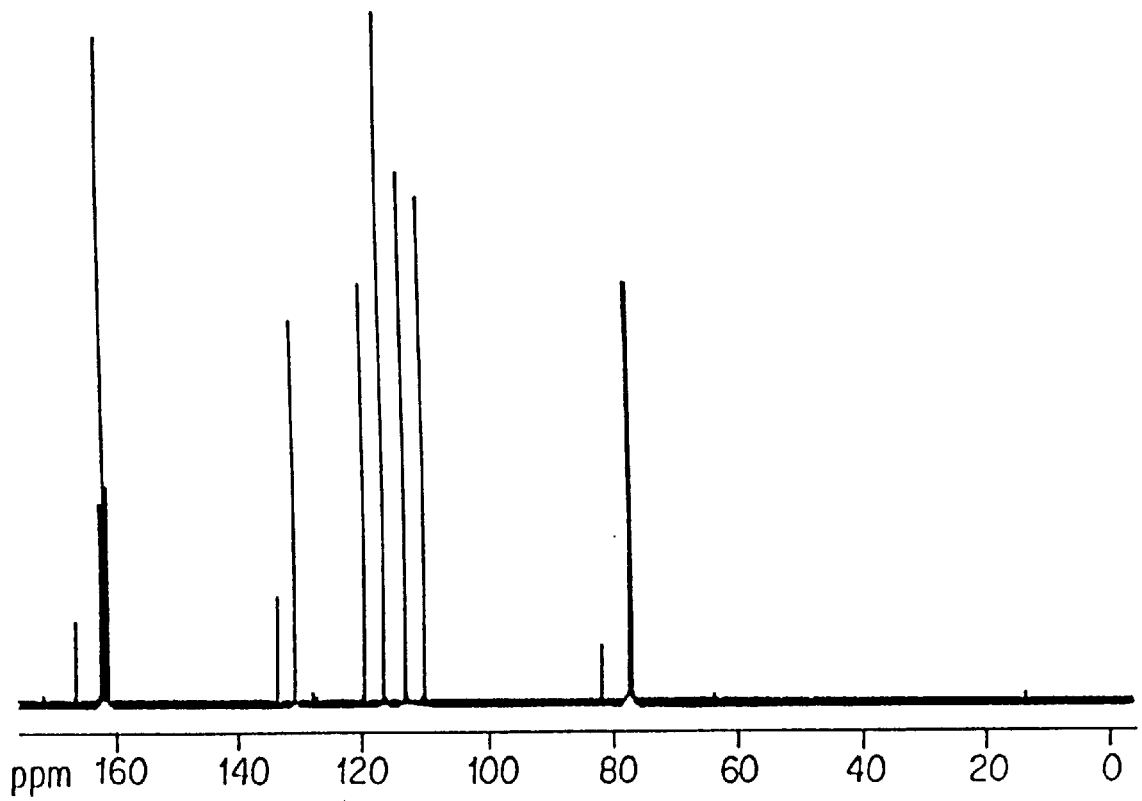

FIG. 7 shows a $^{13}$C NMR spectrum in CDCl$_3$/TFAD mixture of poly(methylene terephthalate) obtained by the reaction of methylene bromide with terephthalic acid and triethylamine in DMF.

Figure 8A:
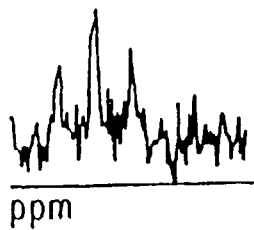
Figure 8B:
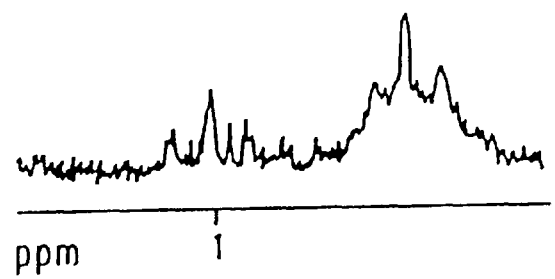
Figure 8:
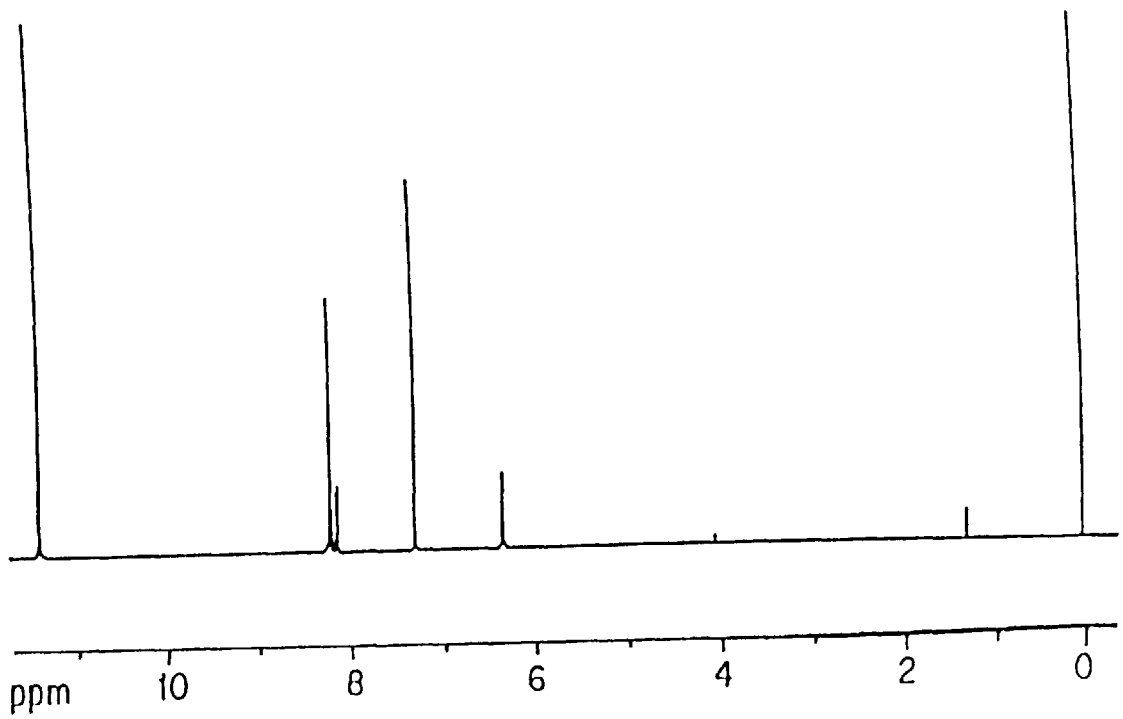

FIG. 8 shows a $^1$H NMR spectrum in CDCl$_3$/TFAD mixture of poly(methylene terephthalate) obtained by the reaction of methylene bromide and bis (tetrabutylammonium) terephthalate in chlorobenzene.

Figure 9:
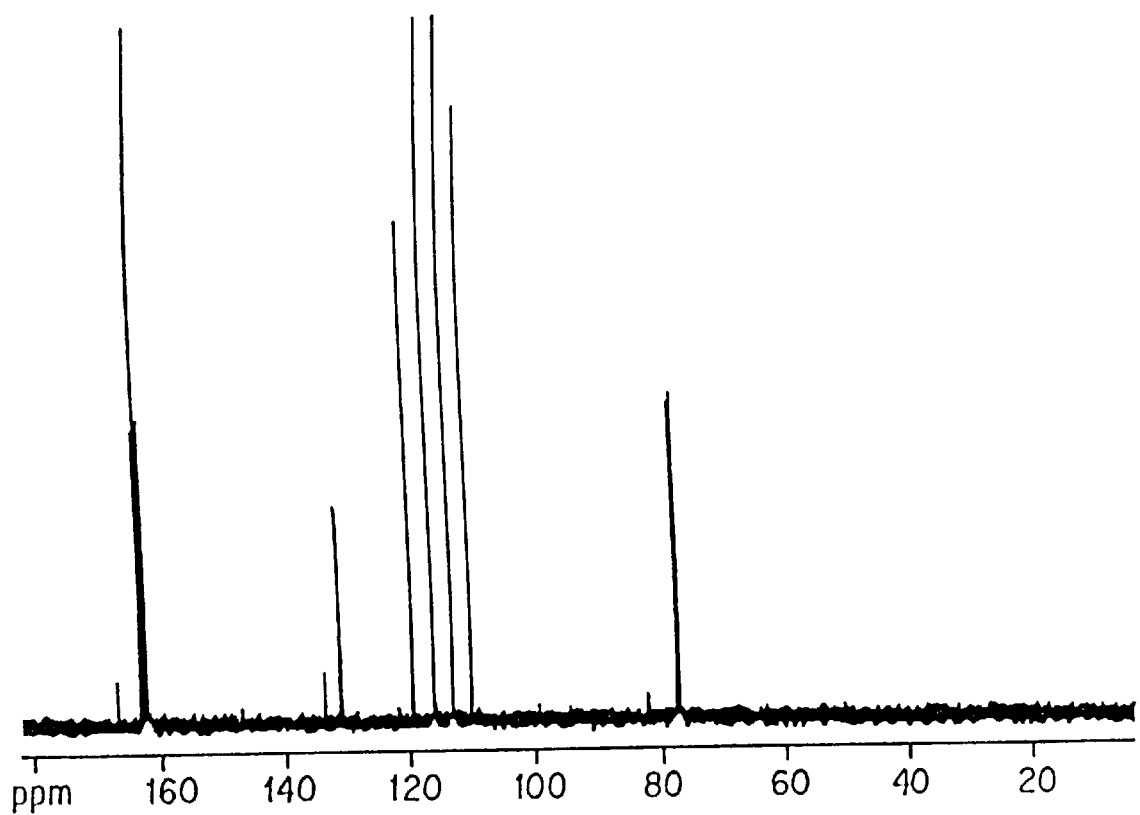

FIG. 9 shows a $^{13}$C NMR spectrum in CDCl$_3$/TFAD mixture of poly(methylene terephthalate) obtained by the reaction of methylene bromide and bis (tetrabutylammonium) terephthalate in chlorobenzene.

Figure 10:
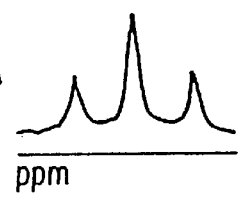
Figure 10:
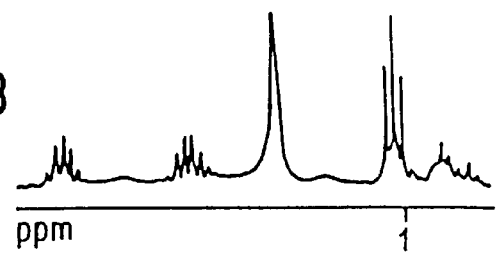
Figure 10:
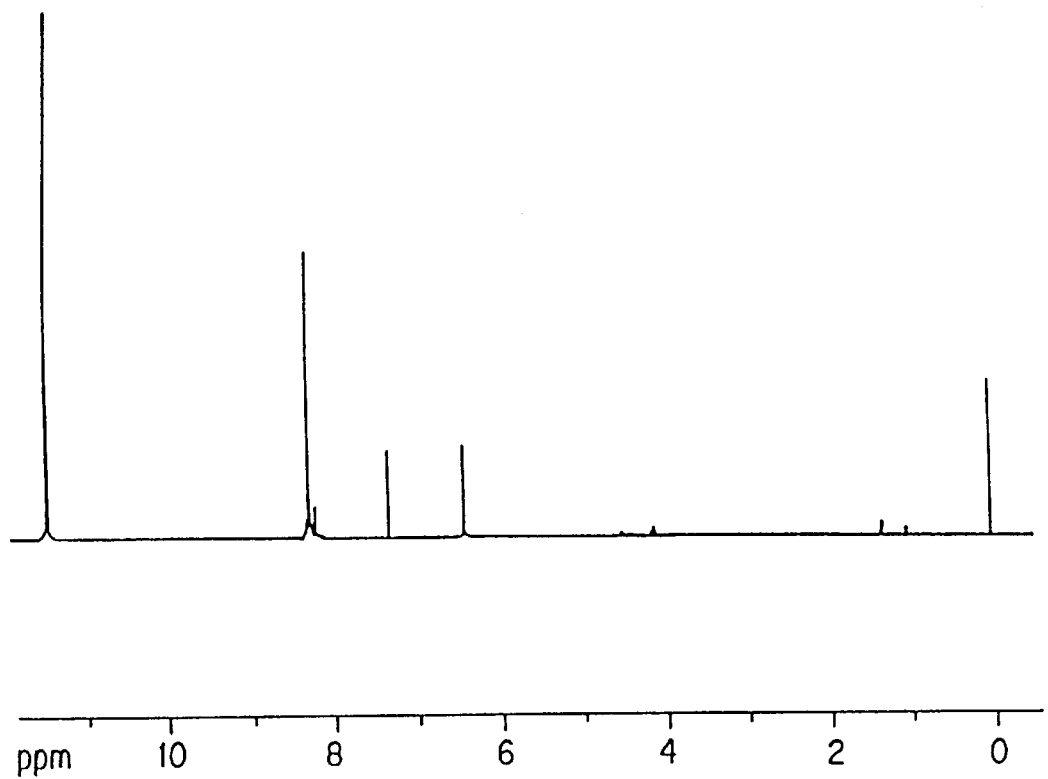

FIG. 10 shows a $^1$H NMR spectrum in CDCl$_3$/TFAD mixture of poly(methylene terephthalate) obtained by the reaction of methylene chloride and bis (tetrabutylammonium) terephthalate in DMF.

Figures 11A, 11B:
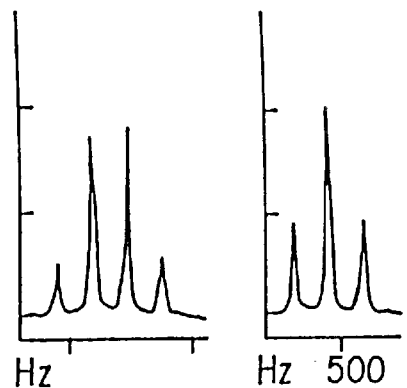
Figure 11:
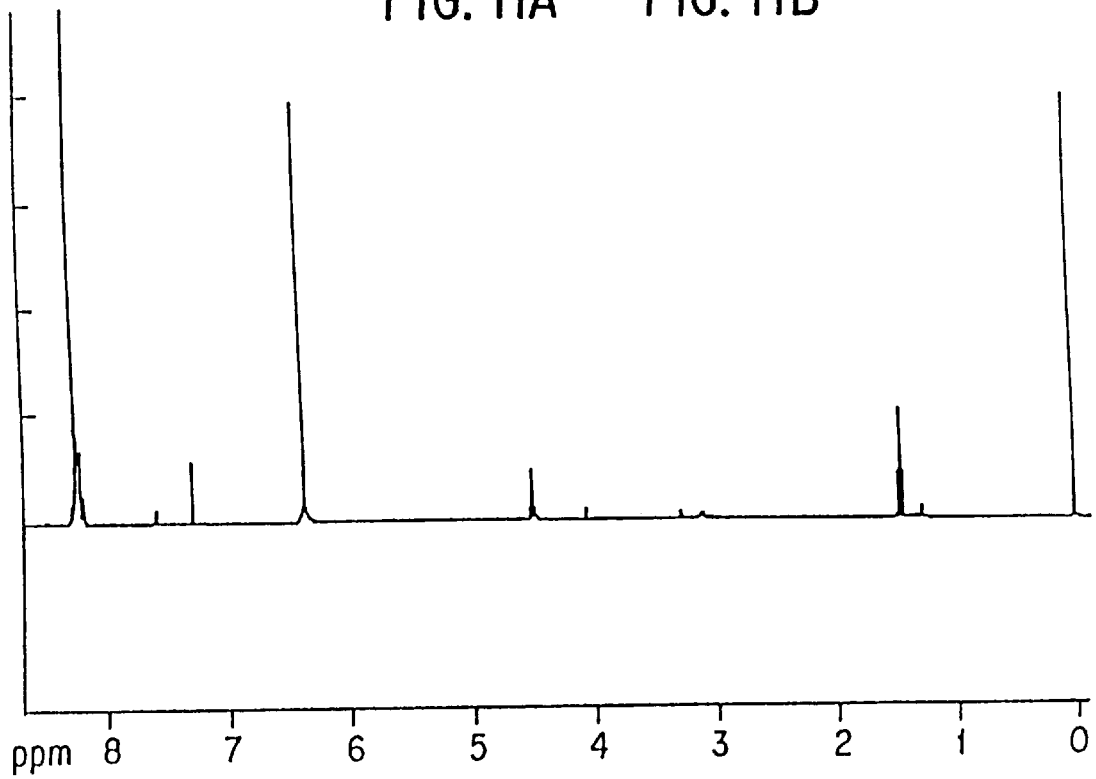

FIG. 11 shows a $^1$H NMR spectrum in CDCl$_3$/TFAD mixture of poly(methylene terephthalate) obtained by the reaction of methylene chloride and bis (tetraethylammonium) terephthalate in DMF.

Figure 12:
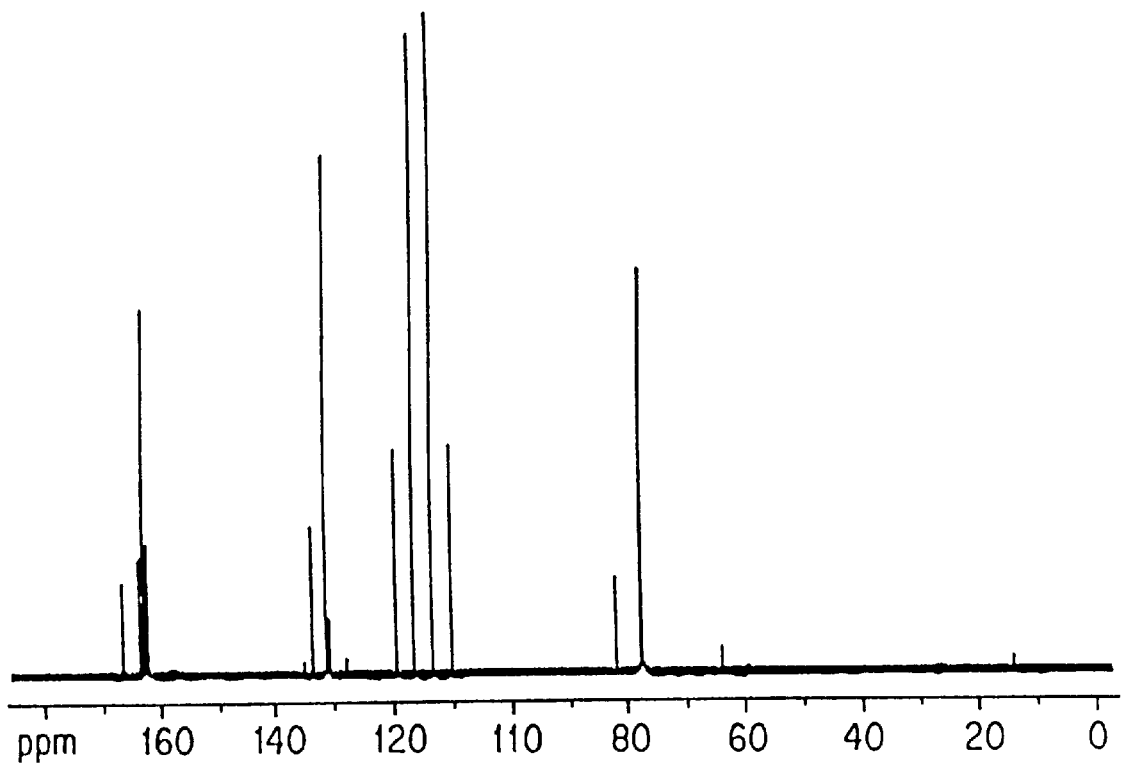

FIG. 12 shows a $^{13}$C NMR spectrum in CDCl$_3$/TFAD mixture of poly(methylene terephthalate) obtained by the reaction of methylene chloride and bis (tetraethylammonium) terephthalate in DMF.

Figures 13, 13A:
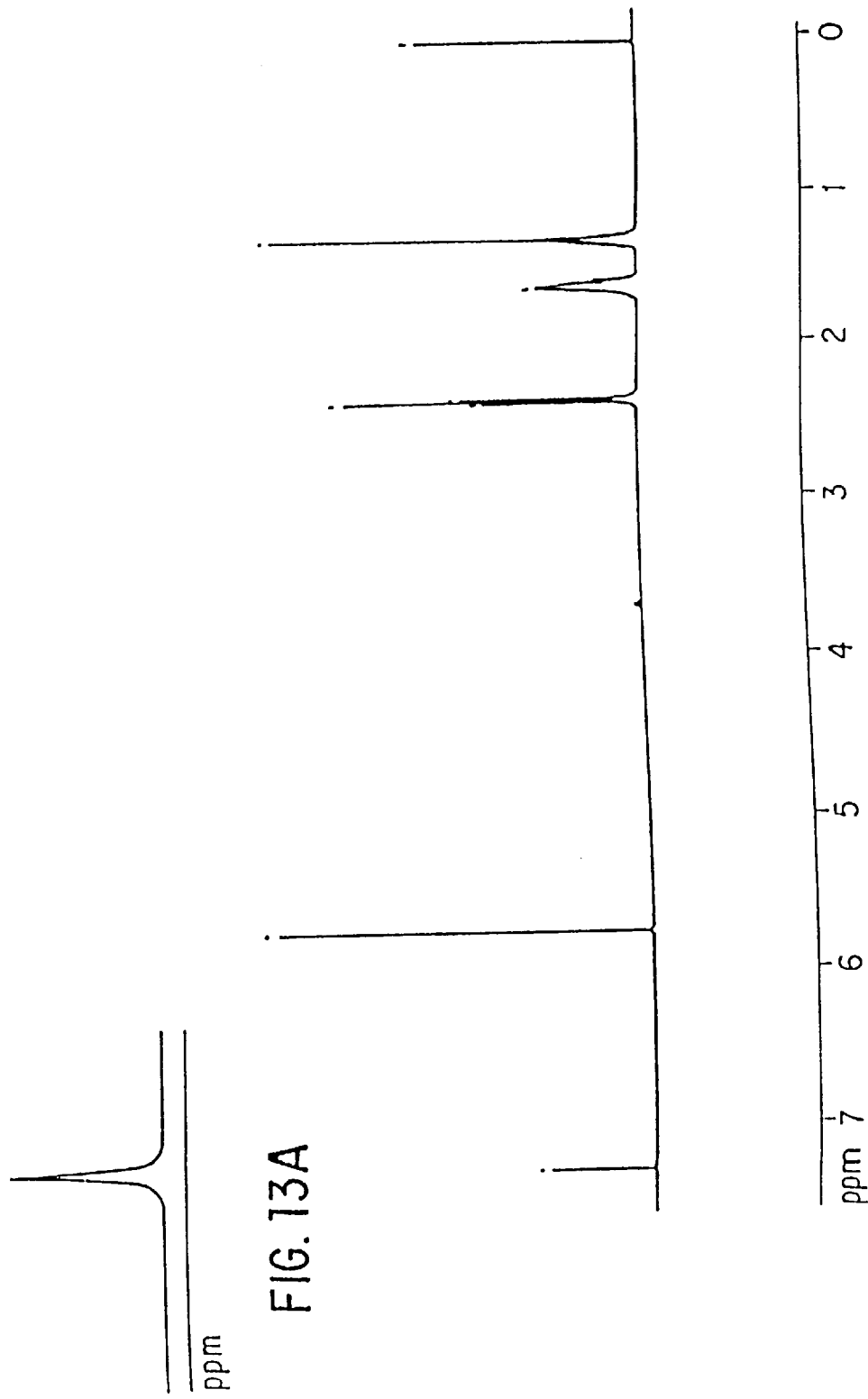

FIG. 13 shows a $^1$H NMR spectrum in CDCl$_3$ of poly (methylene sebacate) obtained by the reaction of bis (tetrabutylammonium) sebacate with methylene bromide.

Figure 14A:
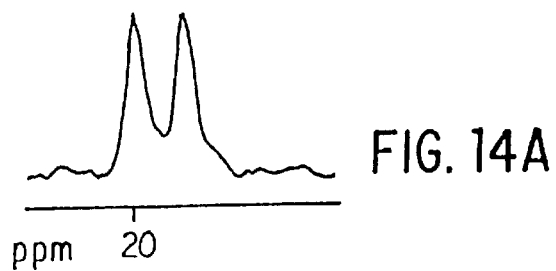
Figure 14:
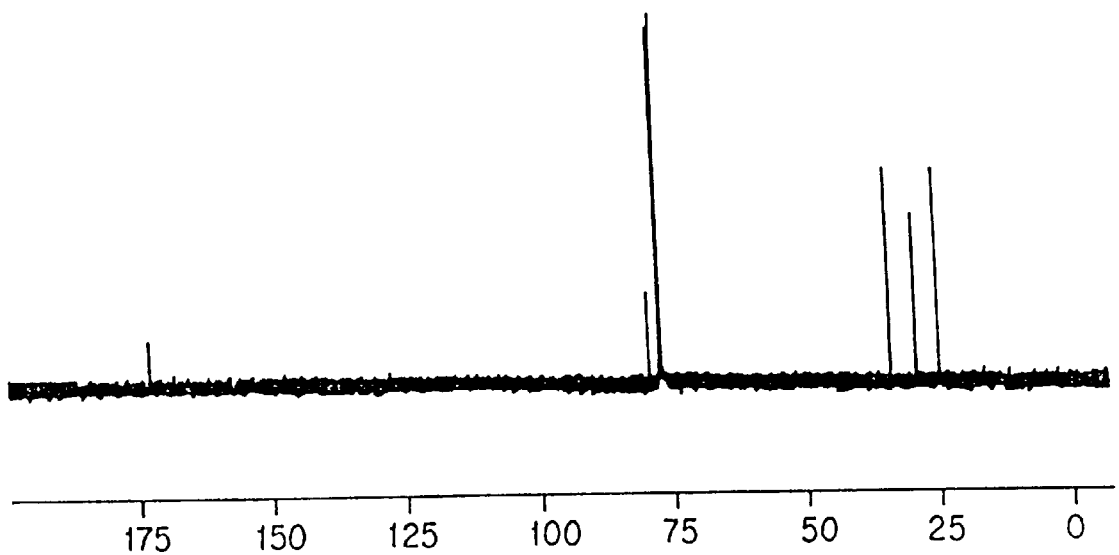

FIG. 14 shoes a $^{13}$C NMR spectrum in CDCl$_3$ of poly (methylene sebacate) obtained by the reaction of bis (tetrabutylammonium) sebacate with methylene bromide.

Figure 15:
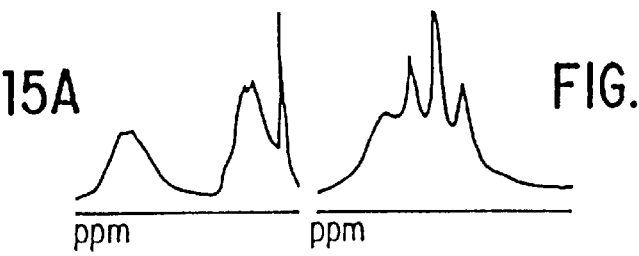
Figure 15:
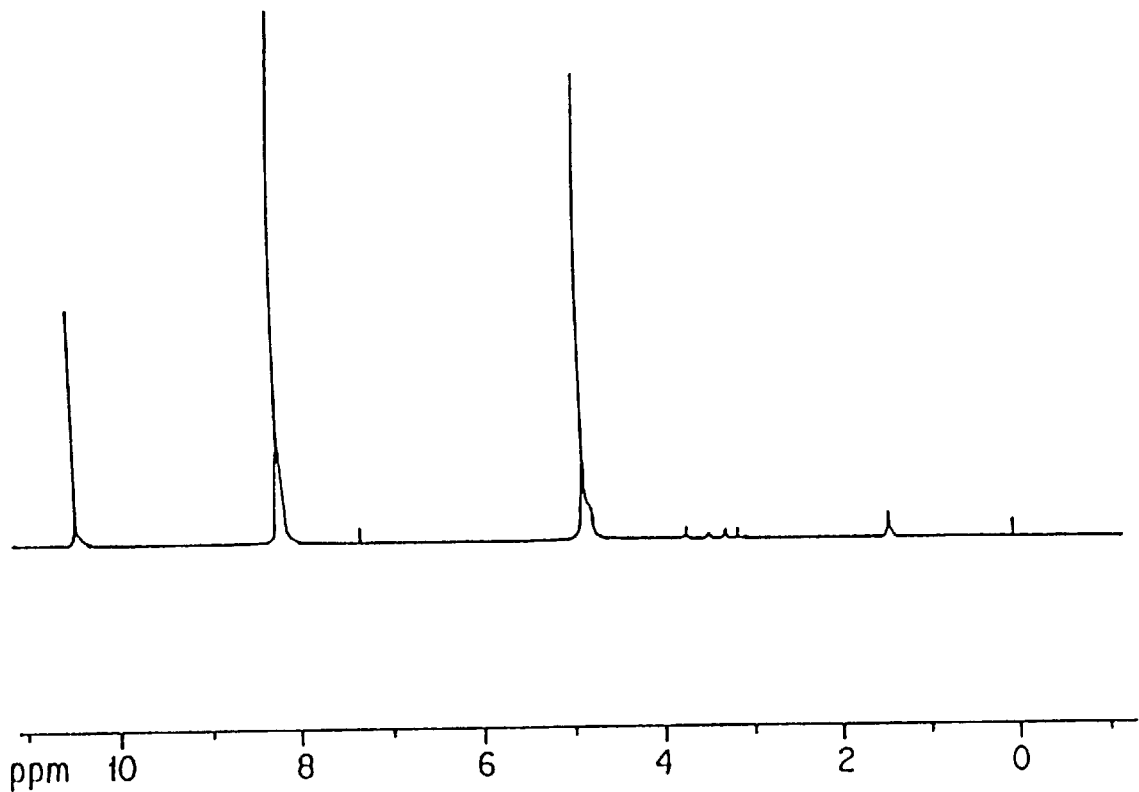

FIG. 15 shows a $^1$H NMR spectrum in CDCl$_3$/TFAD mixture of poly(ethylene terephthalate) obtained by the reaction of ethylene bromide with terephthalic acid and triethylamine in DMF.

Figure 16:
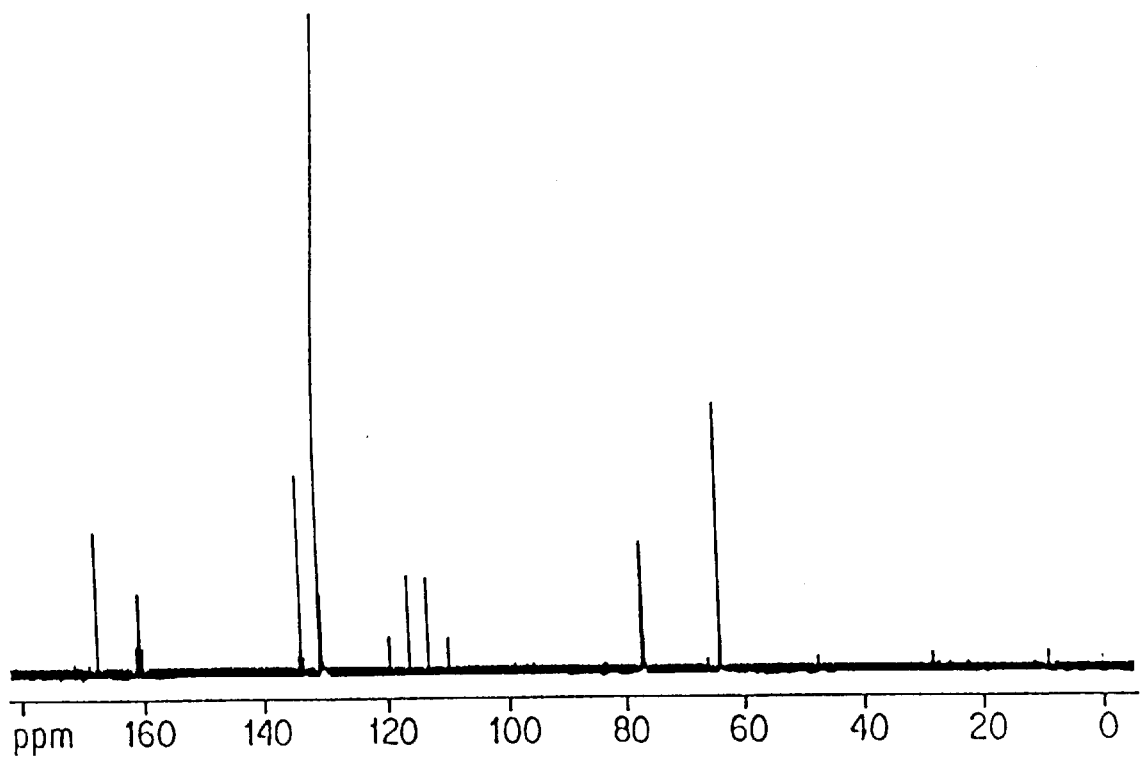

FIG. 16 shows a $^{13}$C NMR spectrum in CDCl$_3$/TFAD mixture of poly(ethylene terephthalate) obtained by the reaction of ethylene bromide with terephthalic acid and triethylamine in DMF.

Figures 17, 17A, 17B:
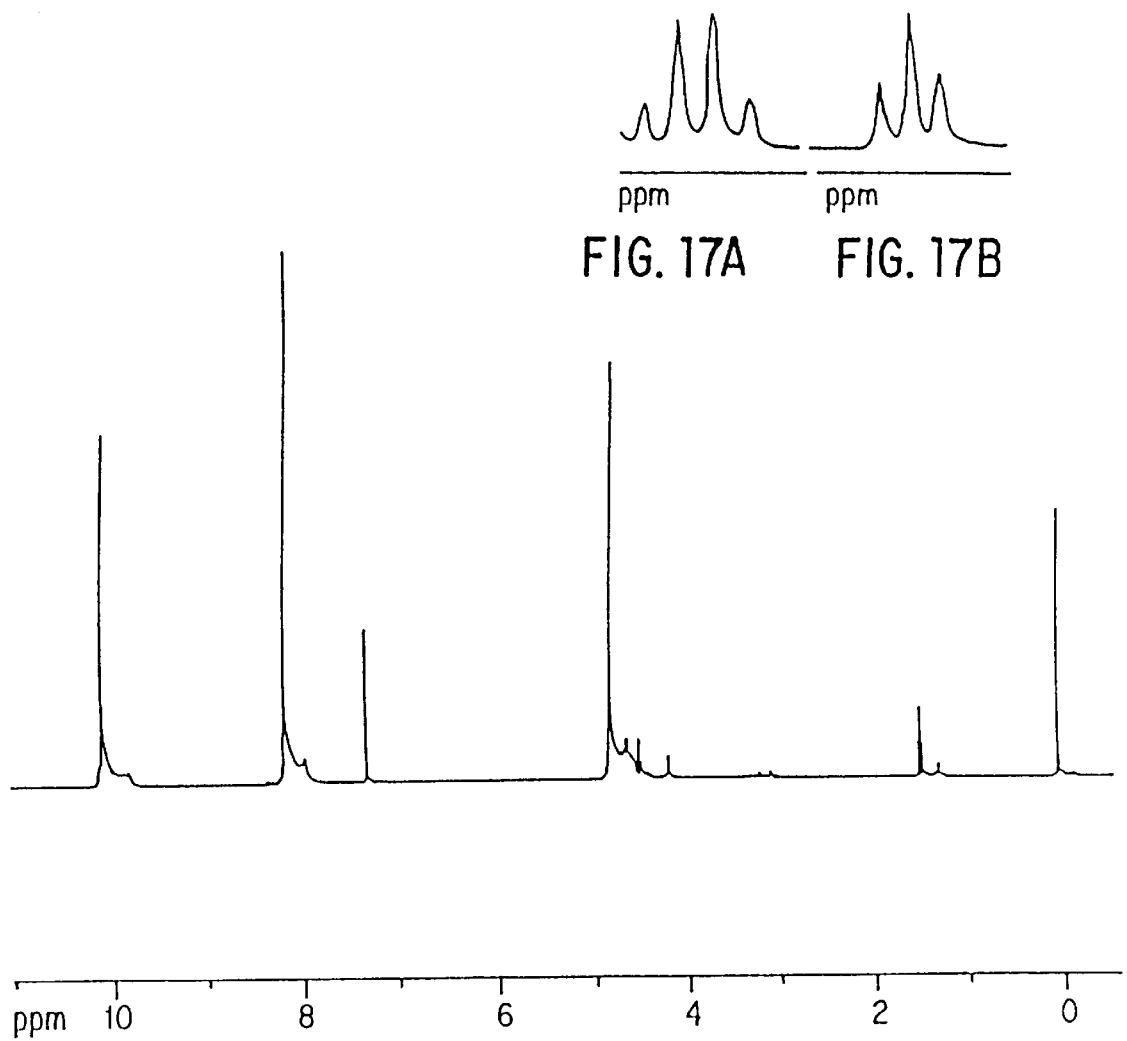

FIG. 17 shows a $^1$H NMR spectrum in CDCl$_3$/TFAD mixture of poly(ethylene terephthalate) obtained by the reaction of ethylene bromide and bis(tetraethylammonium) terephthalate in DMF.

Figure 18:
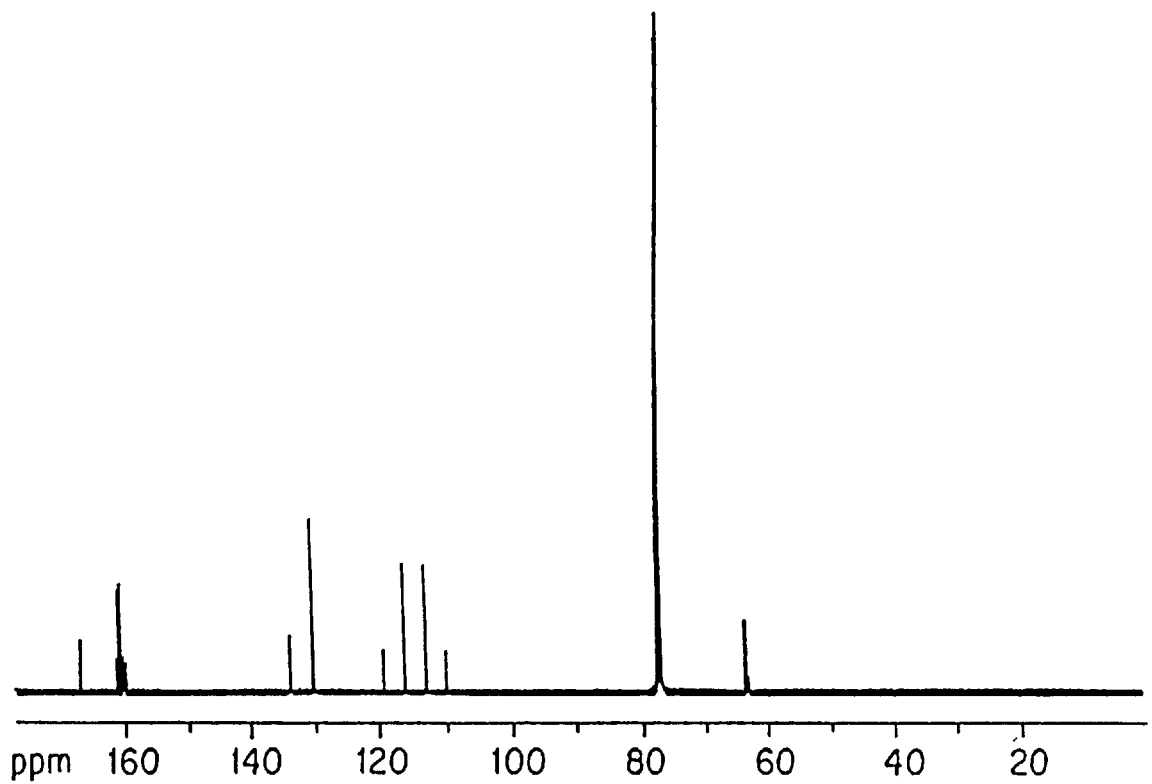

FIG. 18 shows a $^{13}$C NMR spectrum in CDCl$_3$/TFAD mixture of poly(ethylene terephthalate) obtained by the reaction of ethylene bromide and bis(tetraethylammonium) terephthalate in DMF.

Figure 19:
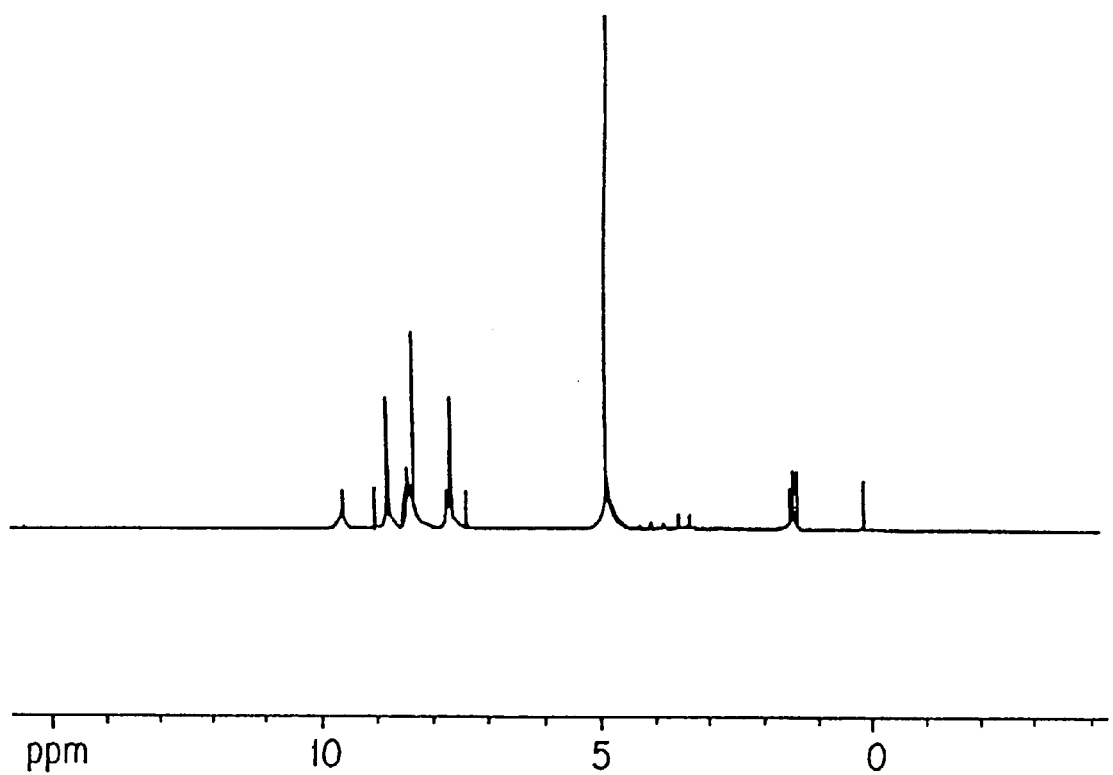

FIG. 19 shows a $^1$H NMR spectrum in CDCl$_3$/TFAD mixture of poly(ethylene isophthalate) obtained by the reaction of ethylene chloride with isophthalic acid and triethylamine in DMF.

Figure 20:
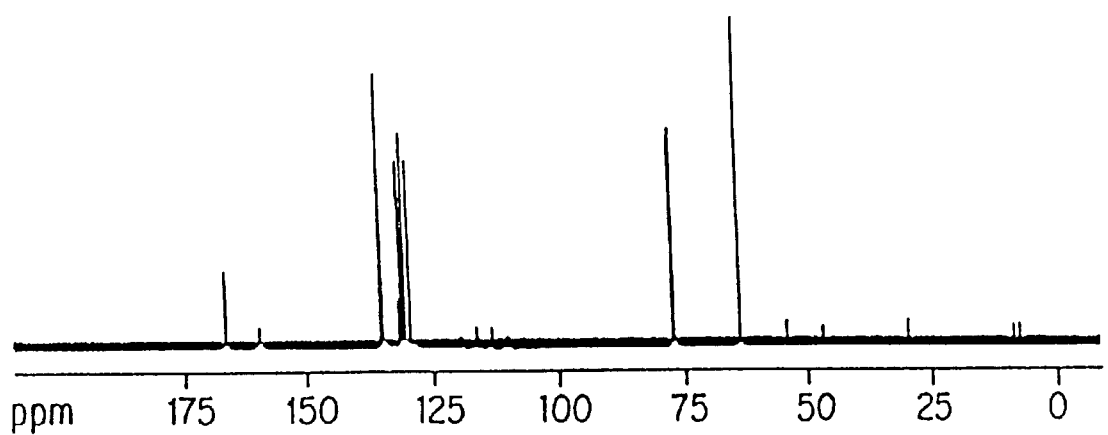

FIG. 20 shows a $^{13}$C NMR spectrum in CDCl$_3$/TFAD mixture of poly(ethylene isophthalate) obtained by the reaction of ethylene chloride with isophthalic acid and triethylamine in DMF.

Figure 21:
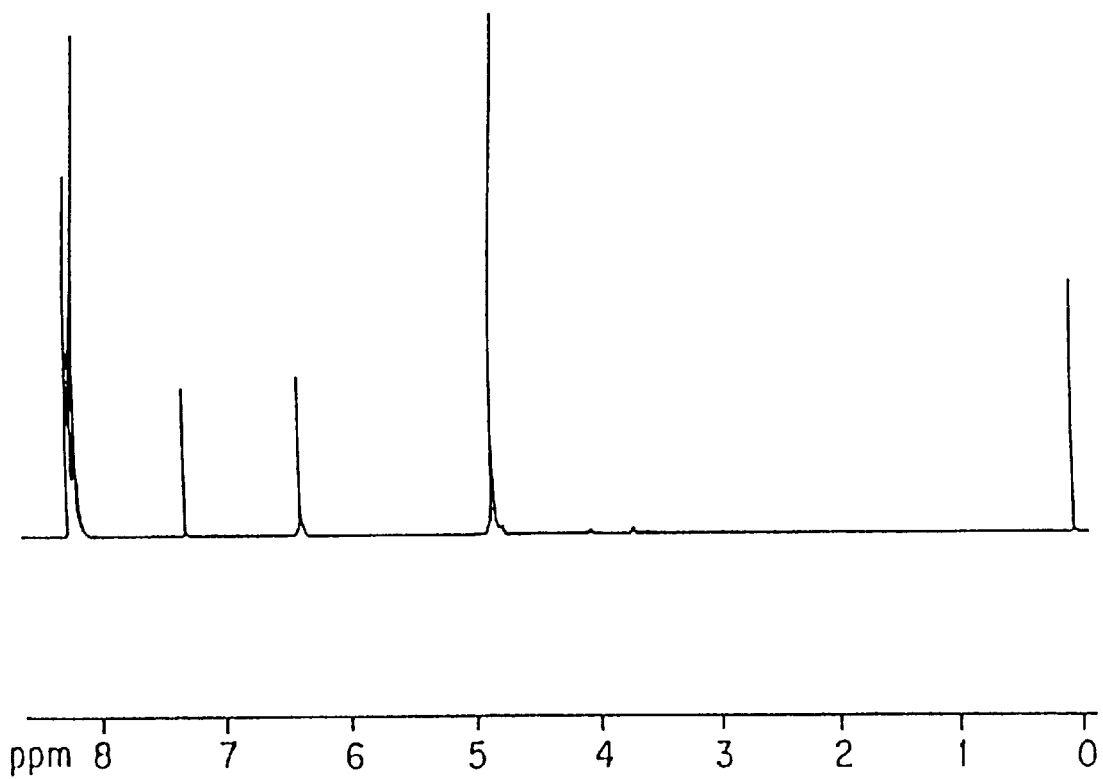

FIG. 21 shows a $^1$H NMR spectrum in CDCl$_3$/TFAD mixture of poly(methylene-co-ethylene terephthalate) (1:1 mole ratio added; 43:57 incorporation) obtained by the reaction of methylene bromide and ethylene bromide with bis(tetrabutylammonium terephthalate) in chlorobenzene.

Figure 22:
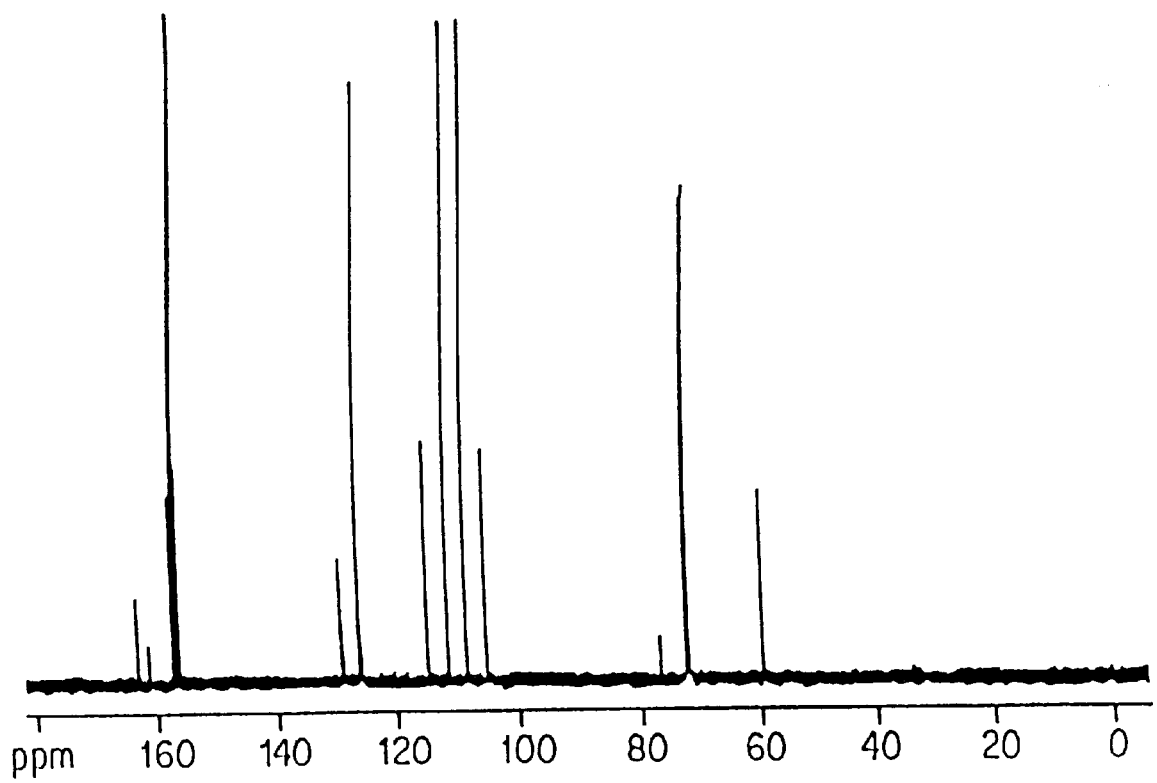

FIG. 22 shows a $^{13}$C NMR spectrum in CDCl$_3$/TFAD mixture of poly(methylene-co-ethylene terephthalate) (1:1 mole ratio added; 43:57 incorporation) obtained by the reaction of methylene bromide and ethylene bromide with bis(tetrabutylammonium terephthalate) in chlorobenzene.

Figure 23:
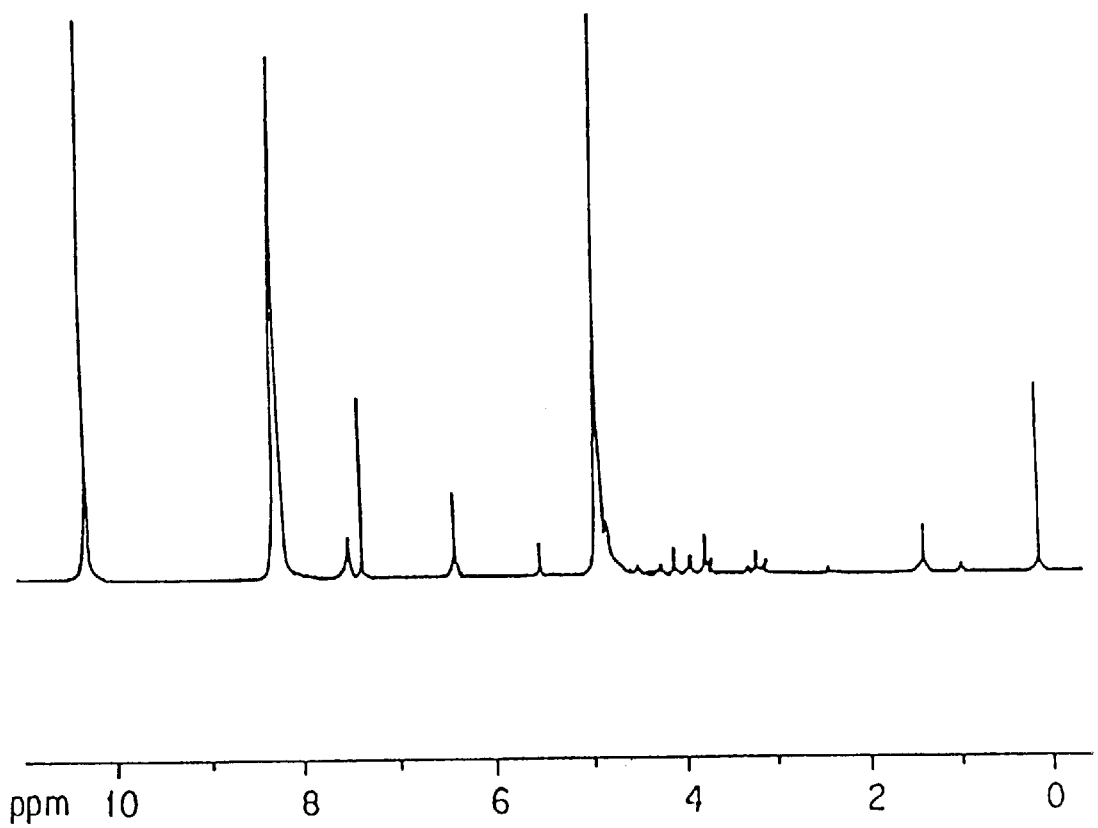

FIG. 23 shows a $^1$H NMR spectrum in CDCl$_3$/TFAD mixture of poly(methylene-co-ethylene terephthalate) (63:37 mole ratio added; 21:79 incorporation) obtained by the reaction of methylene bromide and ethylene bromide with bis(benzyltrimethylammonium terephthalate) in chlorobenzene.

Figure 24:
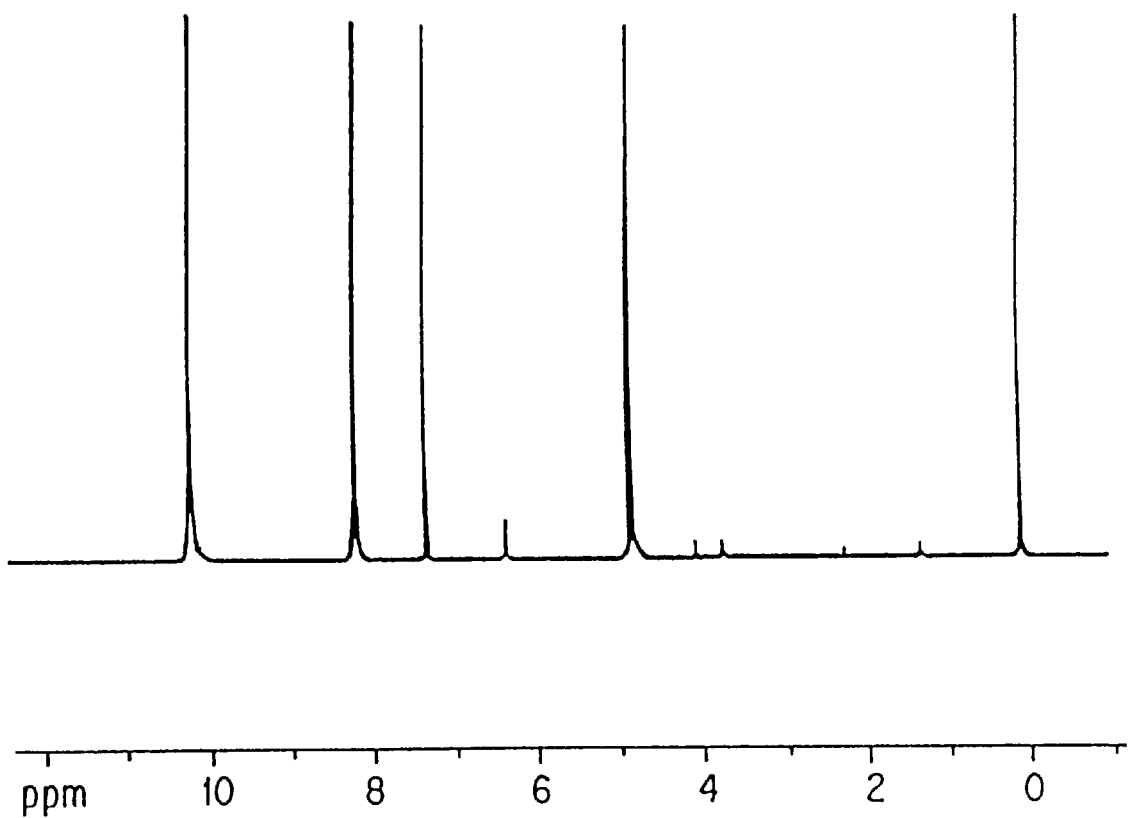

FIG. 24 shows a $^1$H NMR spectrum in CDCl$_3$/TFAD mixture of poly(methylene-co-ethylene terephthalate) (17:83 mole ratio added; 12:88 incorporation) obtained by the reaction of methylene bromide and ethylene bromide with bis(tetrabutylammonium terephthalate) in chlorobenzene.

Figures 25, 25A:
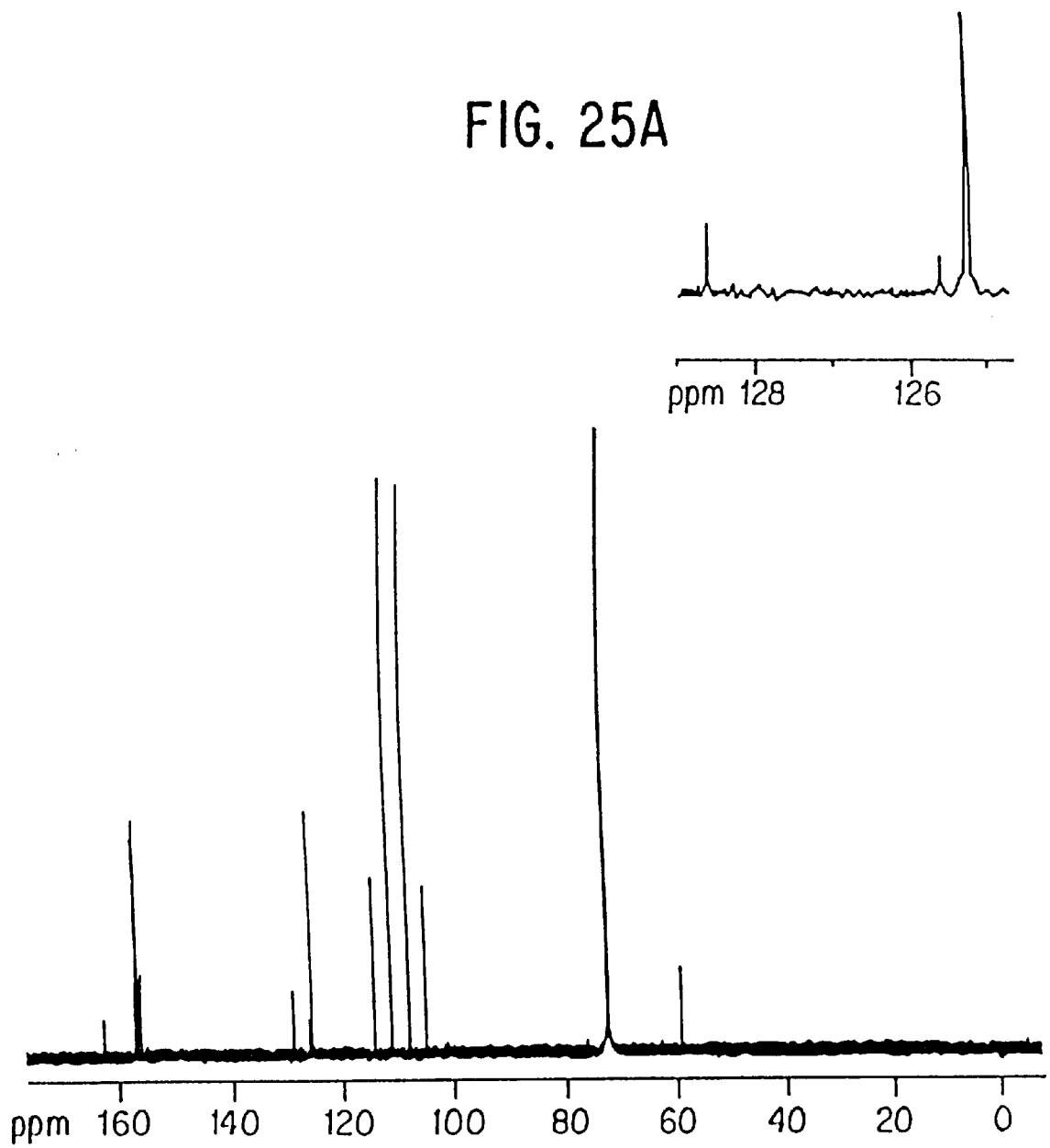

FIG. 25 shows a $^{13}$C NMR spectrum in CDCl$_3$/TFAD mixture of poly(methylene-co-ethylene terephthalate) (17:83 mole ratio added; 12:88 incorporation) obtained by the reaction of methylene bromide and ethylene bromide with bis(tetrabutylammonium terephthalate) in chlorobenzene.

Figure 26:
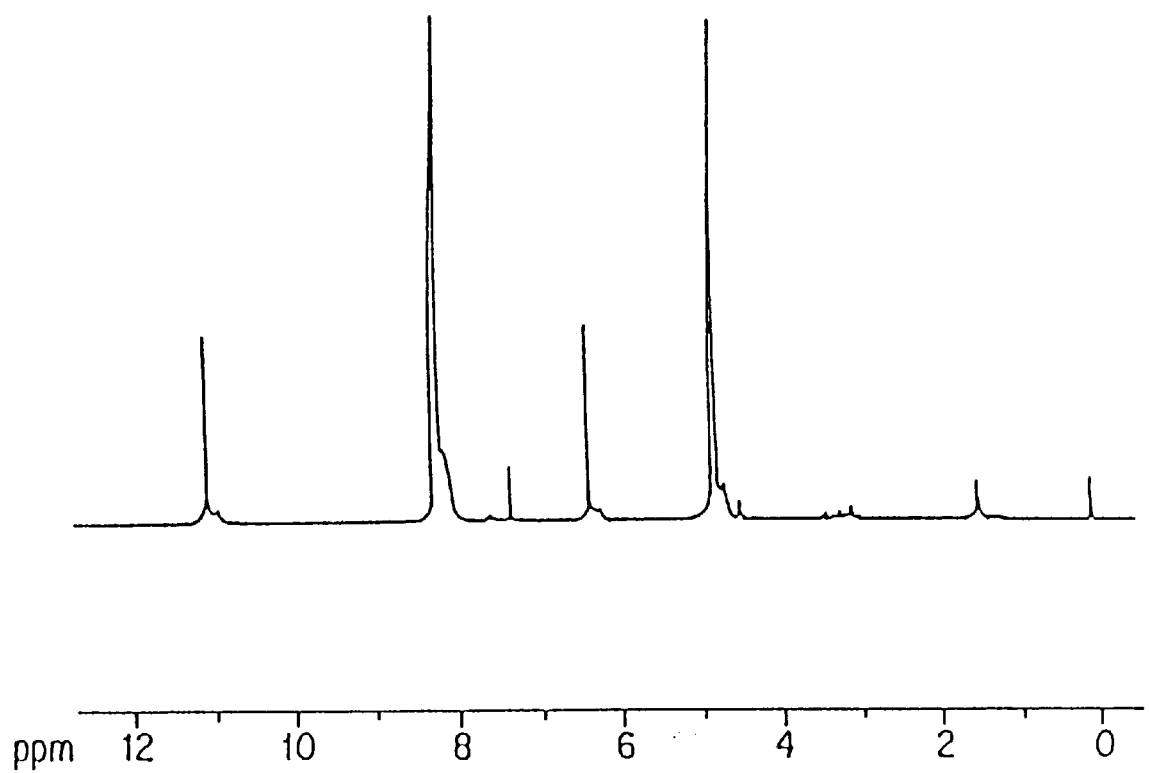

FIG. 26 shows a $^1$H NMR spectrum in CDCl$_3$/TFAD mixture of poly(methylene-co-ethylene terephthalate) (1:1 mole ratio added; 36:64 incorporation) obtained by the reaction of ethylene chloride with terephthalic acid and triethylamine in DMF.

Figure 27:
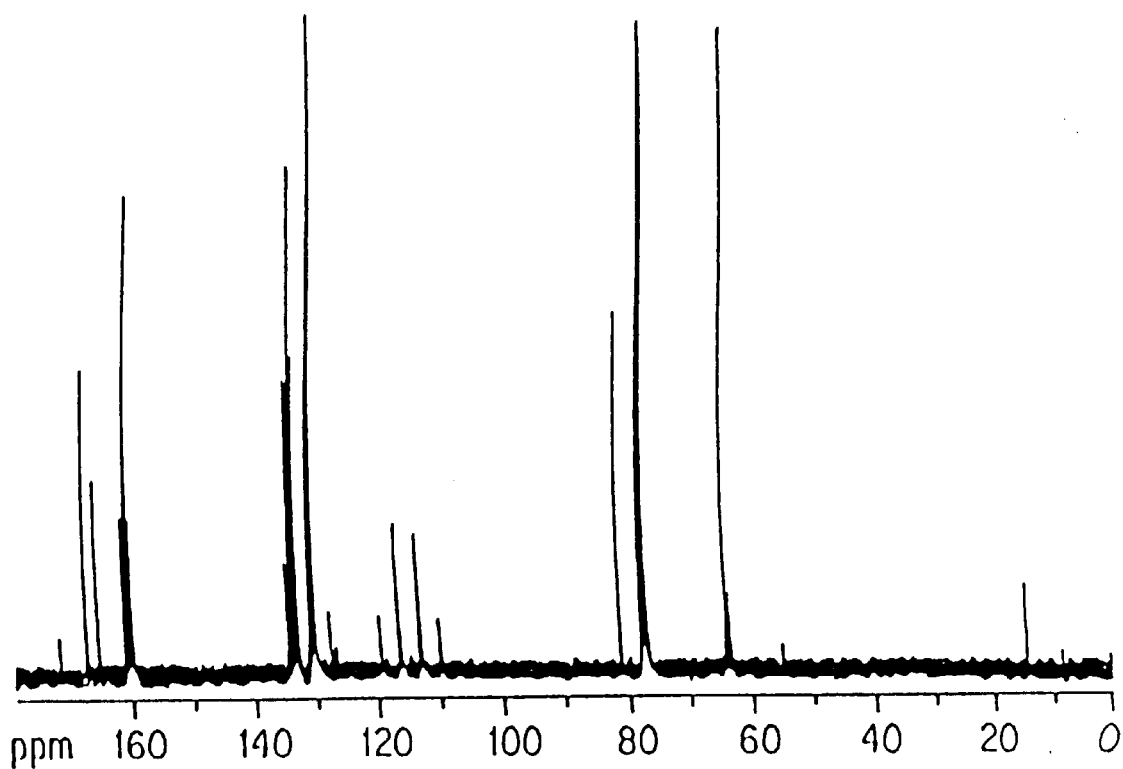

FIG. 27 shows a $^{13}$C NMR spectrum in CDCl$_3$/TFAD mixture of poly(methylene-co-ethylene terephthalate) (1:1 mole ratio added; 36:64 incorporation) obtained by the reaction of ethylene chloride with terephthalic acid and triethylamine in DMF.

Figure 28:
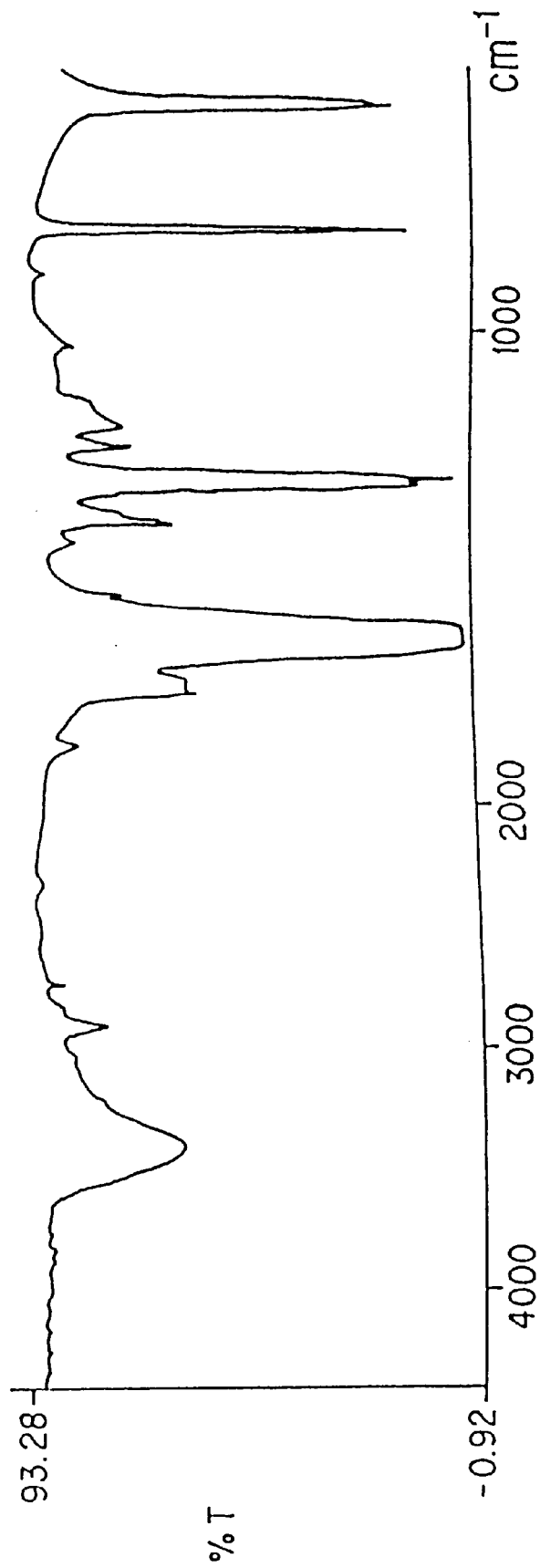

FIG. 28 shows an IR spectrum by KBr pressed pellet of poly(methylene oxalate-co-ethylene oxalate) obtained by the reaction of methylene bromide and ethylene bromide (1:1 mole ratio) with bis(tetrabutylammonium oxalate) in chlorobenzene.

Figure 29A:
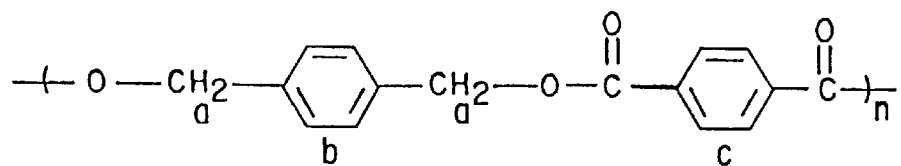
Figures 29B, 29C:
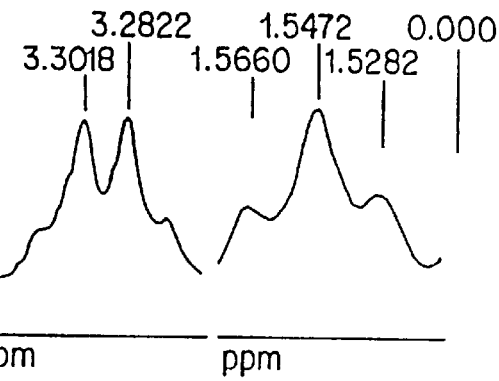
Figure 29:
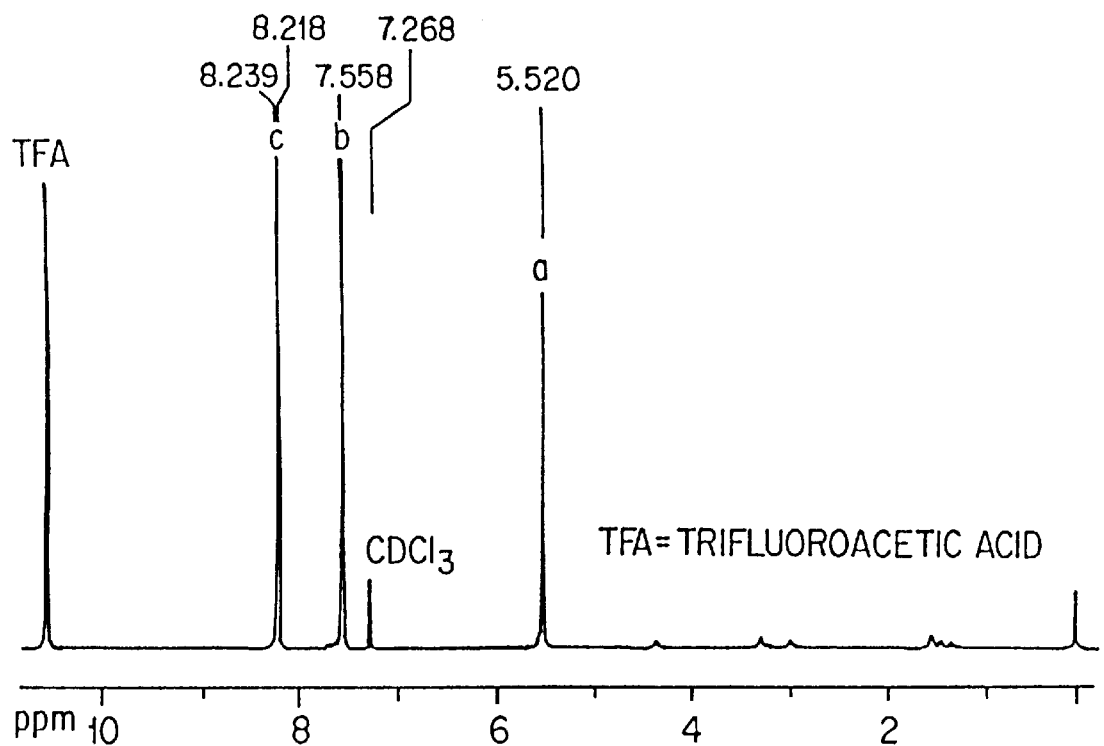

FIG. 29 shows a $^1$H NMR spectrum in CDCl$_3$/TFAD mixture of poly(p-xylene terephthalate) obtained by the reaction of α,α'-dibromo-p-xylene with terephthalic acid and triethylamine in DMF.

Figure 30A:
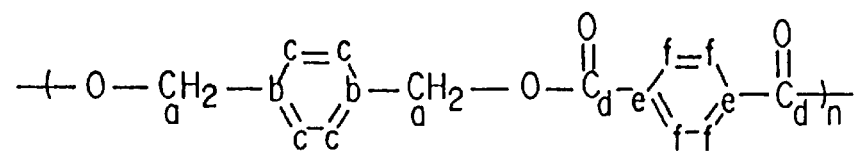
Figure 30:
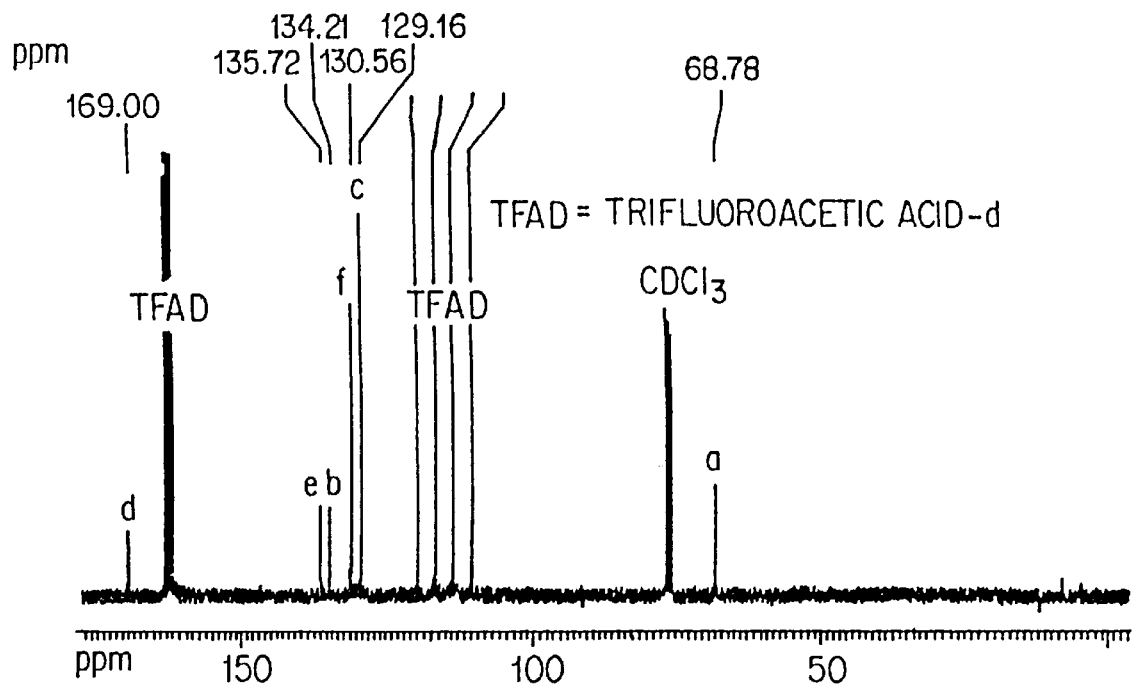

FIG. 30 shows a $^{13}$C NMR spectrum in CDCl$_3$/TFAD mixture of poly(p-xylene terephthalate) obtained by the reaction of α,α'-dibromo-p-xylene with terephthalic acid and triethylamine in DMF.

Figure 31:
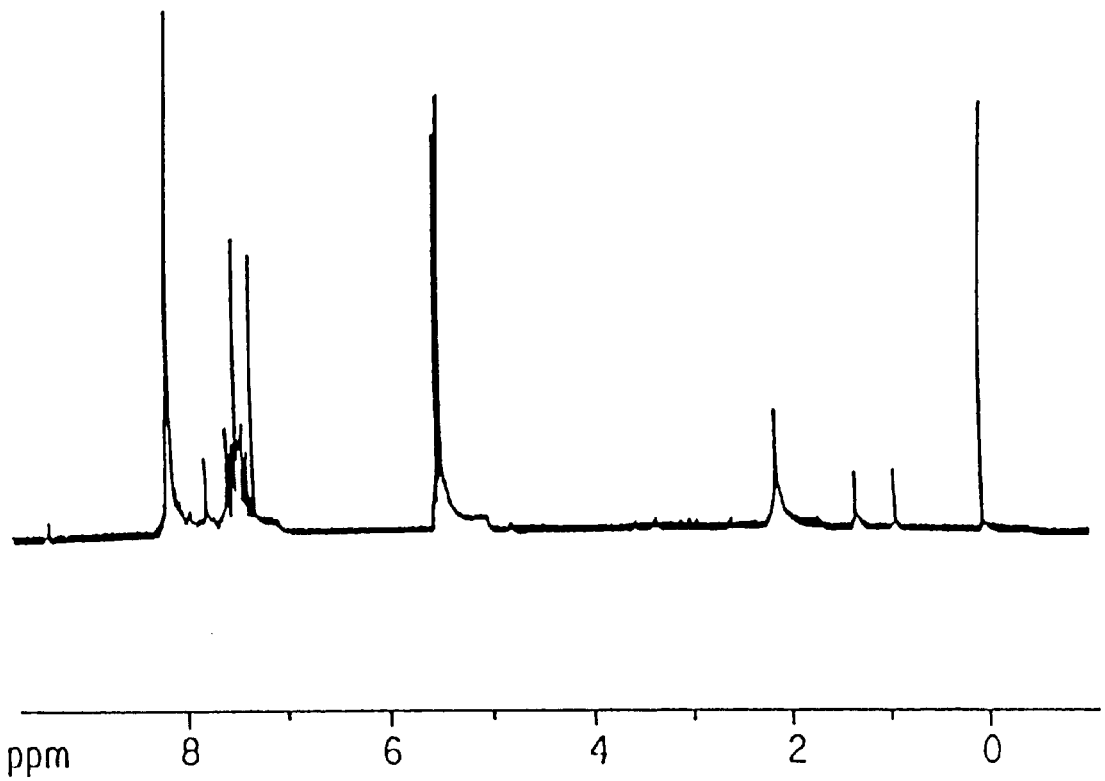

FIG. 31 shows a $^1$H NMR spectrum in CDCl$_3$ of poly(m-xylene terephthalate) obtained by the reaction of α,α'-dichloro-m-xylene with bis(tetraethylammonium) terephthalate in DMF.

Figure 32:
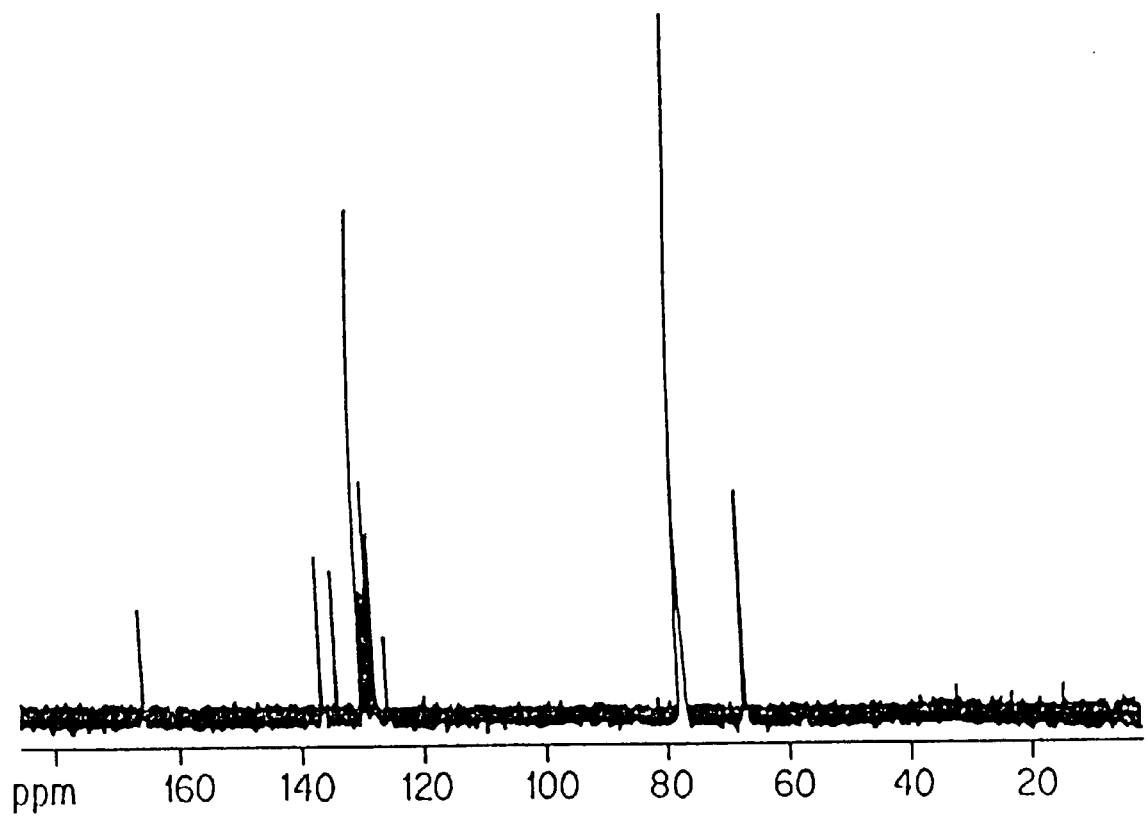

FIG. 32 shows a $^{13}$C NMR spectrum in CDCl$_3$ of poly(m-xylene terephthalate) obtained by the reaction of α,α'-dichloro-m-xylene with bis(tetraethylammonium) terephthalate in DMF.

Figure 33A:
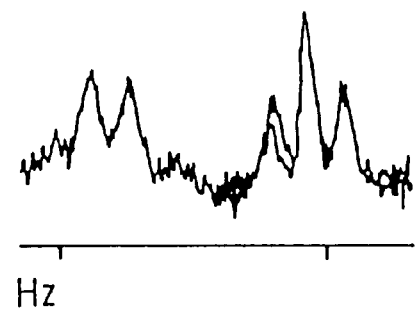
Figure 33:
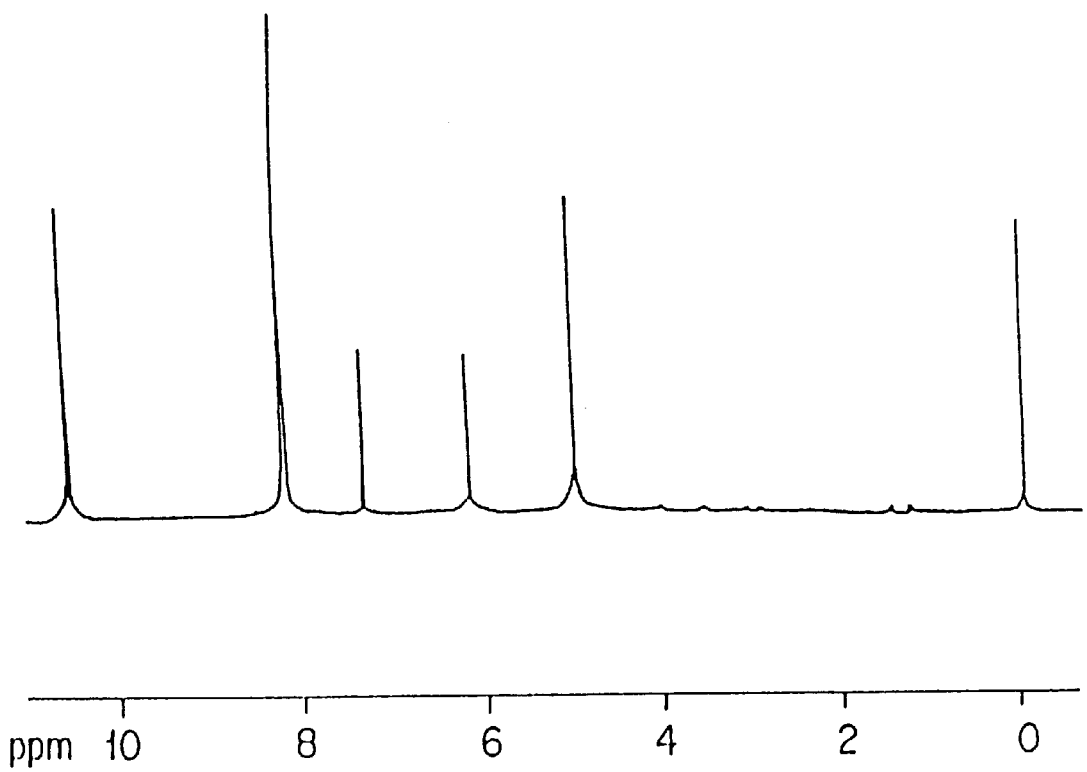

FIG. 33 shows a $^1$H NMR spectrum in CDCl$_3$/TFAD mixture of poly(2-butenyl terephthalate) obtained by the reaction of 1,4-dibromo-2-butene with bis(tetraethylamonium terephthalate) in DMF.

Figure 34:
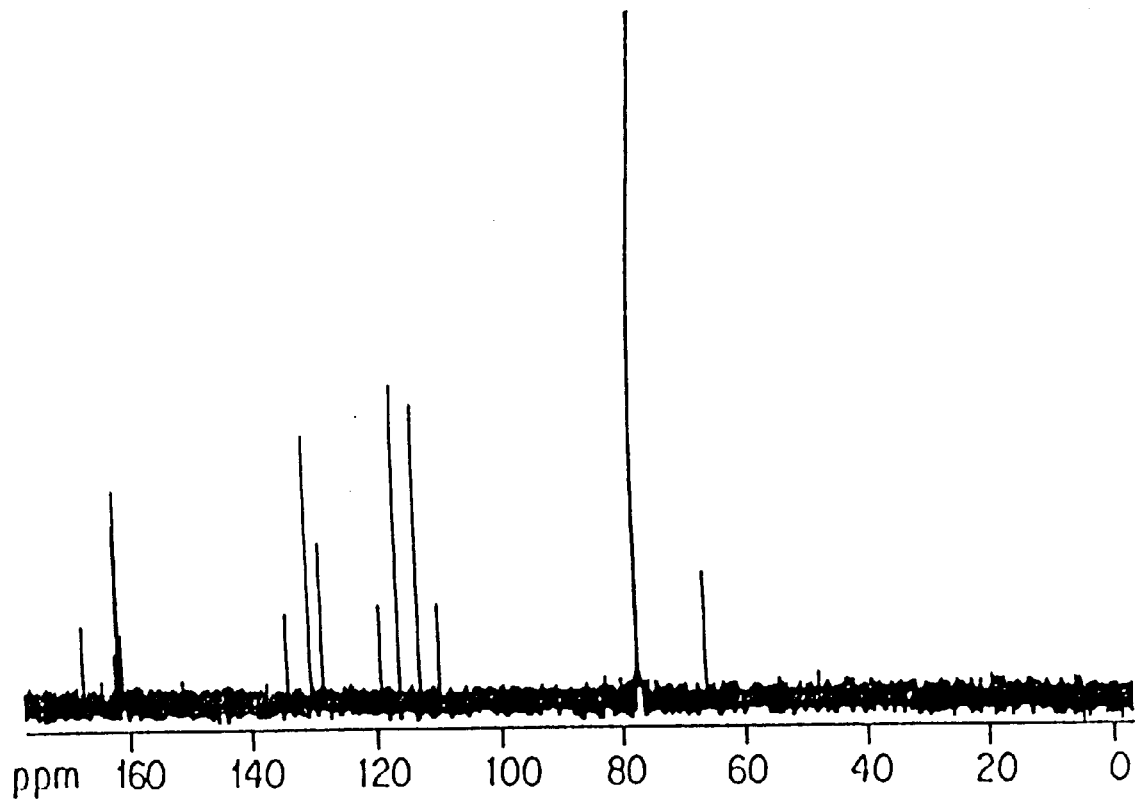

FIG. 34 shows a $^{13}$C NMR spectrum in CDCl$_3$/TFAD mixture of poly(2-butenyl terephthalate) obtained by the reaction of 1,4-dibromo-2-butene with bis(tetraethylamonium terephthalate) in DMF.

Figure 35:
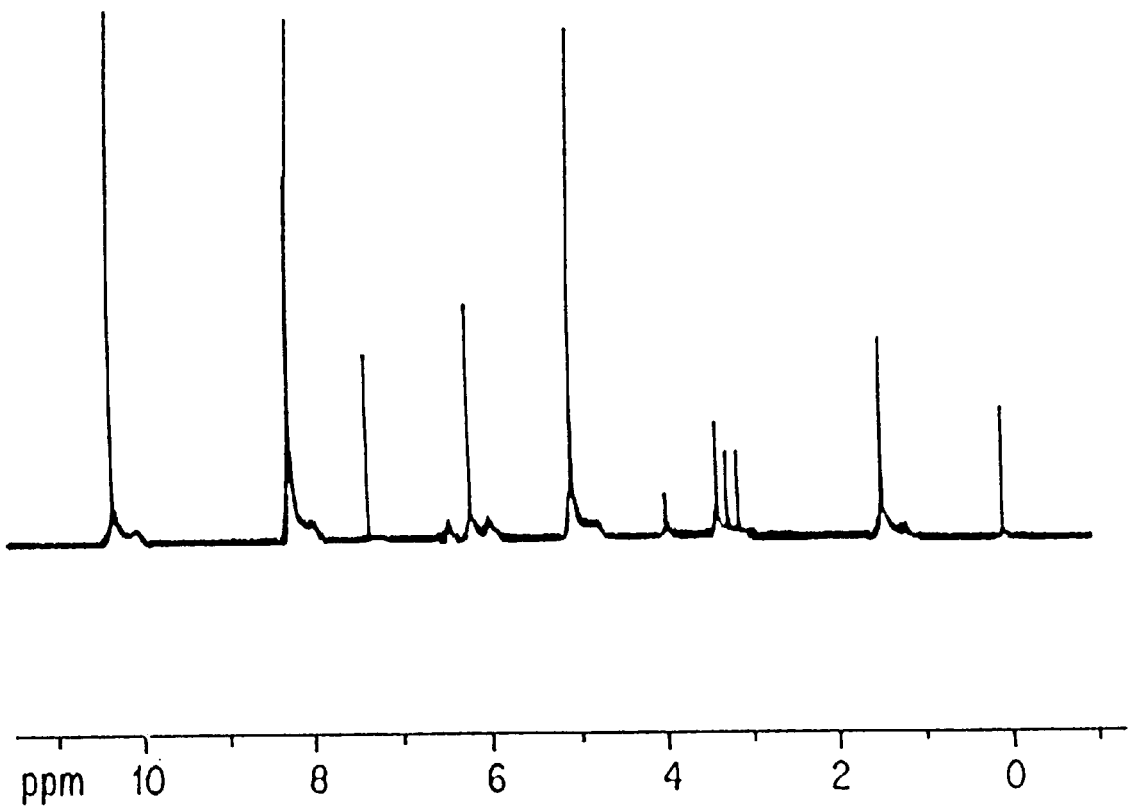

FIG. 35 shows a $^1$H NMR spectrum in CDCl$_3$/TFAD mixture of poly(2-butenyl terephthalate) obtained by the reaction of 1,4-dibromo-2-butene and terephthalic acid with triethylamine in DMF.

Figure 36:
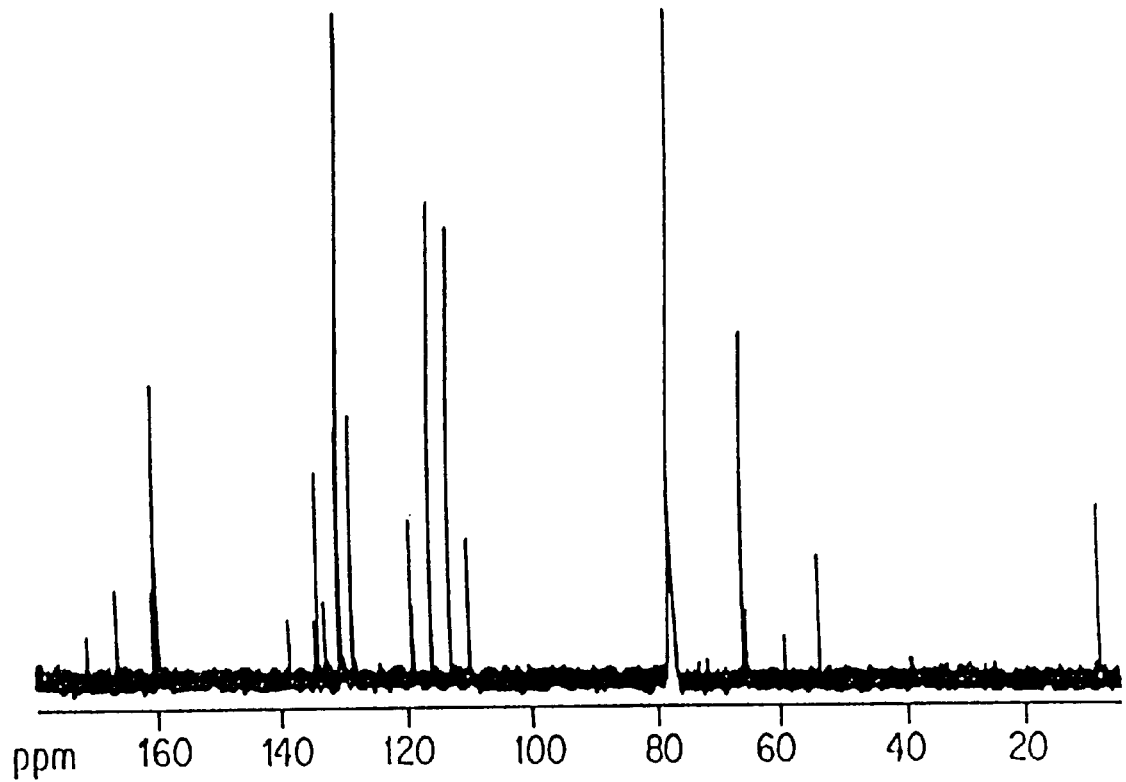

FIG. 36 shows a $^{13}$C NMR spectrum in CDCl$_3$/TFAD mixture of poly(2-butenyl terephthalate) obtained by the reaction of 1,4-dibromo-2-butene and terephthalic acid with triethylamine in DMF.

Figures 37A, 37B:
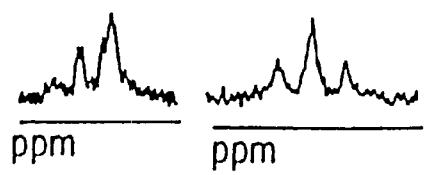
Figure 37:
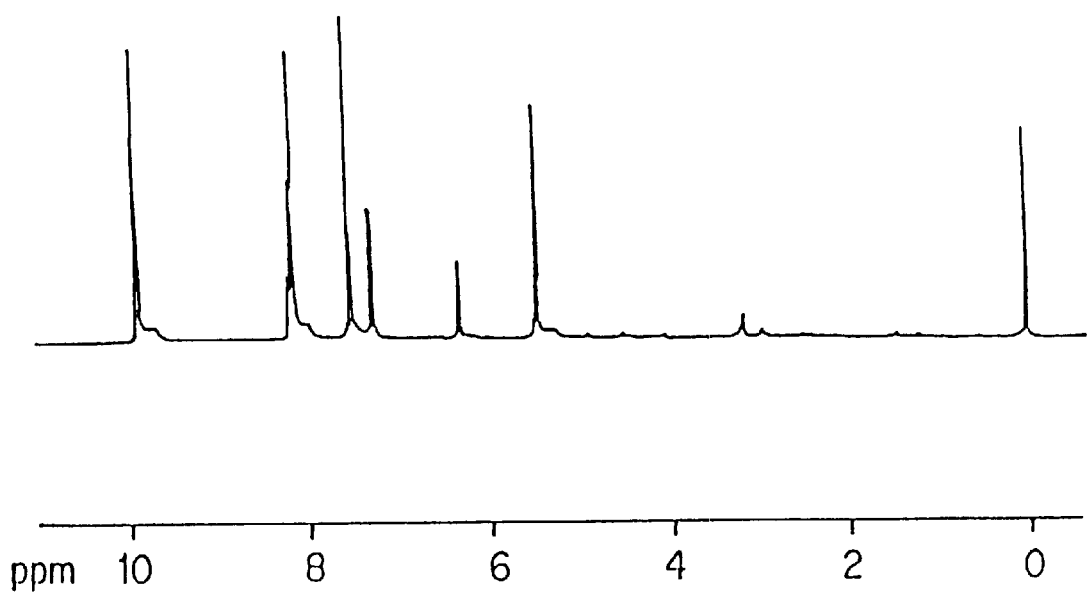

FIG. 37 shows a $^1$H NMR spectrum in CDCl$_3$/TFAD mixture of poly(methylene-co-p-xylene terephthalate) (50:50 mole ratio added; 48:52 incorporation) obtained by the reaction of methylene bromide and α,α'-dibromo-p-xylene with bis(tetraethylammonium terephthalate) in DMF.

Figures 38A, 38B:
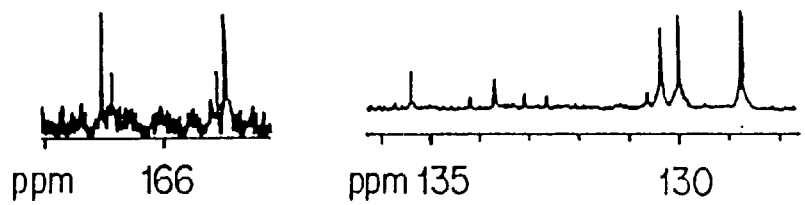
Figure 38:
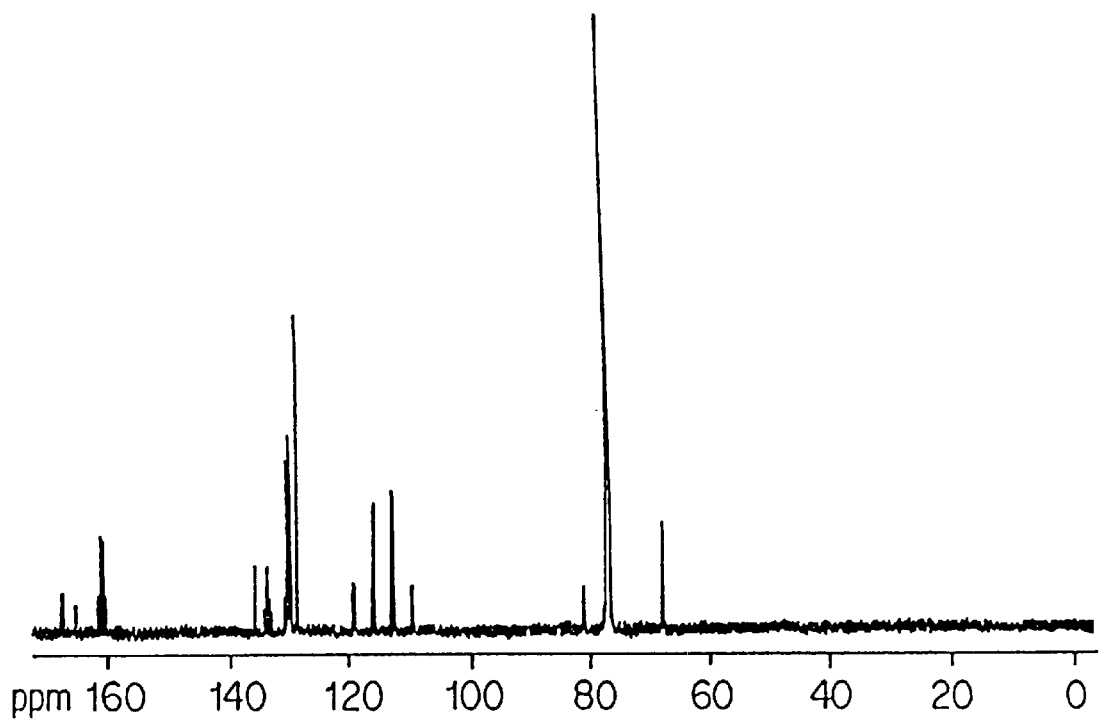

FIG. 38 shows a $^{13}$C NMR spectrum in CDCl$_3$/TFAD mixture of poly(methylene-co-p-xylene terephthalate) (50:50 mole ratio added; 48:52 incorporation) obtained by the reaction of methylene bromide and α,α'-dibromo-p-xylene with bis(tetraethylammonium terephthalate) in DMF.

Figure 39:
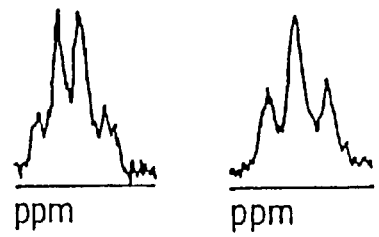
Figure 39:
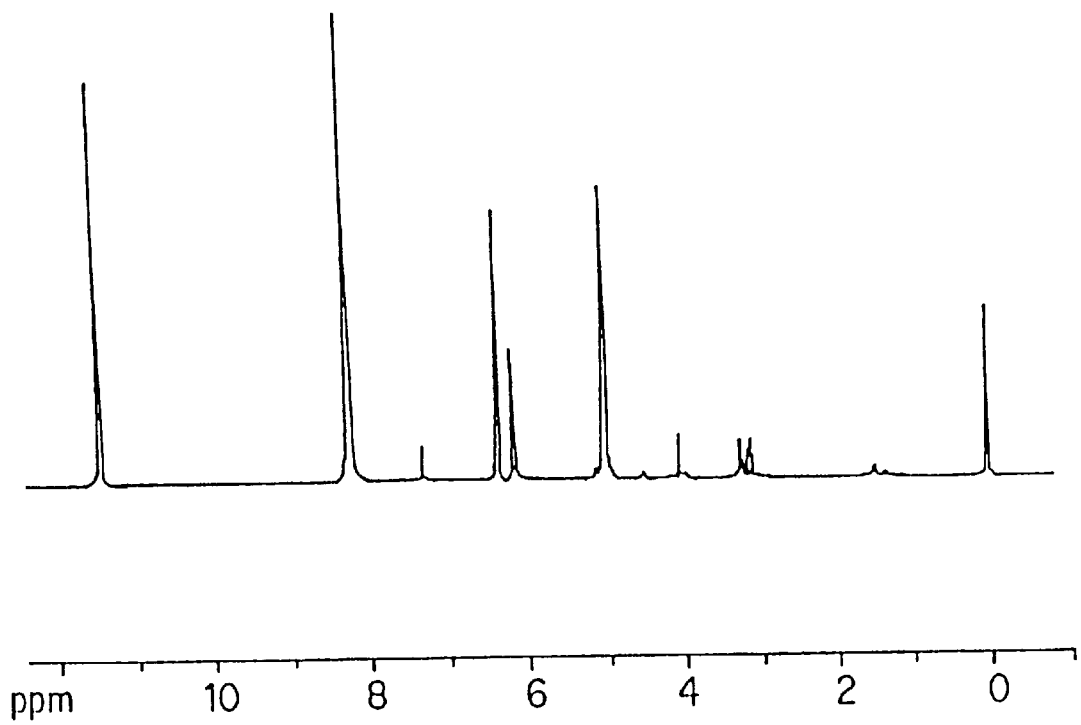

FIG. 39 shows a $^1$H NMR spectrum in CDCl$_3$/TFAD mixture of poly(methylene-co-2-butenyl terephthalate) (53:47 mole ratio added; 60:40 incorporation) obtained by the reaction of methylene bromide and Dibromo-2-butene with bis(tetraethylammonium terephthalate) in DMF.

Figure 40:
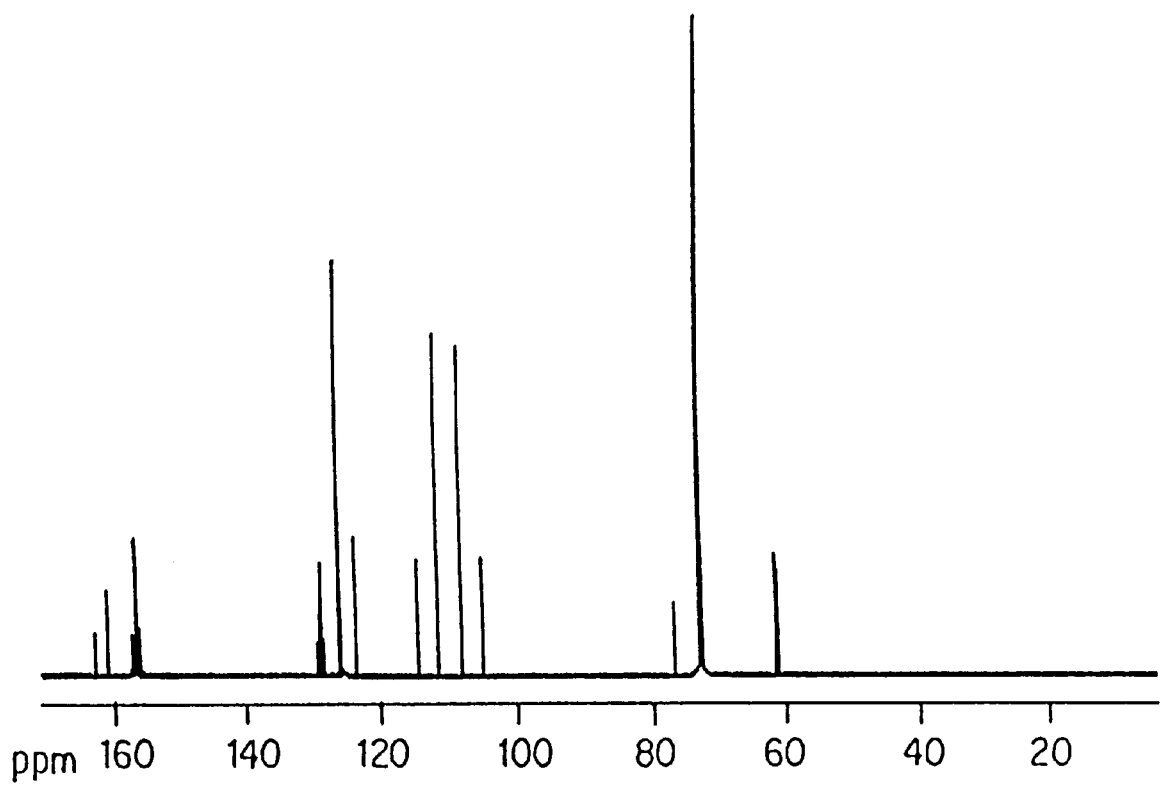

FIG. 40 shows a $^{13}$C NMR spectrum in CDCl$_3$/TFAD mixture of poly(methylene-co-2-butenyl terephthalate) (53:47 mole ratio added; 60:40 incorporation) obtained by the reaction of methylene bromide and dibromo-2-butene with bis(tetraethylammonium terephthalate) in DMF.

Figure 41:
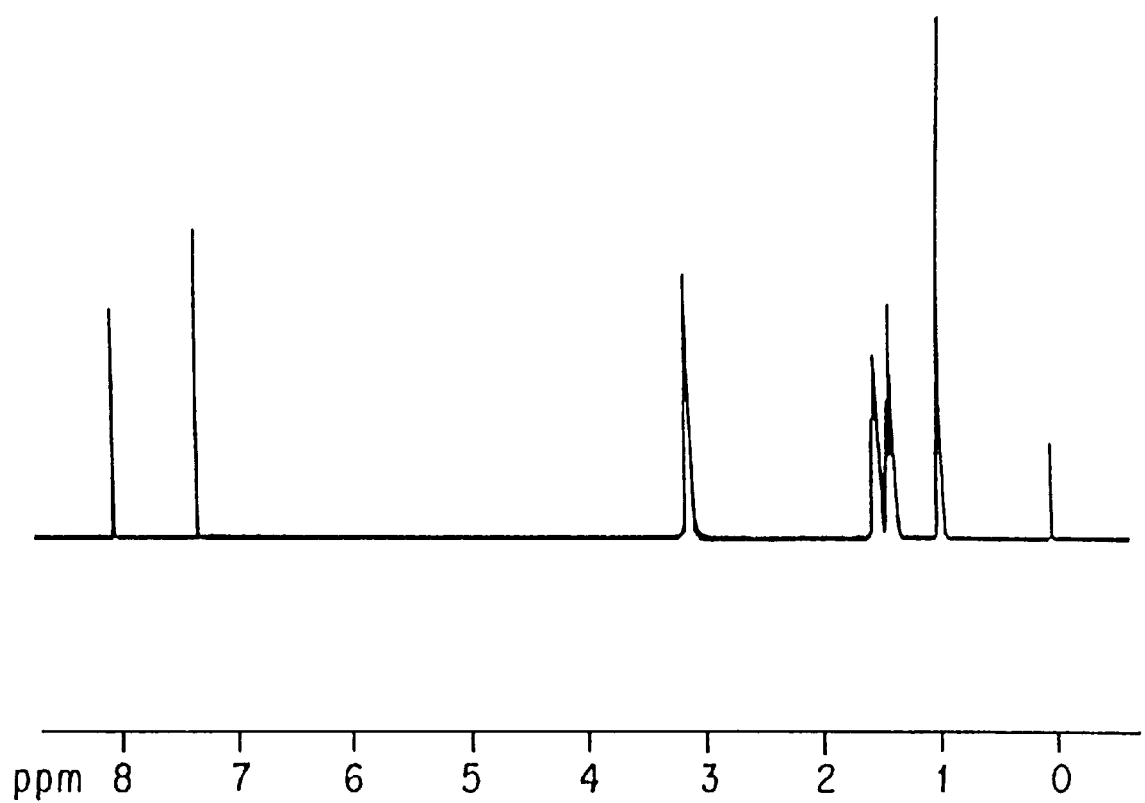

FIG. 41 shows a $^1$H NR spectrum in CDCl$_3$ of bis(tetrabutylammonium) terephthalate obtained by the reaction of terephthalic acid with tetrabutylammonium hydroxide.

Figure 42:
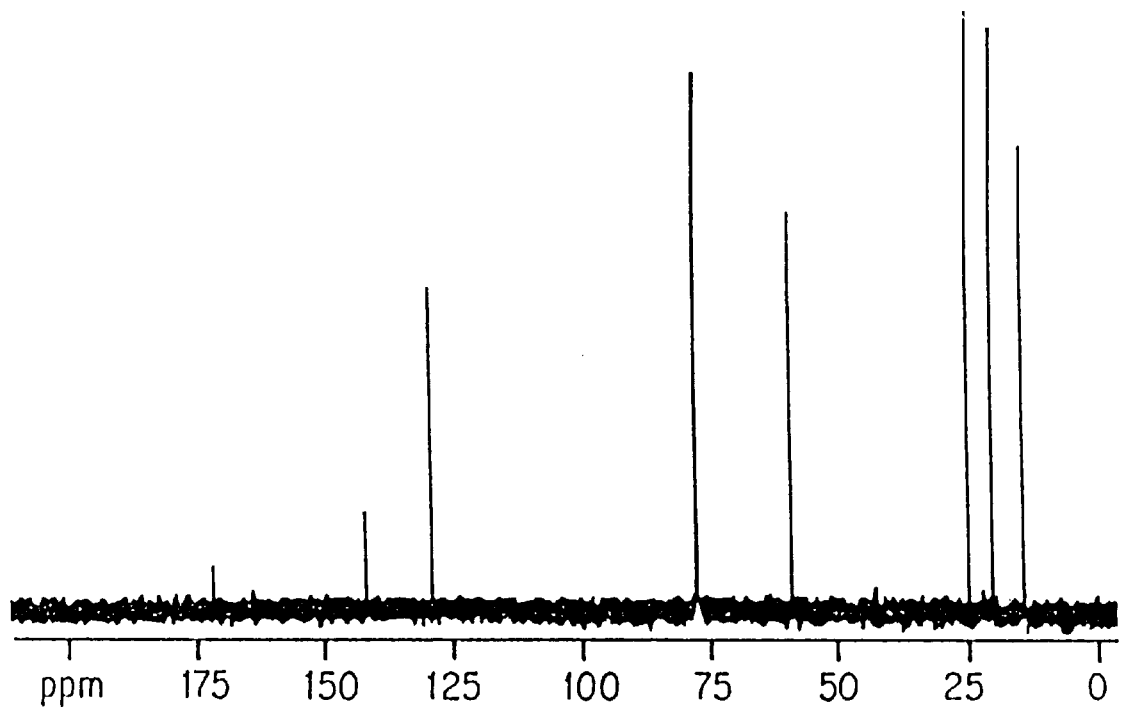

FIG. 42 shows a $^{13}$C NMR spectrum in CDCl$_3$ of bis(tetrabutylammonium) terephthalate obtained by the reaction of terephthalic acid with tetrabutylammonium hydroxide.

Figure 43A:
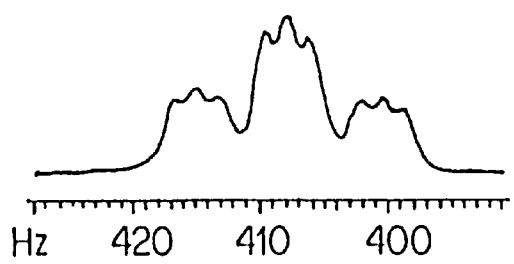
Figure 43B:
Figure 43:
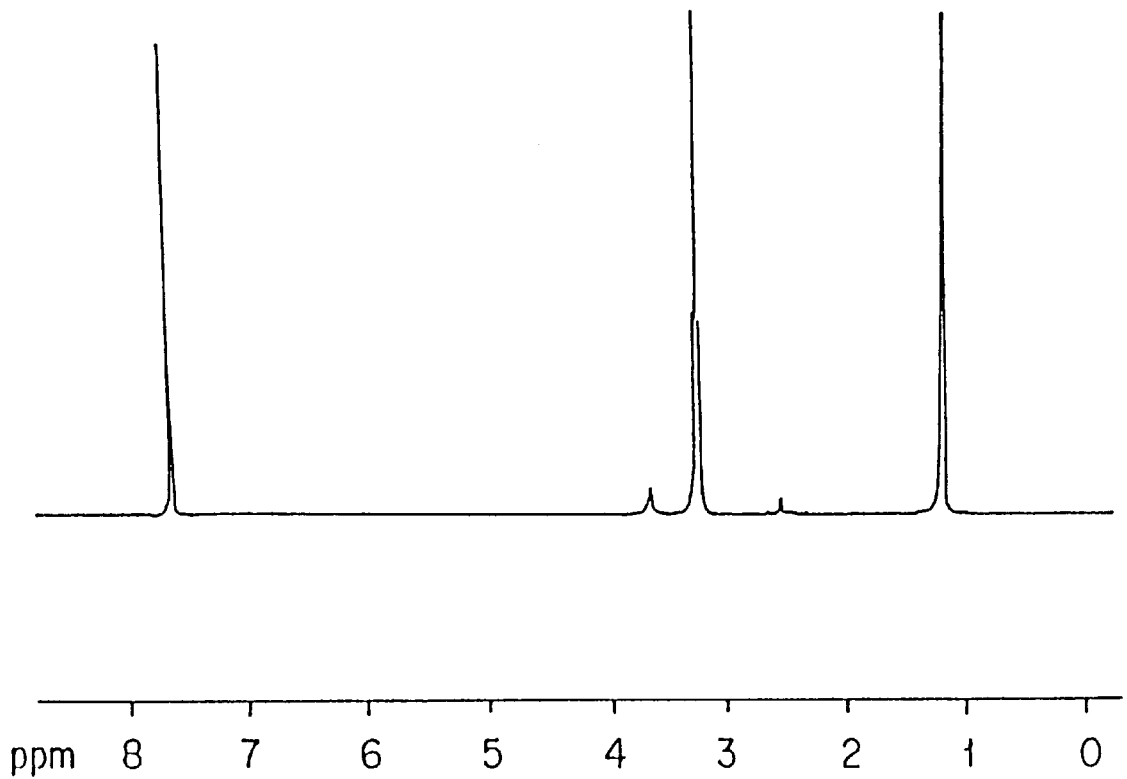

FIG. 43 shows a $^1$H NMR spectrum in DMSO-d$_6$ of bis(tetraethylammonium) terephthalate obtained by the reaction of terephthalic acid with tetraethylammonium hydroxide.

Figure 44:
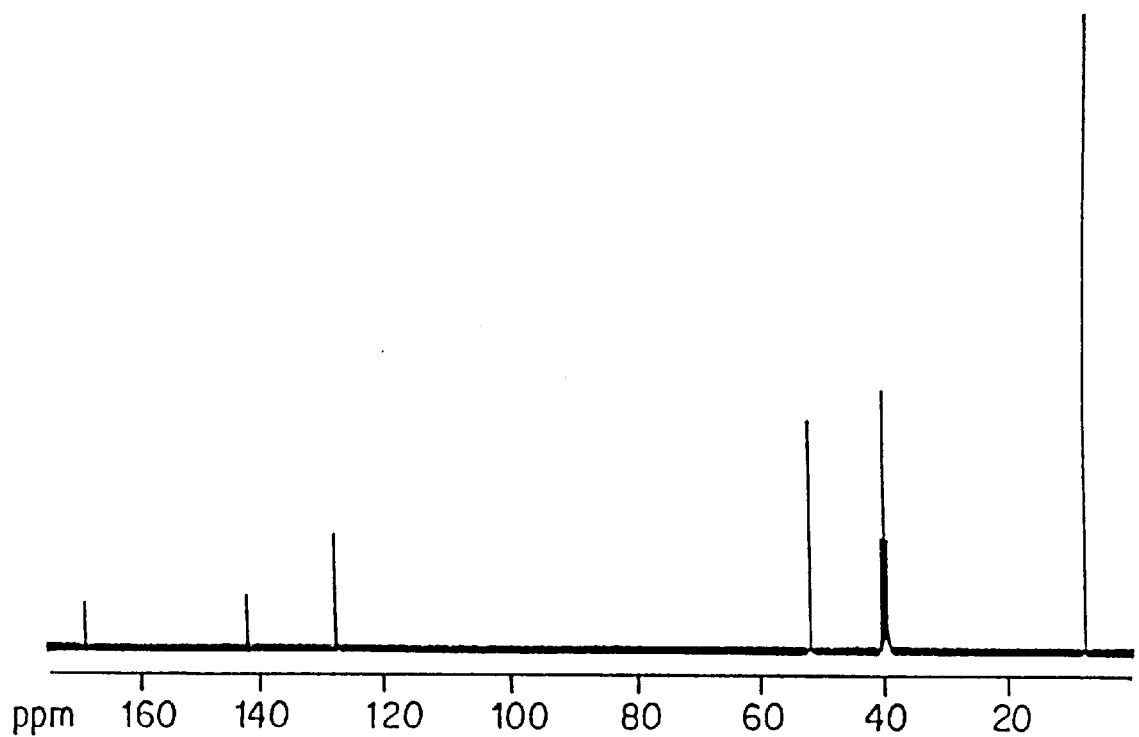

FIG. 44 shows a $^{13}$C NMR spectrum in DMSO-d$_6$ of bis(tetraethylammonium) terephthalate obtained by the reaction of terephthalic acid with tetraethylammonium hydroxide.

Figure 45:
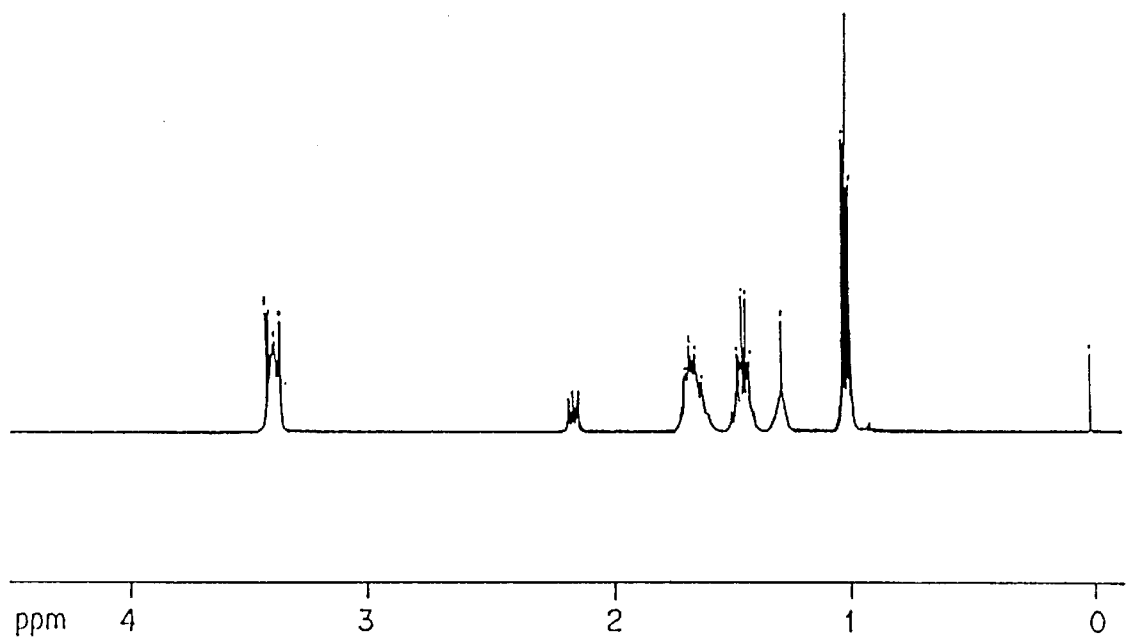

FIG. 45 shows a $^1$H NMR spectrum in CDCl$_3$ of bis (tetrabutylammonium) sebacate obtained by the reaction of sebacic acid with tetrabutylammonium hydroxide.

Figure 46:
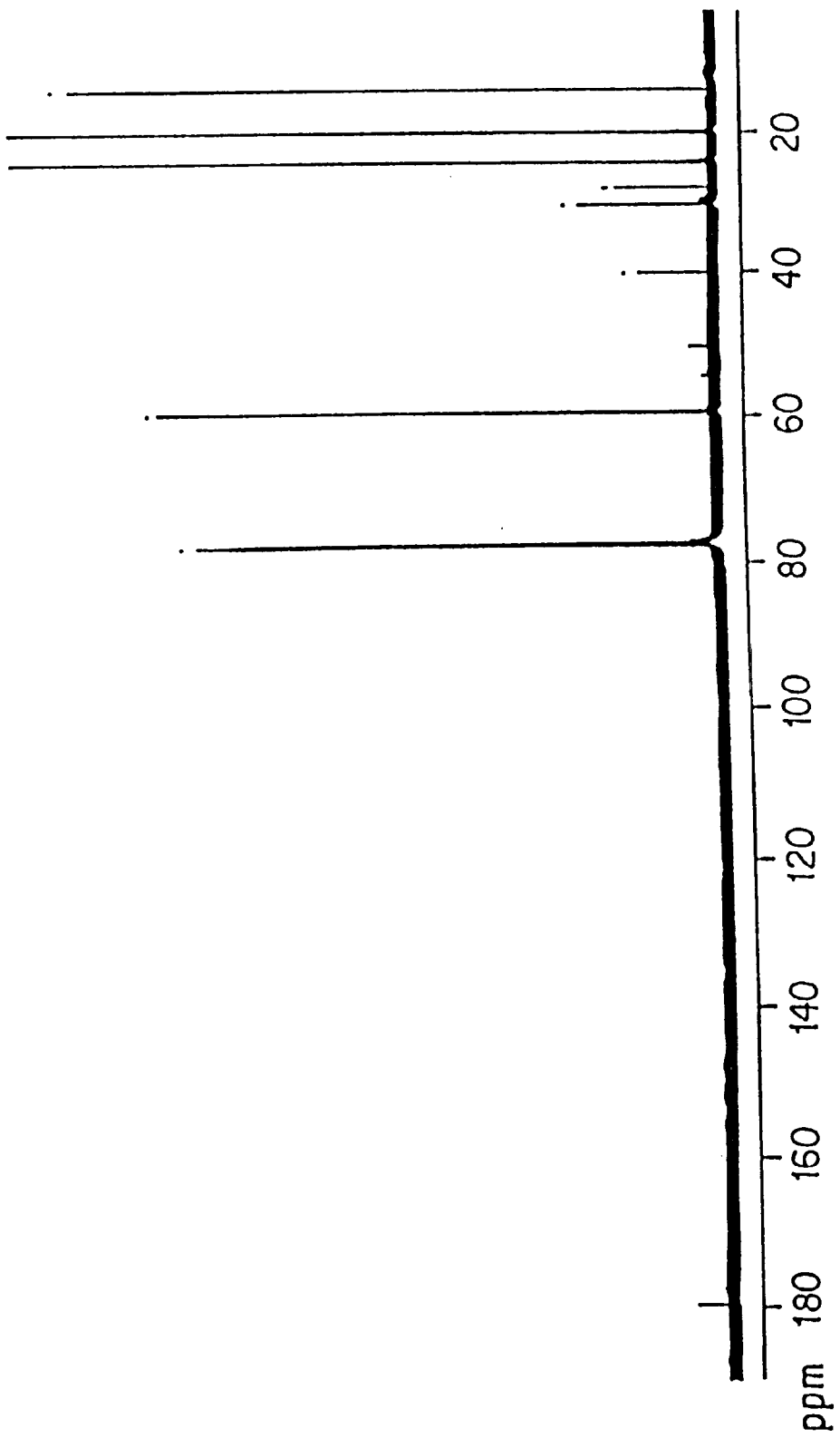

FIG. 46 shows a $^{13}$C NMR spectrum in CDCl$_3$ of bis (tetrabutylammonium) sebacate obtained by the reaction of sebacic acid with tetrabutylammonium hydroxide.

Figure 47:
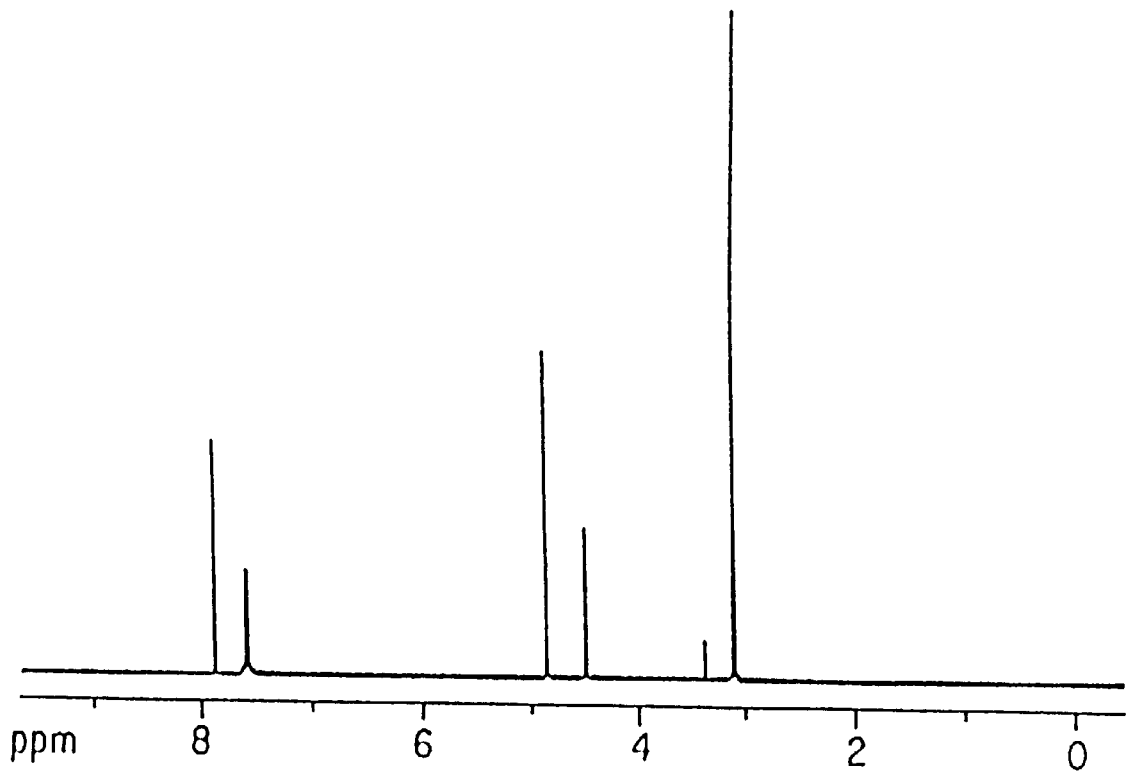

FIG. 47 shows a $^1$H NMR spectrum in D$_2$O of bis (benzyltrimethylammonium) terephthalate obtained by the reaction of terephthalic acid with benzyltrimethylammonium hydroxide.

Figure 48:
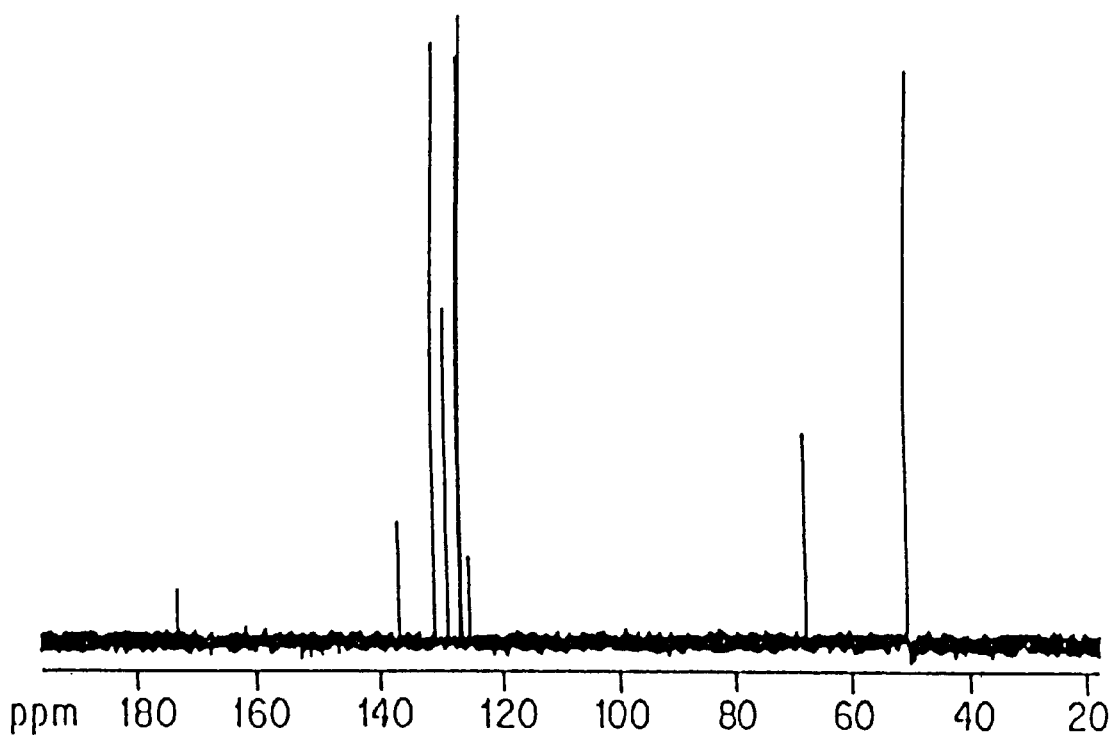

FIG. 48 shows a $^{13}$C NMR spectrum in D$_2$O of bis (benzyltrimethylammonium) terephthalate obtained by the reaction of terephthalic acid with benzyltrimethylammonium hydroxide.

DESCRIPTION OF THE PREFERRED EMBODIMENTS

Poly(methylene oxalate) {systematic name: poly[oxy(1,2-dioxo-1,2-ethanediyl)oxymethylene]} has been synthesized. This polymer has unique properties which make it suitable for various applications. It is insoluble in all tested common organic solvents, does not melt, nonflammable, and is resistant to fire. The proof of structure of the material is from its infrared spectrum which shows carbonyl, carbon-oxygen single bond, and carbon-hydrogen stretching bands in predicted positions (see FIG. 1).

Possible applications are-as a light-weight material for use at high temperatures (for example, as a structural material in aircraft and space vehicles, as a binder for brake systems, and an insulator for microelectronic components); as a material for incorporation into objects to enhance their fire-resistance (for example, into plastics used for making furniture); as an asbestos substitute and as a material from which to make objects which will not dissolve in various solvents (for industrial uses). It may also be used as a heat-resistant coating, one example being for nose cones employed for space reentry vehicles.

Under a nitrogen atmosphere, poly(methylene oxalate) (PMO) does not begin to decompose until the temperature reaches about 430° C. On heating with a Bunsen burner flame, it sinters but does not burn. This sintering or fusing together at high temperatures forms PMO fibers useful in the aforedescribed applications.

PMO hydrolyzes slowly on stirring with sodium hydroxide solution for a period of several hours. For example, by placing PMO overnight in about 15% NaOH, it will go into solution. Poly(methylene oxalate) is also unusual in that it contains a very high percentage of oxygen (nearly 63%) and yet is very stable.

The overall synthesis of PMO consists of several steps:
(1) conversion of oxalic acid into a bis (tetraalkylammonium) salt;
(2) removal of water and solvent;
(3) reaction of the salt with a methylene halide dissolved in appropriate solvents; and
(4) separation of byproduct tetra-alkylammonium halide from the polymer.

Thus, oxalic acid is reacted with two equivalents of a tetra-alkylammonium hydroxide to form the salt in solution and the solvent and water are removed to form the anhydrous oxalate salt:

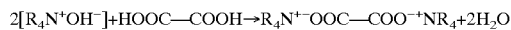

The anhydrous salt is then heated in a solvent with the methylene halide:

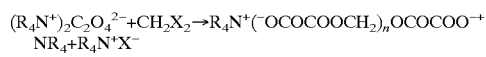

The precipitated polymer is separated from the solvent, for example, by centrifugation or filtration and residual tetra-alkylammonium halide is separated from poly (methylene oxalate) by washing the precipitate with methanol. The tetra-alkylammonium halide is recovered by removal of solvents.

Preparation of Bis(tetrabutylAmmonium) Oxalate

Figure 2:
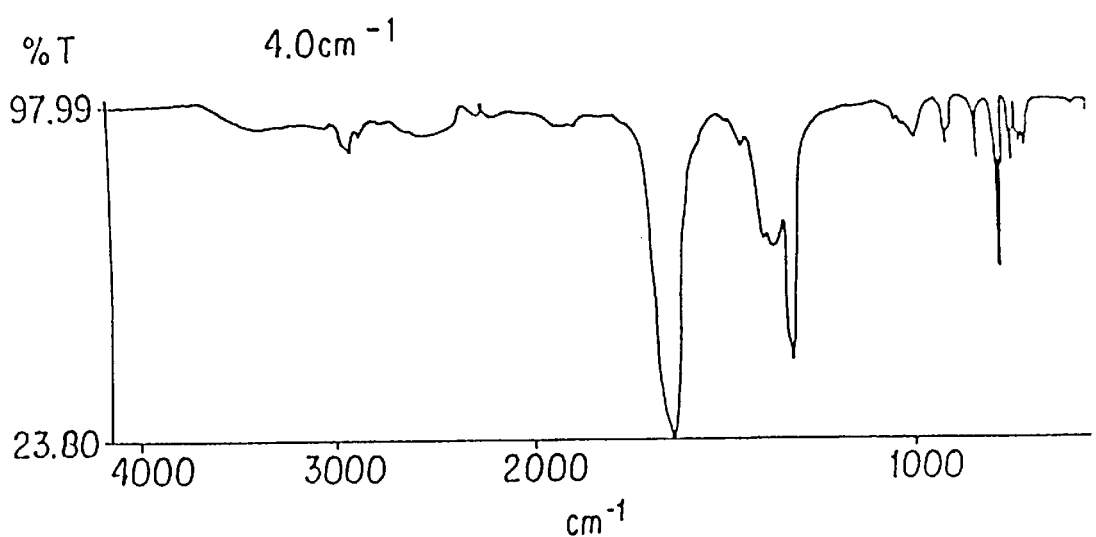
FIG. 2 shows the infrared spectrum of bis (tetrabutylammonium) oxalate obtained in CDCl$_3$ using a NaCl salt plate: cm-1%; 2932.2 87.84, 1641.0 23.72, 1325.3 40.53, 914.7 88.54, 833.9 83.00, 779.4 58.85, 744.8 87.65.
Figure 3:
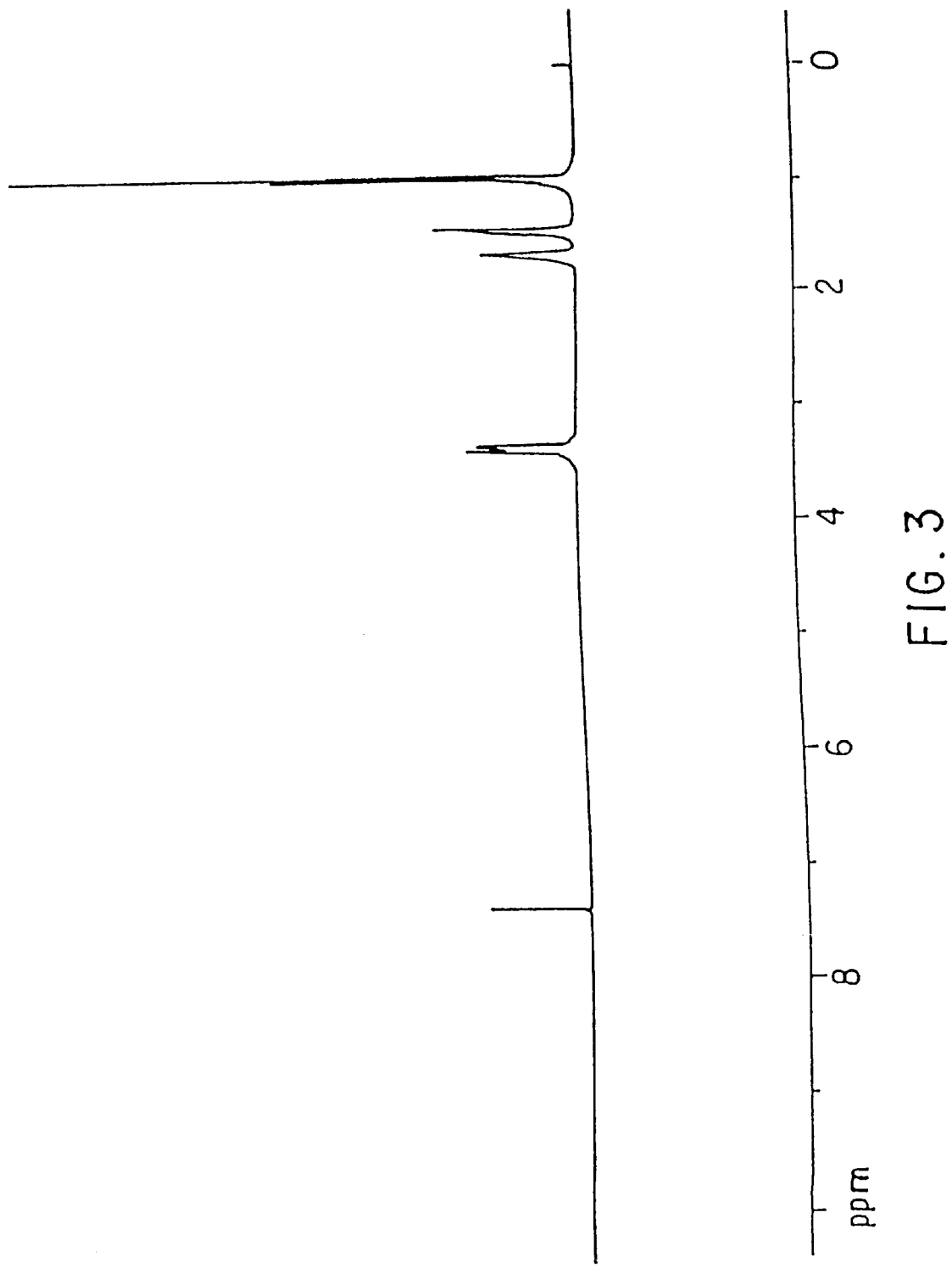
FIG. 3 shows the $^1$H NMR spectrum of bis (tetrabutylammonium) oxalate in CDCl$_3$.
Figures 4, 4A:
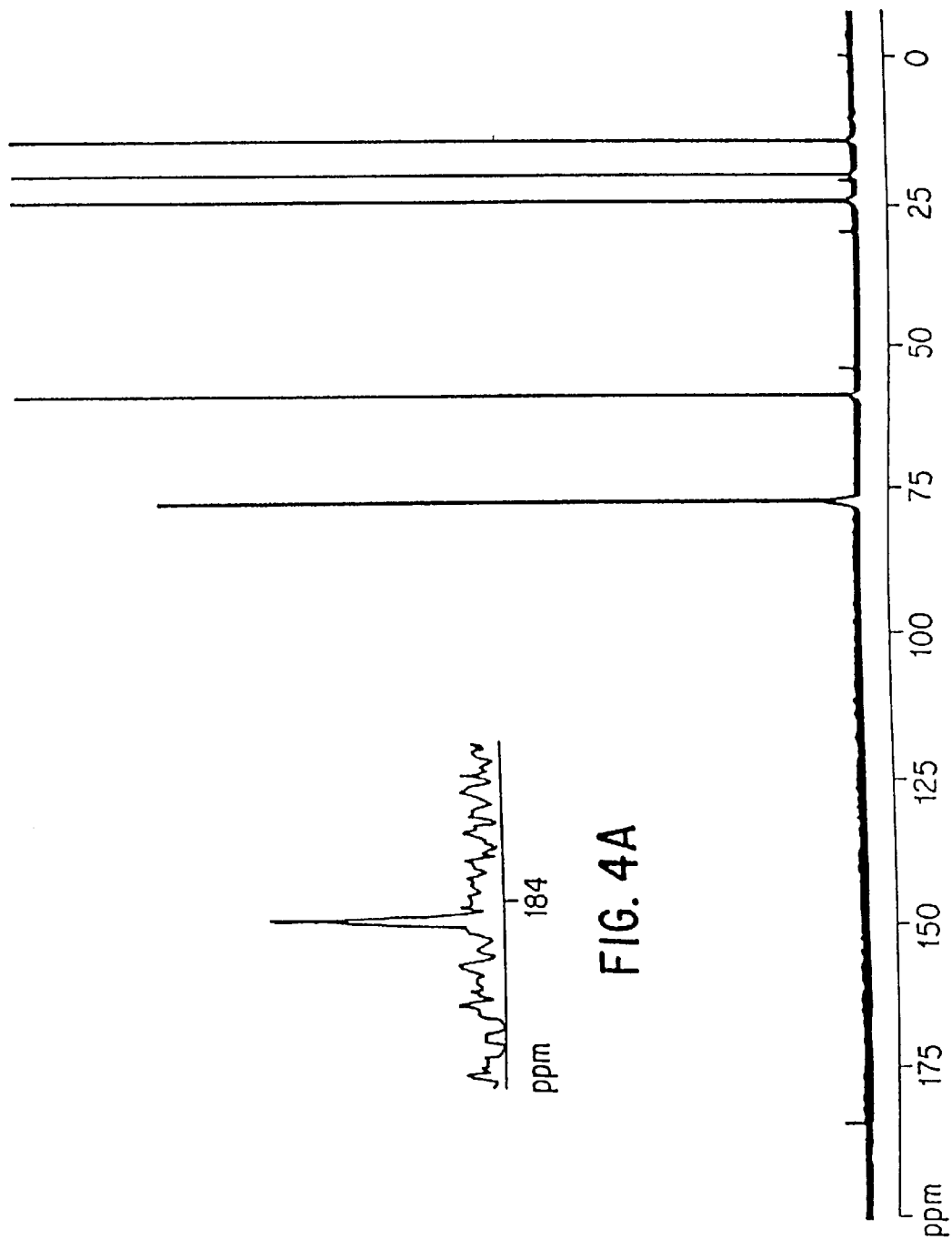
FIG. 4 shows the $^{13}$C NMR spectrum of bis (tetrabutylammonium) oxalate in CDCl$_3$.
Figure 5A:
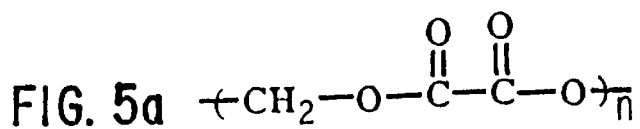
FIGS. 5A, 5B and 5C show the structures of novel polymers of the present invention or polymers synthesized by novel methods of the present invention.
Figure 5B:
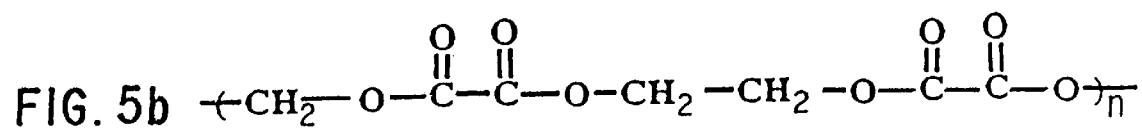
Figure 5C:
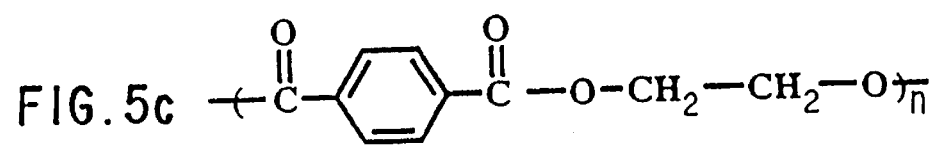
Figure 5D:
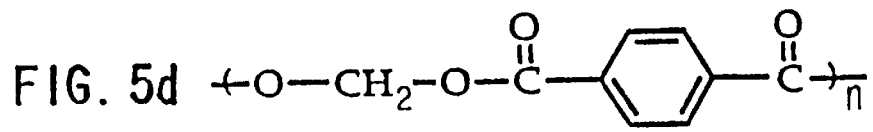
Figure 5E:
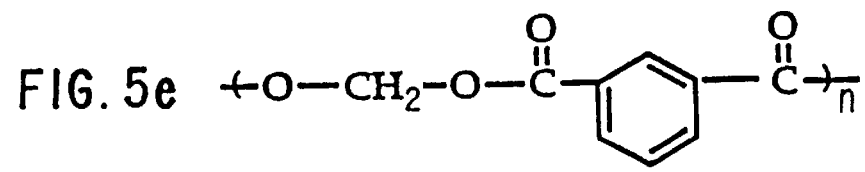
Figure 5F:
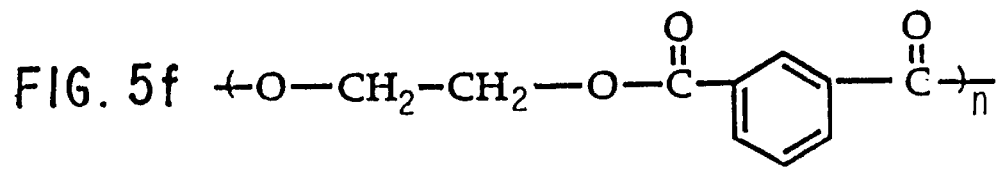
Figure 5G:
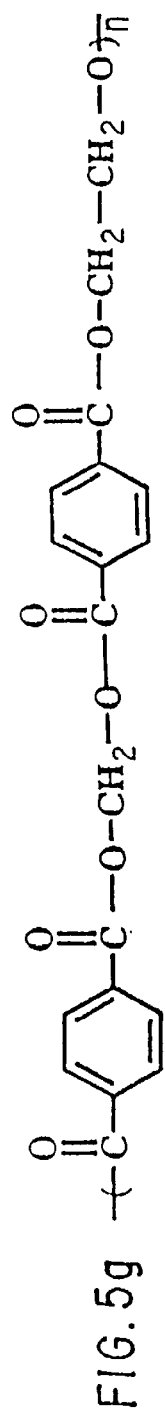
Figure 5H:
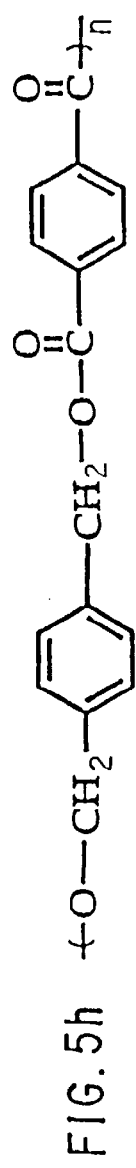
Figure 5I:
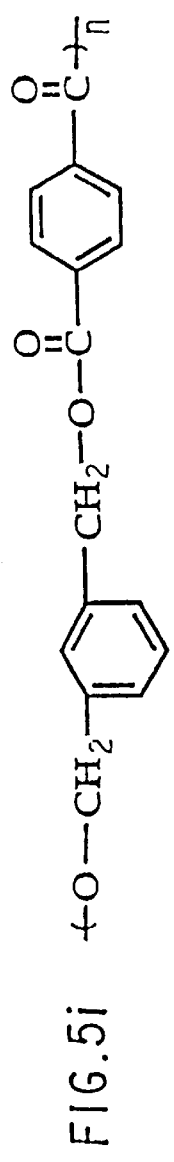
Figure 5J:
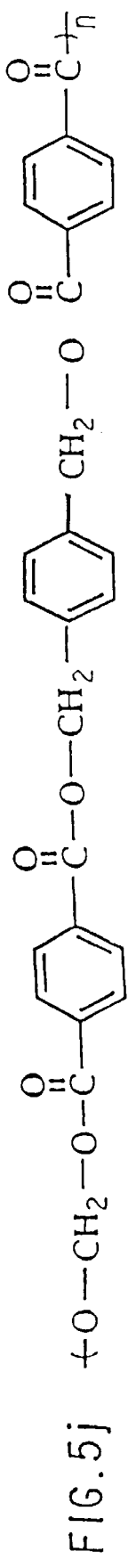
Figure 5K:
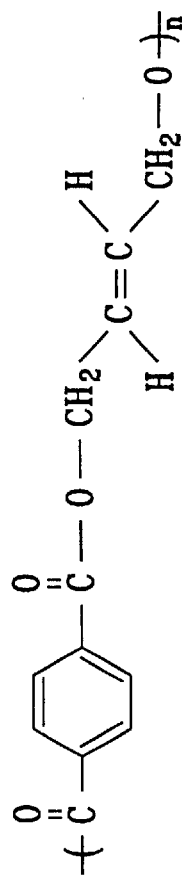
Figure 5L:
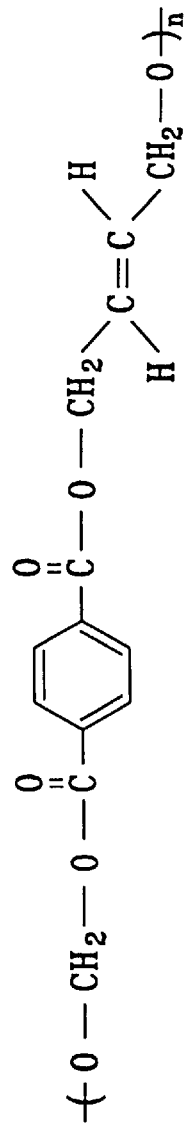
Figure 5M:
Figure 5N:
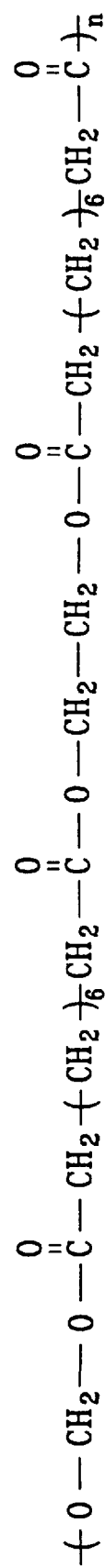

Tetrabutylammonium hydroxide in methanol (90 mL of a 1 molar solution, 0.098 mol) was added dropwise to 3.5 g (0.039 mol) of anhydrous oxalic acid under an argon atmosphere. The end-point was determined by titration. The solvent was removed in vacuo and the residue was dried in vacuo at 40° C. for 4 h and then at 60° C. for 9.5 h. A yield of 21 g of product was obtained. The product was characterized as bis(tetrabutylammonium) oxalate by means of its $^1$H and $^{13}$C NMR and IR spectra (FIGS. 2-4). Manipulations with bis(tetrabutylammonium) oxalate were carried out in a dry glove-box in inert atmospheres (nitrogen or argon) since the compound is very hygroscopic. Bis (tetrabutylammonium) oxalate is a new composition of matter as well as are most of the other bis (tetraalkylammonium) oxalates, an exception being tetra-ethylammonium oxalate. Other tetraalkylammonium oxalates may be analogously used in place of tetrabutylammonium oxalate to prepare PMO. Such compounds may also be used as substrates or inhibitors of oxalate metabolizing enzymes.

Figure 1:
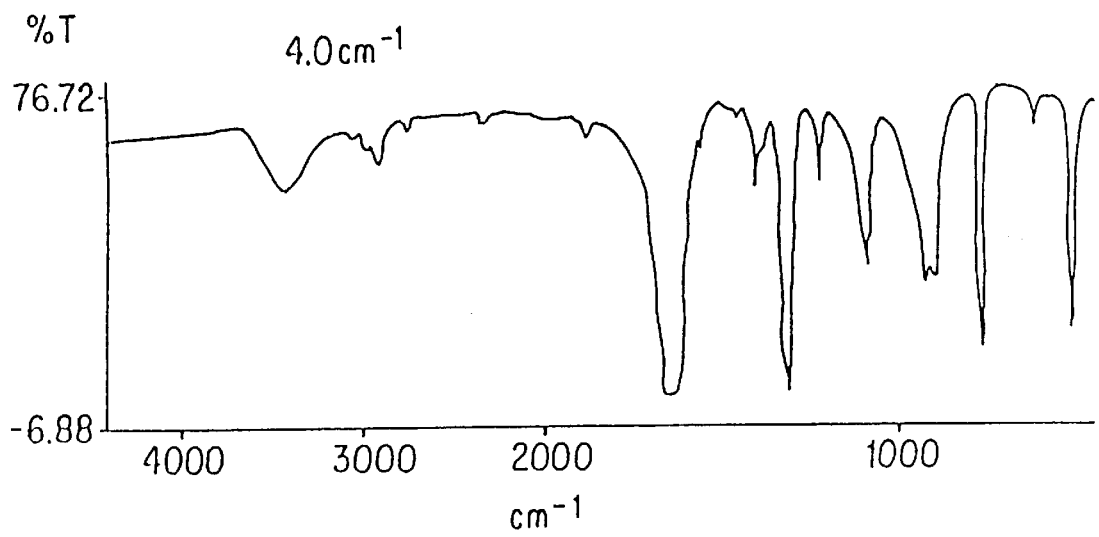
FIG. 1 shows the infrared spectrum of poly(methylene oxalate) using KBr pressed pellet: cm$^{-1}$%; 2981 62.11, 2922 58.26, 1657 00.33, 1325 2.01, 1098 33.50, 934.5 28.61.

Preparation of Poly(methylene oxalate) (PMO) Using Methylene Bromide or Methylene Chloride Bis(tetrabutylammonium) oxalate (12 g; 0.021 mol) was dissolved in 25 mL of chlorobenzene and methylene bromide (2.6 mL; 4.0 g; 0.023 mol) was added. Other solvents such as nitrobenzene, bromobenzene, and N-methylpyrrolidone, for example, may be used in place of chlorobenzene. The solution was heated at reflux for about 6.3 h and allowed to cool to room temperature. A white precipitate formed and was isolated by centrifugation. It was then washed three times with 50 Ml portions of methanol to remove tetrabutylammonium bromide and unreacted starting materials, and dried in vacuo for about 2 days. The poly(methylene oxalate) product weighed 0.29 g. PMO is not soluble in any of the common organic solvents, however, it dissolved in concentrated sulfuric acid. A $^{13}$C NMR spectrum of the acid solution showed carbonyl and methylene carbon signals at lower and higher field positions, respectively. The polymer did not reprecipitate when the sulfuric acid solution was poured into cold water. An infrared spectrum with a sample of the polymer in a pressed KBr pellet showed absorption peaks for C—H, C=O, and C—O stretching and C—H bending vibrations (FIG. 1). In a differential scanning calorimeter (DSC), PMO did not melt on heating to about 410° C., at which temperature it began to decompose.

Byproduct tetrabutylammonium bromide (12 g) was recovered from the above filtrate (from PMO) by evaporation of chlorobenzene and methanol solvents. A $^1$H NMR spectrum on the compound in CDCl$_3$ showed the expected four groups of peaks for the butyl group. Tetrabutylammonium bromide can be recycled back into tetrabutylammonium hydroxide by passage through an anionic exchange column to exchange hydroxide for the bromide ion or directly into bis(tetrabutylammonium) oxalate.

Other tetraalkylammonium hydroxides ($R_4N^+OH^-$ and $R^1R^2R^3R^4N^+OH^-$) can be used to prepare the bis(tetraalkylammonium) oxalates. However, bis(tetramethylammonium) oxalate appears to be too insoluble and bis(tetraethylammonium) oxalate forms a very dark-colored mixture. Arylalkyltrimethylammonium compounds (such as benzyltrimethylammonium and hexadecyltrimethylammonium) can also be used.

The synthesis procedure using methylene chloride was similar to that described above with methylene bromide using 8.8 g (0.015 mol) of bis(tetrabutylammonium) oxalate, 25 mL chlorobenzene solvent, and 1.1 mL (1.5 g, 0.017 mol) of methylene chloride. The solution was heated at 85° C. (external oil bath temperature) for 4 days, during which time a white precipitate had formed. The weight of polymer isolated by the same procedure described above was 0.22 g.

On evaporation of the solvents from the filtrate and drying of the residue in vacuo, 8.9 g. of tetrabutylammonium chloride was isolated and characterized by its $^1H$ NMR spectrum. Tetrabutylammonium chloride can also be recycled. Bromochloromethane or methylene iodide may be used as the methylene halide in addition to methylene bromide or methylene chloride.

Other methods of synthesis of PMO were tried, for example, when the present inventors tried to synthesize PMO by reacting oxalic acid and methylene bromide (or methylene chloride) with triethylamine, a method analogous to that which was successful in the synthesis of polyglycolide [A. G. Pinkus and R. Subramanyam, J. Polym. Sci., Polym. Chem. Ed., 22, 1131 (1984)], polymandelide [A. G. Pinkus, R. Subramanyam, S. L. Clough, and T. C. Lairmore, J. Polym. Sci. Part A. Polym. Chem., 27, 4291 (1989)], and polyhydroxymethylbenzoates [A. G. Pinkus, R. Subramanyam, and R. Hariharan, J. Macromol. Sci.—Pure Appl. Chem., A29, 1031 (1992)], the reaction did not take place.

Preparation of Poly(alkylene dicarboxylates)

I. Poly(methylene dicarboxylates)

Based on the synthesis of poly(methylene oxalate), dicarboxylic acids (such as terephthalic, isophthalic, dimethylmalonic, malonic, succinic, adipic, fumaric, etc.) are first converted into the corresponding bis(tetraalkylammonium) dicarboxylates by reaction of the dicarboxylic acid $HO_2CRCO_2H$ (where R is an aliphatic or aromatic moiety) with two equivalents of tetraalkylammonium hydroxide:

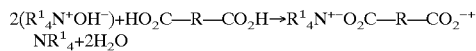

The bis(tetraalkylammonium) dicarboxylate is then reacted with an alkylene dihalide such as alkylene bromide or alkylene chloride to form the poly(alkylene dicarboxylate) as described for poly(methylene oxalate):

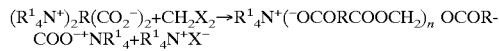

X=Cl or Br or I

The preferred tetraalkylammonium hydroxide is tetrabutylammonium hydroxide and preferred alkylene dihalides are methylene bromide or methylene chloride.

Synthesis of Poly(methylene terephthalate) by Reaction of Bis(tetrabutylammonium) Terephthalate and Methylene Chloride in Chlorobenzene. Methylene chloride (0.10 mL, 0.13 g, $1.5 \times 10^{-3}$ mol) was added to bis(tetrabutylammonium) terephthalate (0.25 g, $3.9 \times 10^{-4}$ mol) under an argon atmosphere followed by 6 mL of chlorobenzene. The solution was stirred and heated by a sand bath at 135° C. for 26 h during which time a precipitate formed. The precipitate was collected by centrifugation, washed with 4×50 mL of methanol to remove tetrabutylammonium bromide, and dried in vacuo 12 hr to obtain 0.046 g, 66.5% of polymer; DP by $^1H$ NMR end group analysis=107 corresponding to $M_n$=19,000.

Synthesis of Poly(methylene terephthalate) by Reaction of Bis(tetrabutylammonium) Terephthalate and Methylene Bromide in Chlorobenzene. The procedure was the same as for the methylene chloride reaction above using bis(tetrabutylammonium) terephthalate (0.24 g, $3.7 \times 10^{-4}$ mol), methylene bromide (0.14 mL, 0.34 g, $2.0 \times 10^{-3}$ mol), and chlorobenzene (6 mL). The solution was heated by an oil bath at 135–138° C. for 27 h during which time a precipitate formed. The precipitate was collected by centrifugation, washed with 4×50 mL of methanol to remove tetrabutylammonium bromide. The precipitate of poly(methylene terephthalate) was dried in vacuo for 12 h to obtain 0.050 g, 76% yield; DP=450 corresponding to $M_n$=80,000. FIG. 8 shows a $^1H$ NMR spectrum and FIG. 9 shows a $^{13}C$ NMR spectrum of poly(methylene terephthalate) synthesized by this procedure. FIG. 10 shows a $^1H$ NMR spectrum of the same polymer obtained by the reaction of methylene chloride and bis(tetrabutylammonium) terephthalate in DMF. FIG. 11 shows a $^1H$ NMR spectrum and FIG. 12 shows a $^{13}C$ NMR spectrum of the same polymer obtained by the reaction of methylene chloride and bis(tetraethylammonium) terephthalate in DMF.

Synthesis of Poly(methylene terephthalate) by Reaction of Methylene Chloride and Triethylamine in Dimethylformamide. To terephthalic acid (2.2 g, 0.013 mol), were added in succession with stirring: dimethylformamide (DMF) (15 mL), two mole equivalents of triethylamine (3.7 mL, 2.7 g, 0.27 mol), methylene chloride (4.2 mL, 5.6 g, 0.067 mol). The solution was stirred under argon and heated by a sand bath at 120° C. for 5 days during which time a precipitate had formed. The reaction mixture was cooled to room temperature, the precipitate was collected by centrifugation, and washed with 3×50 mL of methanol to remove triethylammonium chloride. The precipitate was dried in vacuo for 12 h to obtain 0.78 g, 33% yield; mp, 246–250° C.; DP=160–193 corresponding to $M_n$=28,500–33,800.

Synthesis of Poly(methylene terephthalate) by Reaction of Methylene Bromide and Triethylamine in Dimethylformamide. To terephthalic acid (1.1 g, 0.0066 mol) were added in succession with stirring: DMF (15 mL), two equivalents of triethylamine (2.2 mL, 1.6 g, 0.016 mol), and methylene bromide (0.70 mL, 1.7 g, 0.0099 mol). The solution was stirred under argon and heated by a sand bath at 120° C. for 24 h during which time a precipitate had formed. The reaction mixture was cooled and the precipitate was collected by centrifugation, and refluxed with 20 mL of DMF to remove any unreacted acid. The precipitate was then collected by centrifugation, and washed with 3×50 mL of methanol to remove triethylammonium bromide. The polymeric precipitate was dried in vacuo for 12 h to obtain 0.70 g, 60% yield. The DP from end group analysis was 53–65 corresponding to $M_n$=9,400–11,600. FIG. 6 shows a $^1H$ NMR spectrum and FIG. 7 shows a $^{13}C$ NMR spectrum in $CDCl_3$/TFAD of poly(methylene terephthalate) synthesized by this procedure.

Synthesis of Poly(methylene sebacate) by Reaction of Bis(tetrabutylammonium) Sebacate and Methylene Bromide in Chlorobenzene. Bis(tetrabutylammonium) sebacate (0.941 g, 1.37×10⁻³ mol) was dissolved in chlorobenzene (10 mL). Methylene bromide (0.11 mL, 0.27 g, 1.37×10⁻³ mol) was added and the solution was stirred in a sand bath at 130° C. for 27 h. A white precipitate had formed. The solvent was evaporated in a stream of argon. The solid residue was dissolved in chloroform and extracted 4 times with 5% sodium bicarbonate solution and twice with water, and then with saturated sodium chloride solution. The chloroform solution was dried with anhydrous sodium sulfate and evaporated to obtain a solid which was dried in vacuo for 14 h to obtain 0.18 g, 62% yield. $^1$H and $^{13}$C NMR in CDCl₃ were obtained. From end group analysis, DP was determined to be 512 corresponding to $M_n$=110,000. FIG. 13 shows a $^1$H NMR spectrum and FIG. 14 shows a $^{13}$C NMR spectrum of poly(methylene sebacate) obtained by this procedure.

II. Poly(ethylene terephthalate) (PET) and Poly(ethylene isophthalate)

Method I: Using triethylamine. Terephthalic acid is reacted with two equivalents of triethylamine in a suitable solvent to form bis(triethylammonium) terephthalate:

2Et₃N+p-HO₂CC₆H₄CO₂H→Et₃NH⁺⁻O₂CC₆H₄CO₂⁻⁺HNEt₃

Bis(triethylammonium) terephthalate is reacted with ethylene chloride (or bromide) in a suitable solvent to form poly(ethylene terephthalate):

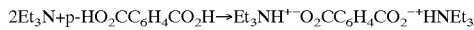

Synthesis of Poly(ethylend terephthalate) by Reaction of Terephthalic Acid, Ethylene Bromide, and Triethylamine in Dimethylformamide. Triethylamine (2.9 mL, 2.1 g, 0.021 mol) was added dropwise from a syringe to terephthalic acid (1.7 g, 0.011 mol). DMF (12 mL) was added and the mixture was stirred 30 min. Ethylene bromide (0.91 mL, 2.26 g, 0.013 mol) was added with a syringe. The solution was stirred under argon and heated by a sand bath at 100–110° C. for 28 h during which time a precipitate had formed. The reaction mixture was cooled and the precipitate was collected by filtration, washed several times with anhydrous methanol, and dried to obtain 1.3 g, 62% yield. In a melting point apparatus a sample in a capillary sintered at 130° C. and then melted 142–144° C. From end group analysis by $^1$H NMR, DP=27 corresponding to $M_n$=5,200. FIG. 15 shows a $^1$H NMR spectrum and FIG. 16 shows a $^{13}$C NMR spectrum of poly(ethylene terephthalate) obtained by this procedure.

Synthesis of Poly(ethylene terephthalate) by Reaction of Terephthalic Acid, Ethylene Chloride, and Triethylamine in Dimethylformamide. Triethylamine (2.2 mL, 1.6 g, 0.016 mol) was added dropwise from a syringe to terephthalic acid (2.0 g, 0.0072 mol). DMF (12 mL) was added and the solution was stirred for 30 min. Ethylene chloride (1.0 mL, 1.3 g, 0.015 mol) was added by a syringe. The solution was stirred under argon and heated by a sand bath at 110° C. for 4 days during which time a precipitate formed. The reaction mixture was cooled and the precipitate was collected by centrifugation, washed several times with anhydrous methanol, and dried; yield, 0.92 g, 58%; DP=62 corresponding to $M_n$=12,000.

Synthesis of Poly(ethylene isophthalate) by Reaction of Isophthalic Acid, Ethylene Bromide, and Triethylamine in Dimethylformamide. Triethylamine (2.0 mL, 1.5 g, 0.014 mol) was added dropwise with a syringe to isophthalic acid (0.91 g, 0.0055 mol). DMF (5 mL) was added and the solution was stirred for 30 min. Ethylene bromide (0.48 mL, 2.3 g, 0.012 mol) was added using a syringe. The solution was stirred under argon and heated by a sand bath at 120° C. for 44 h during which time a precipitate formed. The mixture was cooled, the precipitate was collected by centrifugation, washed several times with anhydrous methanol, and dried, 0.50 g, 50%. DP=23; $M_n$=4,400. FIG. 19 shows a $^1$H NMR spectrum and FIG. 20 shows a $^{13}$C NMR spectrum of poly(ethylene isophthalate) obtained by the reaction of ethylene chloride in the above procedure.

Method II: Using bis(tetraethylammonium) terephthalate. Bis(tetraethylammonium) terephthalate is prepared as described above by titrating tetraethylammonium hydroxide with terephthalic acid. Bis(tetraethylammonium) terephthalate is then reacted with ethylene chloride (or ethylene bromide):

Et₄N⁺p⁻⁻O₂CC₆H₄CO₂⁻⁺N(Et)₄ + XCH₂CH₂X →

(Et)₄N⁺(p⁻⁻O₂CC₆H₄COOCH₂CH₂)ₙX + (Et₄N⁺X⁻)

X = Cl or Br

Synthesis of Poly(ethylene terephthalate) by Reaction of Ethylene Bromide and Bis(tetraethylammonium) Terephthalate in Dimethylformamide. Ethylene bromide (0.82 mL, 1.8 g, 0.0095 mol) was added by a syringe to bis (tetraethylammonium) terephthalate (1.7 g, 0.0041 mol) dissolved in DMF (15 mL). The solution was stirred under argon and heated by a sand bath at 125° C. for 16 h during which time a precipitate formed. The reaction mixture was cooled and the precipitate which formed was collected by centrifugation, washed with 3×50 mL of anhydrous methanol, and dried in vacuo for 12 h. Yield of polymer= 0.35 g, 56%; DP=45 corresponding to $M_n$=8,700. FIG. 17 shows a $^1$H NMR spectrum and FIG. 18 shows a $^{13}$C NMR spectrum of poly(ethylene terephthalate) obtained by this procedure.

Synthesis of Poly(ethylene terephthalate) by Reaction of Ethylene Chloride and Bis(tetraethylammonium) Terephthalate in Dimethylformamide). Ethylene chloride (0.36 mL, 1.8 g, 0.0036 mol) was added by a syringe to bis (tetraethylammonium) terephthalate (1.4 g, 0.0032 mol) dissolved in DMF (15 mL). The solution was stirred under argon and heated by a sand bath at 120° C. for 16 h during which time a precipitate had formed. The reaction mixture was cooled and the precipitate was collected by centrifugation, washed with 3×50 mL of anhydrous methanol, and dried in vacuo for 13 h; yield=0.31 g, 51%; DP=31 corresponding to $M_n$=6,000.

III. Poly(methylene terephthalate-co-ethylene terephthalate)

Copolymers of poly(alkylene dicarboxylates) may be obtained by reacting the bis(tetraalkylammonium) dicarboxylate salt with a mixture of alkylene halides such as methylene or ethylene halide. The properties of the copolymers can be varied by changing the ratio of alkylene halides in the mixture. Similarly, a mixture of dicarboxylate salts may yield copolymers with desired properties. One skilled in the art would understand that a copolymer of mixed dicarboxylates would be equivalent to copolymers described herein.

The title copolymers can be prepared by using procedures analogous to those in Methods I and II. The general method using bis(tetrabutylammonium) terephthalate is described. Bis(tetrabutylammonium) terephthalate is first prepared from terephthalic acid and tetrabutylammonium hydroxide by the procedure described above. Bis (tetrabutylammonium) terephthalate is then reacted with a mixture of methylene chloride (or bromide) and ethylene chloride (or bromide) in an appropriate solvent. The proportions of the two monomers incorporated into the copolymer are determined by the relative molar ratios of methylene halide to ethylene halide used. Thus when the relative molar ratios of methylene chloride and ethylene chloride were 1:1 (as compared with bis-tetrabutylammonium terephthalate equivalent to 2), the relative ratios of $CH_2$ groups incorporated to $CH_2CH_2$ were approximately 1:1 based on the relative integrated areas of the two signals in the $^1H$ NMR spectra. This indicates that the relative reactivities of the two monomers under the conditions used is about equal. Thus, by reacting the two monomers in other ratios under these conditions, other compositions can be obtained. For example, a ratio of 10:90 of methylene chloride to ethylene chloride respectively would give a copolymer having a copolymer ratio of 10:90 methylene to ethylene units. Analogously a 90:10 methylene to ethylene copolymer can be prepared as well as any composition between or outside of these ratios.

Synthesis of Poly(methylene-co-ethylene terephthalate) by Reaction of Bis(tetrabutylammonium) Terephthalate with Methylene Bromide and 1,2-Dibromoethane (1:1 Mole Ratio) in Chlorobenzene. Bis(tetrabutylammonium) terephthalate (1.46 g, 2.25×10$^{-3}$ mol) was dissolved in 15 mL of chlorobenzene and 0.11 mL (0.210 g, 1.13×10$^{-3}$ mol) of methylene bromide and 0.79 mL (0.195 g, 1.13×10$^{-3}$ mol) of 1,2-dibromoethane was added. The solution was stirred and heated by an oil bath at 120° C. for 12 h during which a fine white precipitate formed. The mixture was cooled and centrifuged. The precipitate was washed three times with dry methanol and dried in vacuo; 0.315 g was obtained. Based on tetrabutylammonium end group analysis and assuming polymeric units as —$OCH_2OCOC_6H_4COOCH_2CH_2O$— or 206 mass units, DP was 631–728 corresponding to $M_n$=117,000–135,000 based on comparison with $CH_2$ and $CH_2CH_2$ integrated areas respectively. By comparison of $CH_2$ with $CH_2CH_2$ areas, 43 to 57% of $CH_2$ and $CH_2CH_2$ units respectively were incorporated into the copolymer. The $^{13}C$ NMR spectrum indicated a copolymer with random distribution of units. On removal of solvent, 1.07 g (74%) of tetrabutylammonium bromide was recovered. FIG. 21 shows a $^1H$ NMR spectrum and FIG. 22 shows a $^{13}C$ NMR spectrum of the title copolymer obtained by the reaction of methylene bromide and ethylene bromide in the above procedure.

Synthesis of Poly(methylene-co-ethylene terephthalate) by Reaction of Bis(benzyltrimethylammonium) Terephthalate with Methylene Bromide and 1,2-Dibromoethane (63:37 Mole Ratio Respectively) in Chlorobenzene. The procedure was similar to that used with bis (tetrabutylammonium) terephthalate above using equimolar quantities of methylene bromide (0.12 mL, 0.30 g, 1.7×10$^{-3}$ mol) and 1,2-dibromoethane (0.15 mL, 0.19 g, 1.0×10$^{-3}$ mol), bis(benzyltrimethylammonium) terephthalate (0.688 g, 2.10×10$^{-3}$ mol), in chlorobenzene solvent (20 mL) at 120° C. for 12 h. The copolymer was isolated according to the same procedure as above (0.0162 g). $^1H$ and $^{13}C$ spectra were obtained using 0.0031 g of copolymer in 0.57 g (95%) of CDCl$_3$ and 0.031 g (5%) of TFAD by weight. From the integration of $CH_2$ relative to $CH_2CH_2$ signals, the $CH_2$ group was incorporated to the extent of 21% compared to 79% of the $CH_2CH_2$ group and DP=207 corresponding to $M_n$=38,000. FIG. 23 shows a $^1H$ NMR spectrum of the title copolymer obtained by this procedure.

Synthesis of Poly(methylene terephthalate-co-ethylene terephthalate) (90:10) by Reaction of Bis (tetrabutylammonium) Terephthalate with Methylene Bromide and 1,2-Dichloroethane (90:10 Mole Ratio Respectively) in Chlorobenzene. The procedure was the same as that described above for the 50:50 copolymer using methylene bromide (0.114 mL, 0.282 g., 1.62×10$^{-3}$ mol, 90%), 1,2-dibromoethane (0.016 mL, 0.056 g, 1.8×10$^{-4}$ mol, 10%), bis(tetrabutylammonium) terephthalate (1.16 g, 1.79×10$^{-3}$ mol). Weight of polymer obtained=0.209 g, 65%. $^1H$ and $^{13}C$ NMR spectra were taken in CDCl$_3$/TFA. The $CH_2$ to $CH_2CH_2$ incorporation into the copolymer was 80:20 respectively indicating greater reactivity of 1,2-dichloroethane. Based on end-group analysis from the $^1H$ NMR spectrum, the DP was 327 from integration of $CH_2$ and $CH_2CH_2$ groups and 363 based on the aromatic hydrogens. These correspond to $M_n$ values of 59,000 and 66,000 respectively making the same assumptions as above.

Synthesis of Poly(methylene-co-ethylene terephthalate) by Reaction of Bis(tetrabutylammonium) Terephthalate with Methylene Bromide and 1,2-Dichloroethane (17:83 Mole Ratio Respectively) in Chlorobenzene. The same procedure as above was carried out using bis(tetrabutylammonium) terephthalate (1.57 g, 2.42×10$^{-3}$ mol), ethylene bromide (0.374 g, 0.18 mL, 2.0×10$^{-3}$ mol), and methylene bromide (0.059 g, 0.020 mL, 3.4×10$^{-4}$ mol). The yield of polymer was 0.291 g, 59%. The incorporation of $CH_2$ and $CH_2CH_2$ units were 12:88 respectively indicating the greater reactivity of 1,2-dichloroethane. The DP of the copolymer was 609 corresponding to $M_n$=125,500 making the same assumption as above. FIG. 24 shows a $^1H$ NMR spectrum and FIG. 25 shows a $^{13}C$ NMR spectrum of the title copolymer obtained by this procedure.

Synthesis of Poly(methylene-co-ethylene terephthalate) by Reaction of Terephthalic Acid with Methylene Bromide and Ethylene Bromide (1:1 Mole Ratio) and Triethylamine in Dimethylformamide. Triethylamine (2.2 mL, 1.6 g, 0.016 mol) was added dropwise from a syringe to terephthalic acid (1.3 g, 0.0078 mol). DMF (25 mL) was added and the mixture was stirred for 0.5 h. Ethylene bromide (0.33 mL, 0.72 g, 0.0039 mol) and methylene bromide (0.27 mL, 0.67 g, 0.0039 mol) were added with a syringe. The solution was stirred under argon and heated by a sand bath at 100° C. for 10 h during which time a precipitate formed. The mixture was cooled and the precipitate was collected by centrifugation, washed several times with anhydrous methanol, and dried for 23 h in vacuo to obtain 0.95 g, 59% yield. A $^1H$ nmr spectrum was obtained by dissolving 0.026 g, (3.6% by wt.) of polymer in 0.67 g (89% by wt.) CDCl$_3$ and 0.05 g (6% by wt.) of trifluoroacetic acid-d. DP=63; $M_n$=12,000 (assuming molecular weight of one unit as 222 mass units corresponding to $C_{11}H_{10}O_5$). By comparison of $CH_2$ with $CH_2CH_2$ areas, 36 to 64% of $CH_2$ and $CH_2CH_2$ units respectively were incorporated into the copolymer. The $^1H$ NMR showed δ (ppm) signals at 4.78, $CH_2CH_2$; 6:30, $CH_2$; 8.13–8.20, arom. FIG. 26 shows a $^1H$ NMR spectrum and FIG. 27 shows a $^{13}C$ NMR spectrum of the title copolymer obtained by the reaction of ethylene chloride in place of ethylene bromide in the above procedure.

A significant value for applications of the title copolymers is that the properties of the copolymers can be varied between those of the constituent homopolymers by changing the molar ratios of the feed monomers as described.

IV. Poly[(methylene dicarboxylates)-co-(ethylene dicarboxylates)]

These copolymers are prepared by reactions of bis (tetrabutylammonium) dicarboxylates with varying proportions of methylene chlorides (or bromides) and ethylene chloride (or bromide):

$$[2Bu_4N^+R(CO_2-)_2] + xCH_2X_2 + yXCH_2CH_2X \rightarrow$$

$$Bu_4N^+(-O_2CRCO_2CH_2CH_2O_2CRCO_2CH_2)_nX + Bu_4N^+X^-$$

X = Cl or Br, x and y represent varying proportions of feed monomers

Synthesis of Poly(methylene oxalate-co-ethylene oxalate) by Reaction of Methylene Bromide and Ethylene Bromide (1:1 Mole Ratio) with Bis(tetrabutylammonium oxalate) in Chlorobenzene. To bis(tetrabutylammonium) oxalate (8.3 g, 0.015 mol), 15 mL of chlorobenzene was added with stirring followed by 0.5 mL (1.3 g, 0.0073 mol) of methylene bromide and 0.6 mL (1.1 g, 0.0073 mol) of ethylene bromide. The solution was stirred under argon and heated by an oil bath at 120° C. for 48 h during which time a precipitate formed. After cooling to room temperature, the precipitate was collected by centrifugation and washed with 4×25 mL of anhydrous methanol. The polymer was dried in vacuo for 12 h to obtain 0.17 g of polymer. The polymer was insoluble in common organic solvents. The polymer did not melt to 300° C. and is nonflammable. The DSC of the polymer showed a pattern similar to that of poly(methylene oxalate) and started decomposing at 710° K. FIG. 28 shows an IR spectrum of the title copolymer obtained by this procedure.

V. Poly(R' dicarboxylates)

Bis(tetrabutylammonium) dicarboxylates prepared as described above are reacted with a dihalide, X—R'—X where X=Br or Cl and R'=—CH$_2$—Ar—CH$_2$— or —CH$_2$CH=CHCH$_2$— where Ar=an aromatic group such as 1,4- or 1,3-C$_6$H$_4$. The main point is that the Ar (or vinyl) group acts to make the halogen more reactive.

Synthesis of Poly(p-xylene terephthalate) by Reaction of α,α'-Dibromo-p-xylene with Terephthalic Acid and Triethylamine in Dimethylformamide. Triethylamine (2.3 mL, 1.6 g, 0.016 mol) was added dropwise from a syringe to terephthalic acid (1.1 g, 0.0067 mol). DMF (25 mL) was added and the mixture was stirred for 0.5 h. α,α'-Dibromo-p-xylene (1.8 g, 0.0068 mol) was added and the solution was stirred under argon and heated by a sand bath at 120° C. for 27 h during which time a precipitate had formed. The reaction mixture was cooled and the precipitate was collected by centrifugation, washed several times with anhydrous methanol, and dried for 14 h in vacuo to obtain 0.10 g, 55% yield; mp=255–260° C.; DP=81; M$_n$=21,700. FIG. 29 shows a $^1$H NMR spectrum and FIG. 30 shows a $^{13}$C NMR spectrum of the title copolymer obtained by this procedure.

Synthesis of Poly(p-xylene terephthalate) by Reaction of α,α'-Dichloro-p-xylene with Terephthalic Acid and Triethylamine in Dimethylformamide. Triethylamine (3.4 mL, 2.4 g, 0.024 mol) was added dropwise from a syringe to terephthalic acid (1.7 g, 0.010 mol). DMF (32 mL) was added and the mixture was stirred for 0.5 h. α,α'-Dichloro-p-xylene (1.9 g, 0.011 mol) was added. The solution was stirred under argon and heated by a sand bath at 120° C. for 38 h during which time a precipitate formed. The reaction mixture was cooled and the precipitate was collected by centrifugation, washed several times with anhydrous methanol, and dried for 15 h in vacuo to obtain 1.4 g, 51% yield; DP=50; M$_n$=13,500.

Synthesis of Poly(m-xylene terephthalate) by Reaction of α,α'-Dibromo-m-xylene with Bis(tetraethylammonium) Terephthalic in Dimethylformamide. To 0.66 g (0.0016 mol) of bis(tetraethylammonium) terephthalate 15 mL of DMF and 0.411 g (0.0016 mol) of α,α'-dibromo-m-xylene were added. The solution was stirred under argon and heated by a sand bath at 120° C. for 48 h. The reaction mixture was cooled and poured into ice water. The precipitate which formed was collected by filtration and washed twice with 20 mL of water. The precipitate was then triturated with n-heptane to remove unreacted α,α'-dibromo-m-xylene. The polymer was filtered and dried in vacuo for 10 h to obtain 0.20 g, 47% yield; DP=627 corresponding to M$_n$=168,000. The double bond in this polymer could be the site of crosslinking. FIG. 31 shows a $^1$H NMR spectrum and FIG. 32 shows a $^{13}$C NMR spectrum of the title copolymer obtained by the reaction of α,α'-dichloro-m-xylene in place of the bromo derivative in the above procedure.

Synthesis of Poly(2-E-butenyl terephthalate) by Reaction of 1,4-Dibromo-2-E-butene and Bis(tetraethylammonium) Terephthalate in Dimethylformamide. Bis(tetraethylammonium) terephthalate (2.20 g, 5.12×10$^{-3}$ mol) was added to dimethylformamide (15 mL). (The salt was not soluble in hot chlorobenzene.) 1,4-Dibromo-2-E-butene (1.10 g, 5.12×10$^{-3}$ was added and the solution heated by an oil bath at 130° C. for 28 h during which time a precipitate formed. After cooling the precipitate was collected by centrifugation, washed 4 times with anhydrous methanol, and dried in vacuo to obtain 1.49 g, 52% yield. FIG. 33 shows a $^1$H NMR spectrum and FIG. 34 shows a $^{13}$C NMR spectrum of the title polymer obtained by this procedure.

Synthesis of Poly(2-E-butenyl terephthalate) [Poly(oxy-2-butene-1, 4-diyloxycarbonyl-1,4-phenylenecarbonyl)] by Reaction of 1,4-Dibromo-2-E-butene, Terephthalic Acid and Triethylamine in DMF. Triethylamine (0.36 mL, 0.27 g, 0.0027 mol) was added dropwise from a syringe to terephthalic acid (0.22 g, 0.0013 mol). DMF (10 mL) was added and the mixture was stirred for 0.5 h. 1,4-Dibromo-2-E-butene (0.27 g, 0.0013 mol) was added. The solution was stirred under argon for 30 min. A dense white precipitate was formed which dissolved on heating. The solution was heated by a sand bath at 120° C. for 8 h during which time a precipitate had formed. The mixture was cooled and the precipitate was collected by centrifugation, washed several times with anhydrous methanol, and dried for 14 h in vacuo to obtain 0.17 g, 57% yield. DP=5 corresponding to M$_n$=1,100. FIG. 35 shows a $^1$H NMR spectrum and FIG. 36 shows a $^{13}$C NMR spectrum of the title polymer by this procedure.

Synthesis of Poly(methylene-co-2-butenyl terephthalate) 53:47 by Reaction of Methylene Bromide, 1,4-Dibromo-2-butene, and Bis(tetraethylammonium) Terephthalate in Dimethylformamide. To 1.3 g (0.0031 mol) of bis(tetraethylammonium) terephthalate, 0.29 g (0.0017 mol) of methylene bromide, 0.32 g (0.0015 mol) of 1,4-dibromo-2-butene, and 18 mL of DMF were added. The mixture was stirred for 12 h at ambient temperature. A white precipitate was formed after 15 min. The mixture was then heated to 125° C. for 24 h with a sand bath. The mixture was cooled and the precipitate was collected by centrifugation and washed with anhydrous methanol three times with 30 mL each. The polymer was dried under vacuum for 12 h and weighed, 0.30 g (57% yield assuming the mass of the polymer units to be 168. A $^1$H NMR spectrum of the polymer was obtained by dissolving 13 mg (0.16% by weight of total mixture) of the polymer in 0.78 g (99% by weight) of CDCl$_3$ and 0.0024 g (0.34% by weight) of TFA-d mixture. The incorporation of CH$_2$ and CH$_2$—CH=CH—CH$_2$ units into the polymer were 60:40 respectively. The DP of the copolymer was 163 corresponding to M$_n$=32,000. FIG. 39 shows a $^1$H NMR spectrum and FIG. 40 shows a $^{13}$C NMR spectrum of the title copolymer obtained by this procedure.

Synthesis of Poly(methylene-co-p-xylene terephthalate) by Reaction of Methylene Bromide and α,α'-dibromo-p- xylene (1:1 mole Ratio) with Bis(tetraethylammonium) Terephthalic in Dimethylformamide. To 2.5 g (0.0059 mol) of bis(tetraethylammonium) terephthalate 20 mL of DMF and 0.77 g (0.0029 mol) of α,α'-dibromo-p-xylene were added followed by 0.21 mL (0.53 g, 0.0030 mol) of methylene bromide. The solution was stirred under argon and heated by a sand bath at 120° C. for 28 h during which time a precipitate had formed. The reaction mixture was cooled, the precipitate was collected by centrifugation, washed with 4×50 mL of anhydrous methanol and dried in vacuo for 15 h. Yield of the polymer was 0.90 g, 50%; DP=237 corresponding to $M_n$=53,000. By comparison of $CH_2$ and p-$CH_2C_6H_4CH_2$ areas 48 to 52% of $CH_2$ and p-$CH_2C_6H_4CH_2$ units respectively were incorporated into the copolymer. The spectra indicated a copolymer with random distribution of units. FIG. 37 shows a $^1H$ NMR spectrum and FIG. 38 shows a $^{13}C$ NMR spectrum of the title copolymer obtained by this procedure.

VI. Bis-(Tetraalkylammonium) Dicarboxylates

Bis(tetrabutylammonium) or bis(triethylammonium) dicarboxylates are prepared from the dicarboxylates described above. These are reacted with ethylene chloride (or ethylene bromide) as described above for the reaction with bis(tetrabutylammonium) or bis(triethylammonium) terephthalate:

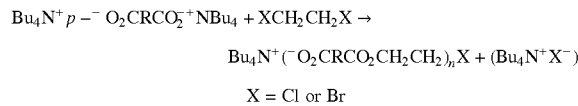

$X = Cl$ or $Br$

General Procedure. A sample of diacid was weighed and dissolved in an appropriate solvent. It was titrated under an inert atmosphere (for example, argon) with two molar equivalents of a tetraalkylammonium hydroxide (the alkyl groups can be the same or different: $R^1R^2R^3R^4$) dissolved in the same (or a compatible solvent) to an endpoint. Any precipitates were removed at this point. The solvent was removed from the filtrate by rotary vacuum evaporation to obtain the bis(tetraalkylammonium) dicarboxylate salt which was dried in vacuo, weighed, and characterized by spectral means.

Synthesis of Bis(tetrabutylammonium) Terephthalate. Terephthalic acid (0.439 g., 2.64×10⁻³ mol) (dried in vacuo at 60° C.) partially dissolved in 10 mL of methanol was titrated under an argon atmosphere with 5.3 mL (1.4 g, 5.3×10⁻³ mol) of tetrabutylammonium hydroxide solution (1 M) in methanol. A fine white precipitate which had formed was removed by centrifugation, washed with methanol, and dried in vacuo, weighed (0.037 g) and discarded. The solvent was removed from the filtrate by rotary vacuum evaporation and the salt residue was dried in vacuo at 60° C. for 18 h to obtain 1.60 g (92%) of product. NMR spectra of the salt were obtained in $CDCl_3$, FIGS. 41 and 42.

Synthesis of Bis(benzyltrimethylammonium) Terephthalate. The procedure was the same as described above for bis(tetrabutylammonium) terephthalate using 0.277 g (1.67× 10⁻³ mol) of terephthalic acid and benzyltrimethylammonium hydroxide (3.4 mL, 0.57 g, 3.6×10⁻³ mol) (40% by weight in methanol). The yield of salt obtained after removal of solvent was 0.688 g, 88%. $^1H$ and $^{13}C$ NMR spectra (FIGS. 47 and 48) of the salt in $D_2O$ were obtained and are in accord with the expected structure.

Synthesis of Bis(tetrabutylammonium) Sebacate. The procedure used was the same as described above by titration of sebacic acid (0.814 g, 4.02×10⁻³ mol) with 1 M tetrabutylammonium hydroxide solution in methanol. After removal of solvent, a quantitative yield (2.75 g) of salt was obtained. FIG. 45 shows a $^1H$ NMR spectrum and FIG. 46 shows a $^{13}C$ NMR spectrum of the salt in $CDCl_3$.

Synthesis of Bis(tetraethylammonium) Terephthalate.

Terephthalic acid (2.5 g, 0.015 mol) was titrated with a 40% aqueous solution of tetraethylammonium hydroxide (11.3 mL). The solvent was evaporated to obtain a hard residue which was dissolved in methanol. The methanol was evaporated to obtain 5.8 g, 92% yield of salt. FIG. 43 shows a $^1H$ NMR spectrum and FIG. 44 shows a $^{13}C$ NMR spectrum of the salt in DMSO-$d_6$.

APPLICATIONS

All of the above polymers can form fibers.

To obtain information on melting points (Tm) and high temperature stability, differential scanning calorimetry measurements were made. The results are presented in Table 1.

TABLE 1

DSC THERMOGRAM OF THE POLYMERS

| Sample | Temp. of Sharp Endotherm | Temp. of Gradual Decomposition |
|---|---|---|
| Poly(methylene terephthalate) | — | 377° C. |
| Poly(ethylene terephthalate) | 250° C. | 305° C. |
| Poly(1,4-but-2-ene terephthalate) | 332° C. | 410° C. |
| Poly(p-xylene terephthalate) | 357° C. | 397° C. |
| Poly(methylene terephthalate-co-ethylene terephthalate) (43:57) | — | 340° C. |
| Poly(methylene terephthalate-co-ethylene terephthalate (80:20) | 327° C. | 360° C. |
| Poly(methylene terephthalate-co-ethylene terephthalate) (12:88) | 279° C. | 307° C. |
| Poly(methylene terephthalate-co-xylene terephthalate) (48:52) | 290° C. | 390° C. |
| Poly(methylene terephthalate-co-1,4-but-2-ene terephthalate) (60:40) | 392° C. | 405° C. |

$T_m$ values ranged from about 250° C. to about 392° C. for poly(methylene terephthalate-co-1,4-but-2-ene terephthalate). The introduction of methylene units into copolymers with poly(ethylene terephthalate) increases the value of Tm as well as the stability to decomposition.

Tables 2 and 3 present a comparison of the mechanical properties of the polyesters.

TABLE 2

A COMPARISON OF MECHANICAL PROPERTIES OF THE POLYESTERS

| Sample | Pulls Fibers | Sticks to Glass | Binds Glass to Glass | Sticks to Metals | Binds Glass to Metals |
|---|---|---|---|---|---|
| Poly(methylene terephthalate) | Yes | No | No | No | No |
| Poly(ethylene terephthalate) | Yes | No | No | No | No |
| Poly(1,4-but-2-ene terephthalate) | Yes | No | No | No | No |
| Poly(p-xylene terephthalate) | Yes | No | No | No | No |

TABLE 3

A COMPARISON OF MECHANICAL PROPERTIES OF THE POLYESTERS

| Sample | Pulls Fibers | Sticks to Glass | Binds Glass to Glass | Sticks to Metals | Binds Glass to Metals |
|---|---|---|---|---|---|
| Poly(methylene terephthalate-co-ethylene terephthalate) (43:57) | Yes | Yes | Yes | Yes | Yes |
| Poly(methylene terephthalate)-co-ethylene terephthalate) (80:20) | Yes | Yes | Yes | Yes | Yes |
| Poly(methylene terephthalate)-co-ethylene terephthalate) (12:88) | Yes | Yes | Yes | Yes | No |
| Poly(methylene terephthalate)-co-p-xylene terephthalate) (48:52) | Yes | Yes | Yes | Yes | Yes |
| Poly(methylene terephthalate)-co-1,4-but-2-ene terephthalate) (60:40) | Yes | Yes | Yes | Yes | Yes |

Poly(methylene terephthalate), poly(ethylene terephthalate), poly(1,4-but-2-ene terephthalate), and poly (p-xylene terephthalate) when melted, do not adhere to glass or metals. The methylene-containing copolymers, in general, however, adhere to glass and metals (including aluminum, iron, and copper). Some of these are clear films, as for example poly(methylene-co-ethylene terephthalate). This property could be of use in the protection of metals or glass from corrosion or scratching. In addition, glass can be bound to glass or to metal or metal to metal seals can be made.

Tables 4 and 5 present a determination of the number average molecular weight of polyglycolide and a poly (methylene terephthalate-co-ethylene terephthalate) by end group analysis.

TABLE 4

Determination of $M_n$ of Polyglycolide By End Group Analysis[1]

| Sample | Peak Position (δ) | Integration of the Peak | Integration Per Proton |
|---|---|---|---|
| -C$\underline{H}_2$-COO$^-$- | 4.9 | 103 | 52 |
| -(C$\underline{H}_3$CH$_2$)$_3$NH$^+$- | 1.38–1.41(t) | 9 | 1 |
| -(CH$_3$C$\underline{H}_2$)$_3$NH$^+$- | 3.55–3.61(q) | 6 | 1 |

[1]End group is triethylammonium
DP = Integration per proton of -CH$_2$- repeating unit/Integration per proton of the end group
DP = 52/1 = 52
$M_n$ = DP × M.Wt. one repeating unit = 52 × 58 = 3,000

TABLE 5

Determination of $M_n$ of a Poly(methylene terephthalate-co-ethylene terephthalate) By End Group Analysis[1]

| Sample | Peak Position (δ) | Integration of the Peak | Integration Per Proton |
|---|---|---|---|
| p-OOCC$_6$$\underline{H}_4$COO$^-$ - | 8.13–8.20 | 334 | 84 |
| -C$\underline{H}_2$C$\underline{H}_2$- | 4.78 | 163 | 41 |
| -C$\underline{H}_2$- | 6.30 | 46.6 | 23 |
| -(C$\underline{H}_3$CH$_2$)$_3$NH$^+$- | 1.42–1.47(t) | 9 | 1 |
| -(CH$_3$C$\underline{H}_2$)$_3$NH$^+$- | 4.43–4.50(q) | 6 | 1 |

[1]End group is triethylammonium
The ratio of methylene to ethylene units is 36:64
M.Wt. of one unit of poly(methylene terephthalate) = 178
M.Wt. of one unit of poly(ethylene terephthalate) = 192
Therefore, the M.Wt. of one unit of copolymer = (178 × 0.36) + (192 × 0.64) = 187
By similar calculation as shown for homopolymer DP = 64 to 84; $M_n$ = 12,000 to 16,000.

Poly(methylene malonate), poly(methylene dimethylmalonate), and poly(methylene fumarate) have also been made but the products obtained so far are oils for which uses have not as yet been found. The corresponding bis (tetrabutylammonium) carboxylates have also been made.

The pertinent parts of the following references are incorporated by reference herein for the reasons cited.

REFERENCES

Carothers et al., *J. Am. Chem. Soc.*, 52:3292 (1930).
Carothers, U.S. Pat. No. 2,071,251.
Carothers, U.S. Pat. No. 2,071,250.
*Chem. Abst.*, 99:21307 (1983).
Cimecioglu et al., *Makromol. Chem. Rapid Commun.*, 10:319 (1989).
Cimecioglu et al., *Journal of Polymer Science: Part A: Polymer Chemistry*, 26:2129–2139 (1988).
Cimecioglu et al., *Journal of Polymer Science: Part A: Polymer Chemistry*, 30:313–321 (1992).
East and Morshed, *Polymer*, 23:168–170 and 1555–1557 (1982).
Ellis, U.S. Pat. No. 2,111,762 (1938).
Gordon et al., *Polym. Prepr. Am. Chem. Soc., Div. Polym. Chem.*, 31, 507 (1990).
JP Appl. 82/UT24503, Feb. 23, 1982.
Kielkiewicz et al., *Polimery* (Warsaw), 27:374 (1982); *Chem. Abst.*, 99:38837 (1982).
Makarevich et al., *Zh. Prikl. Spektrosk.* 50:65 (1989) *Chem. Abst.*, 110:201792, (1989).
Nishikubo et al., *Polym. J.*, 22:1043 (1990).
Otsuka Chemical Co., Ltd., Jpn. Pat. 582154430, December 1983, *Chem. Abst.*, 100:175926 (1984).
Pinkus et al., *J. Polym. Sci., Polym. Chem. Ed.*, 22:1131 (1984).
Pinkus et al., *J. Polym. Sci. Part A. Polym. Chem.*, 27:4291 (1989).
Pinkus et al., *J. Macromol. Sci.—Pure Appl. Chem.*, A29:1031 (1992).
Piraner et al., *Makromol. Chem.*, 193:681 (1992).
Rokicki et al. *Polimery* (Warsaw), 1982, 27:374; *Chem Abst.* 99:38837 (1982)

Shalaby et al., U.S. Pat. No. 4,141,087 (1979).
Shiba, H., DE 3,306,089, Sep. 1, 1983.
Thibeault et al., *J. Polym. Sci., Pt. A: Polym. Chem.*, 28, 1361 (1990).

Applicant understands that one of skill in the art may substitute obvious equivalents of the following claimed chemical structures and methods.

What is claimed is:

1. A method for preparing a bis(tetraalkylammonium) dicarboxylate salt, comprising:

reacting a dicarboxylic acid with tetraalkyl ammonium hydroxide to form a bis(tetraalkylammonium) dicarboxylate salt.

2. The method of claim 1 where the dicarboxylic acid is terephthalic acid or sebacic acid.

3. The method of claim 1 where the tetraalkyl ammonium hydroxide is tetrabutyl-, tetraethyl- or benzyltrimethylammonium hydroxide.

* * * * *